United States Patent
Zheng et al.

(10) Patent No.: US 9,208,444 B1
(45) Date of Patent: Dec. 8, 2015

(54) DETERMINING HAPPINESS INDICES

(71) Applicant: MicroStrategy Incorporated, Vienna, VA (US)

(72) Inventors: Yi Zheng, Herndon, VA (US); Jeff Zhang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 247 days.

(21) Appl. No.: 14/034,825

(22) Filed: Sep. 24, 2013

(51) Int. Cl.
  G06F 9/44     (2006.01)
  G06N 7/02     (2006.01)
  G06N 7/06     (2006.01)
  G06N 5/04     (2006.01)

(52) U.S. Cl.
  CPC .................................. G06N 5/04 (2013.01)

(58) Field of Classification Search
  None
  See application file for complete search history.

(56) References Cited

U.S. PATENT DOCUMENTS

| | | | |
|---|---|---|---|
| 8,332,512 B1 | 12/2012 | Wu et al. | |
| 8,725,858 B1 | 5/2014 | Wu et al. | |
| 2009/0248607 A1 | 10/2009 | Eggink et al. | |
| 2011/0320423 A1 * | 12/2011 | Gemmell et al. | 707/706 |
| 2012/0158851 A1 * | 6/2012 | Kelmenson et al. | 709/205 |

FOREIGN PATENT DOCUMENTS

EP    2107761    10/2009

OTHER PUBLICATIONS

Dodds et al. "Temporal Patterns of Happiness and Information in a Global Social Network: Hedonometrics and Twitter", PLoS One, vol. 6, Issue 12, 2011, pp. 26.*

* cited by examiner

*Primary Examiner* — Li-Wu Chang
(74) *Attorney, Agent, or Firm* — Fish & Richardson P.C.

(57) ABSTRACT

A computer-implemented method that includes the actions of receiving a request for data indicative of a user segment of a social networking platform, accessing user data of the social networking platform, identifying a portion of the accessed user data, analyzing contents of the portion of the accessed user data, determining happiness scores for the users in the user segment, identifying a first subset of the users as being happy users, and identifying a second subset of the users as being unhappy users, determining a frequency at which the particular user performs one or more actions, comparing the determined frequencies at which the users in the second subset perform the one or more actions to a threshold frequency, identifying a third subset of the users included in the second subset, and generating a happiness index for the user segment that is based on one or more determined happiness scores.

20 Claims, 18 Drawing Sheets

IPAD 3:48 PM 58%

DEMOGRAPHICS  200

FILTER RESULTS: 473,981 PEOPLE IN APPLICATION   AVG AGE: 25   AVG INCOME: $58K   [PROFILE] [MAP]   [FILTER]

| BASIC DEMOGRAPHICS | | | GEOGRAPHIC PROFILE | | | ESTIMATED INCOME PROFILE | | |
|---|---|---|---|---|---|---|---|---|
| GENDER | PEOPLE | % | URBANICITY | PEOPLE | % | INCOME BRACKET | PEOPLE | % |
| TOTAL | 473,981 | 100% | TOTAL | 361,298 | 100% | TOTAL | 309,230 | 100% |
| MALE | 473,981 | 100% | URBAN | 282,232 | 78% | LESS THAN $25K | 17,734 | 6% |
| | | | RURAL | 79,066 | 22% | $25K-$35K | 38,529 | 12% |
| STATUS | PEOPLE | % | METRO AREA | PEOPLE | % | $35K-$50K | 86,989 | 28% |
| TOTAL | 328,723 | 100% | TOTAL | 382,481 | 100% | $50K-$60K | 52,157 | 17% |
| SINGLE | 197,720 | 60% | NEW YORK | 36,131 | 9% | $60K-$80K | 60,913 | 20% |
| IN RELATIONSHIP | 106,448 | 32% | LOS ANGELES | 18,438 | 5% | $80K-$100K | 24,786 | 8% |
| ENGAGED | 24,555 | 7% | WASHINGTON, D.C. | 17,646 | 5% | $100K-$140K | 20,843 | 7% |
| | | | CHICAGO | 14,916 | 4% | $140K-$160K | 3,090 | 1% |
| AGE BRACKET | PEOPLE | % | BOSTON | 11,394 | 3% | $160K-$200K | 3,251 | 1% |
| TOTAL | 473,981 | 100% | PHILADELPHIA | 9,937 | 3% | MORE THAN $200K | 938 | 0% |
| 17-21 | 94,302 | 20% | SAN FRANCISCO-OAKLAND | 9,440 | 2% | | | |
| 22-28 | 268,445 | 57% | COUNTRY | PEOPLE | % | LANGUAGE PROFILE | | |
| 29-35 | 111,234 | 23% | TOTAL | 418,022 | 100% | LANGUAGE | PEOPLE | % |
| | | 205 | UNITED STATES | 403,097 | 96% | TOTAL | 473,929 | 100% |
| | | | UNITED KINGDOM | 1,221 | 0% | ENGLISH (US) | 456,228 | 96% |
| EDUCATION LEVEL | PEOPLE | % | MEXICO | 1,050 | 0% | ENGLISH (UK) | 10,497 | 2% |
| TOTAL | 473,981 | 100% | JAPAN | 714 | 0% | SPANISH | 2,053 | 0% |
| COLLEGE | 411,077 | 87% | CANADA | 697 | 0% | ENGLISH (PIRATE) | 801 | 0% |
| GRADUATE SCHOOL | 62,904 | 13% | ITALY | 655 | 0% | ITALIAN | 645 | 0% |
| | | | GERMANY | 602 | 0% | FRENCH (FRANCE) | 640 | 0% |
| | | | SPAIN | 580 | 0% | SPANISH (SPAIN) | 610 | 0% |
| | | | KOREA, SOUTH | 545 | 0% | PORTUGUESE (BRAZIL) | 279 | 0% |
| | | | CHINA | 532 | 0% | GERMAN | 275 | 0% |
| | | | AUSTRALIA | 513 | 0% | INDONESIA | 248 | 0% |

NOTE: ALL RESULTS EXCLUDE UNDECLARED VALUES

[DASHBOARD] [DEMOGRAPHICS]  INTERESTS  PLACES  TEXT ANALYTICS  PSYCHOGRAPHICS  EMPLOYMENT  SCORE

PLACE ANALYSIS — 220

FILTER RESULTS: 473,391 PEOPLE IN APPLICATION

RANK BY: CHECKINS

CHECKINS REPRESENT THE NUMBER OF PEOPLE VISITS TO A PLACE [?]

| PLACE | | CHECKINS | UNIQUE VISITORS | 30 DAY GROWTH | GROWTH % | ACCELERATION | TREND |
|---|---|---|---|---|---|---|---|
| LOS ANGELES INTERNATIONAL AIRPORT (LAX) | LOS ANGELES | 5,846 | 3,635 | 82 | 2.3% | | ▷ |
| CHICAGO O'HARE INTERNATIONAL AIRPORT | CHICAGO | 5,154 | 3,155 | 71 | 2.3% | -1.3x | ▷ |
| SAN FRANCISCO INTERNATIONAL AIRPORT (SFO) | SAN FRANCISCO | 5,025 | 2,712 | 88 | 3.4% | -1.3x | ▷ |
| HARTSFIELD-JACKSON ATLANTA INTERNATIONAL AIR | ATLANTA | 4,456 | 2,732 | | | -1.0x | |
| BONNAROO MUSIC AND ARTS FESTIVAL | OTHERS | 3,411 | 286 | | | | |
| DALLAS/FORT WORTH INTERNATIONAL AIRPORT | DALLAS-FORT W | 2,837 | 1,972 | 52 | 2.7% | -1.1x | ▷ |
| BOSTON LOGAN INTERNATIONAL AIRPORT | BOSTON | 2,640 | 1,711 | 54 | 3.3% | 1.0x | ◁ |
| YANKEE STADIUM | NEW YORK | 2,458 | 1,642 | 41 | 2.6% | -1.3x | ▷ |
| AT & T PARK | SAN FRANCISCO | 2,436 | 1,291 | 30 | 2.4% | -1.4x | ▷ |
| PHOENIX SKY HARBOR INTERNATIONAL AIRPORT | PHOENIX-MESA | 2,410 | 1,598 | 36 | 2.3% | -1.2x | ▷ |
| SEATTLE-TACOMA INTERNATIONAL AIRPORT (SEA-TAC) | SEATTLE | 2,219 | 1,310 | 38 | 3.0% | -1.3x | ▷ |
| PHILADELPHIA INTERNATIONAL AIRPORT | PHILADELPHIA | 2,159 | 1,358 | 36 | 2.7% | 1.1x | ◁ |
| WASHINGTON NATIONAL AIRPORT | WASHINGTON, D. | 2,142 | 1,253 | 35 | 2.9% | -1.2x | ▷ |
| MCCARRAN INTERNATIONAL AIRPORT | LAS VEGAS | 2,139 | 1,611 | 36 | 2.3% | -1.3x | ▷ |
| MADISON SQUARE GARDEN | NEW YORK | 1,936 | 1,328 | 44 | 3.4% | 1.9x | ◁ |
| NEWARK LIBERTY INTERNATIONAL AIRPORT | NEW YORK | 1,764 | 1,239 | 30 | 2.5% | -1.3x | ▷ |
| TIMES SQUARE NYC | NEW YORK | 1,674 | 1,454 | 17 | 1.2% | -1.7x | ▷ |
| BALTIMORE-WASHINGTON INTERNATIONAL AIRPORT (B | BALTIMORE | 1,672 | 1,130 | 30 | 2.7% | -1.1x | ▷ |
| FENWAY PARK | BOSTON | 1,670 | 1,210 | 40 | 3.4% | 1.1x | ◁ |
| WRIGLEY FIELD | CHICAGO | 1,550 | 1,155 | 34 | 3.0% | -1.2x | ▷ |
| FORT LAUDERDALE - HOLLYWOOD INTERNATIONAL AI | MIAMI | 1,543 | 1,072 | 22 | 2.1% | -1.4x | ▷ |
| MSP AIRPORT | MINNEAPOLIS-ST | 1,514 | 951 | 16 | 1.7% | -1.6x | ▷ |
| LAGUARDIA AIRPORT (LGA) | NEW YORK | 1,504 | 1,125 | 39 | 3.6% | 1.1x | ◁ |
| VERIZON CENTER | WASHINGTON, D. | 1,465 | 847 | 39 | 4.8% | 1.9x | ◁ |

DASHBOARD | DEMOGRAPHICS | INTERESTS | PLACES | TEXT ANALYTICS | PSYCHOGRAPHICS | EMPLOYMENT | SCORE

DETERMINING HAPPINESS INDICES

BACKGROUND

Social networking platforms may store data about or otherwise related to users of the social networking platform. These social networking platforms often allow users of the platforms to share data with one another and perform various actions. The volume of data generated that corresponds to the actions of others and the sharing of data with other users of such social networking platforms may be relatively large.

SUMMARY

One aspect of the subject matter described in this specification can be embodied in a computer-implemented that include the actions of receiving a request for data indicative of a user segment of a social networking platform, with the user segment being associated with one or more user characteristics, in response to the request, accessing user data of the social networking platform, with an item of the accessed user data being associated with one or more user characteristics indicative of a type of user associated with the item of accessed user data, comparing the one or more user characteristics that define the user segment to user characteristics associated with the accessed user data, identifying, based on comparing, a portion of the accessed user data that pertains to users of the social networking platform who are included in the user segment, analyzing contents of the portion of the accessed user data that pertains to the users who are included in the user segment, determining, based on analyzing, happiness scores for the users who are included in the user segment, with a happiness score for a user being indicative a happiness of the user or an unhappiness of the user, based on the determined happiness scores, identifying a first subset of the users who are included in the user segment as being happy users, with a happy user being a user of the social networking platform who is associated with a happiness score that exceeds a happiness threshold, and identifying a second subset of the users who are included in the user segment as being unhappy users, with an unhappy user being a user of the social networking platform who is associated with a happiness score that is less than or equal to the happiness threshold, for a particular user included in the second subset, determining a frequency at which the particular user performs one or more actions to cause generation of user data for the particular user, comparing the determined frequencies at which the users in the second subset perform the one or more actions to a threshold frequency, identifying, based on comparing the determined frequencies, a third subset of the users included in the second subset, with a user in the third subset performing the one or more actions less frequently than the threshold frequency, and generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

In some implementations, the happiness scores of the users comprise raw happiness scores of the users who are included in the user segment, and wherein the method further includes the actions of accessing a mapping of one or more raw happiness scores to scaled happiness scores, wherein determining can include determining, based on the mapping and based on the raw happiness scores of the users who are included in the user segment, scaled happiness scores for the users who are included in the user segment. The happiness scores for the users can include first happiness scores for the users, and wherein the method further includes the actions of receiving a user input that indicates a time period, analyzing, for each day specified in the time period, contents of the portion of the accessed user data that pertains to the users who are included in the user segment, analyzing contents of the portion of the accessed user data that pertains to the users who are included in the user segment and that are associated with the time period, determining, based on analyzing contents for each day in the time period, second happiness scores for the users who are included in the user segment, determining, for the time period, third happiness scores for the users who are included in the user segment, comparing at least one of the second happiness scores for the users with at least one of the third happiness scores for the users, and modifying one or more of the second happiness scores for the users and the third happiness scores for the users, based on the comparison. The happiness index for the user segment can include a first happiness index for the user segment, and wherein the method further includes the actions of generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users. The computer-implemented method can further include the actions of receiving data indicative of a selection of filtering criteria for user characteristics, filtering the one or more user characteristics that are associated with the user segment in accordance with the filtering criteria, and generating, based on filtering, a filtered user segment, wherein generating the happiness index for the user segment can include generating a happiness index for the filtered user segment. The computer-implemented method can further include transmitting, to a client device, data indicative of the happiness index for the user segment, with the transmitted data being indicative of a visual representation that specifies a measure of happiness of the user segment. The computer-implemented method can further include determining a sentiment score for one or posts included in the portion of the accessed user data that pertains to users of the social networking platform who are included in the user segment, wherein the happiness scores are based at least in part on the sentiment scores and the analyzing.

Another aspect of the subject matter described in this specification can be embodied in a system the includes one or more processing devices, one or more machine-readable media configured to store instructions that are executable by the one or more processing devices to perform operations including receiving a request for data indicative of a user segment of a social networking platform, with the user segment being associated with one or more user characteristics, in response to the request, accessing user data of the social networking platform, with an item of the accessed user data being associated with one or more user characteristics indicative of a type of user associated with the item of accessed user data, comparing the one or more user characteristics that define the user segment to user characteristics associated with the accessed user data, identifying, based on comparing, a portion of the accessed user data that pertains to users of the social networking platform who are included in the user segment, analyzing contents of the portion of the accessed user data that pertains to the users who are included in the user segment, determining, based on analyzing, happiness scores for the users who are included in the user segment, with a happiness score for a user being indicative a happiness of the user or an unhappiness of the user, based on the determined happiness scores, identifying a first subset of the users who are included in the user segment as being happy users, with a happy user being a user of the social networking platform who is associated with a happiness score that exceeds a happiness threshold, and identifying a second subset of the users who are included in the user segment as being unhappy users, with an unhappy user being a user of the social networking platform who is associated with a happiness score that is less than or equal to the happiness threshold, for a particular user included in the second subset, determining a frequency at which the particular user performs one or more actions to cause generation of user data for the particular user, comparing the determined frequencies at which the users in the second subset perform the one or more actions to a threshold frequency, identifying, based on comparing the determined frequencies, a third subset of the users included in the second subset, with a user in the third subset performing the one or more actions less frequently that the threshold frequency, and generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

In some implementations, the happiness scores of the users can include raw happiness scores of the users who are included in the user segment, and wherein the one or more processing devices can further perform the operations including accessing a mapping of one or more raw happiness scores to scaled happiness scores, wherein determining can include determining, based on the mapping and based on the raw happiness scores of the users who are included in the user segment, scaled happiness scores for the users who are included in the user segment. The happiness scores for the users comprise first happiness scores for the users, and wherein the one or more processing devices can further perform the operations including receiving a user input that indicates a time period, analyzing, for each day specified in the time period, contents of the portion of the accessed user data that pertains to the users who are included in the user segment, analyzing contents of the portion of the accessed user data that pertains to the users who are include in the user segment and that are associated with the time period, determining, based on analyzing contents for each day in the time period, second happiness scores for the users who are included in the user segment, determining, for the time period, third happiness scores for the users who are included in the user segment, comparing at least one of the second happiness scores for the users with at least one of the third happiness scores for the users, and modifying one or more of the second happiness scores for the users and the third happiness scores for the users, based on the comparison. The happiness index for the user segment can include a first happiness index for the user segment and wherein the one or more processing devices can further perform the operations comprising further including generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users. The one or more processing devices can further perform the operations including receiving data indicative of a selection of filtering criteria for user characteristics, filtering the one or more user characteristics that are associated with the user segment in accordance with the filtering criteria, and generating, based on filtering, a filtered user segment, wherein generating the happiness index for the user segment can include generating a happiness index for the filtered user segment. The one or more processing devices can further perform the operations including transmitting, to a client device, data indicative of the happiness index for the user segment, with the transmitted data being indicative of a visual representation that specifies a measure of happiness of the user segment.

Yet another aspect of the subject matter described in this specification can be embodied in a non-transitory computer-readable storage medium having instructions stored thereon that when executed by a computer processor cause the processor to perform operations including receiving a selection of one or more user characteristics that define a user segment of a social networking platform, receiving a request for data indicative of the user segment, in response to the request for data, accessing one or more posts included in user data of the social networking platform, with an item of the accessed user data being associated with one or more user characteristics indicative of a type of user associated with the item of accessed user data, comparing the received selection of one or more user characteristics to user characteristics associated with the accessed user data, identifying, based on comparing, a portion of the accessed user data that pertains to users of the social networking platform who are included in the user segment, analyzing contents of posts included in the accessed user data that pertains to the users who are included in the user segment, determining one or more sentiment scores for the contents of the posts, determining, using the determined one or more sentiment scores and based on analyzing, happiness scores for the users who are included in the user segment, with a happiness score for a user being indicative a happiness of the user or an unhappiness of the user, based on the determined happiness scores, identifying a first subset of the users who are included in the user segment as being happy users, with a happy user being a user of the social networking platform who is associated with a happiness score that exceeds a happiness threshold, and identifying a second subset of the users who are included in the user segment as being unhappy users, with an unhappy user being a user of the social networking platform who is associated with a happiness score that is less than or equal to the happiness threshold, for a particular user included in the second subset, determining a frequency at which the particular user generates posts on the social networking platform, comparing the determined frequencies at which one or more users in the second subset generate posts on the social networking platform to a threshold frequency, identifying, based on comparing the determined frequencies, a third subset of the users included in the second subset, with a user in the third subset generating posts on the social networking platform less frequently than the threshold frequency, and generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

In some implementations, the happiness scores of the users comprise raw happiness scores of the users who are included in the user segment, and wherein the operations further include accessing a mapping of one or more raw happiness scores to scaled happiness scores, wherein determining includes determining, based on the mapping and based on the raw happiness scores of the users who are included in the user segment, scaled happiness scores for the users who are included in the user segment. The happiness scores for the users comprise first happiness scores for the users, and wherein the operations further include receiving a user input that indicates a time period, analyzing, for each day specified in the time period, contents of the portion of the accessed user data that pertains to the users who are included in the user segment, analyzing contents of the portion of the accessed user data that pertains to the users who are included in the user segment and that are associated with the time period, determining, based on analyzing contents for each day in the time period, second happiness scores for the users who are included in the user segment, determining, for the time period, third happiness scores for the users who are included in the user segment, comparing at least one of the second happiness scores for the users with at least one of the third happiness scores for the users, and modifying one or more of the second happiness scores for the users and the third happiness scores for the users, based on the comparison. The happiness index for the user segment comprises a first happiness index for the user segment, and wherein the operations further include generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users. The operations can further include receiving data indicative of a selection of filtering criteria for user characteristics, filtering the one or more user characteristics that are associated with the user segment in accordance with the filtering criteria, and generating, based on filtering, a filtered user segment, wherein generating the happiness index for the user segment includes generating a happiness index for the filtered user segment. The operations can further include transmitting, to a client device, data indicative of the happiness index for the user segment, with the transmitted data being indicative of a visual representation that specifies a measure of happiness of the user segment. The operations can further include determining a sentiment score for one or posts included in the portion of the accessed user data that pertains to users of the social networking platform who are included in the user segment, wherein the happiness scores are based at least in part on the sentiment scores and the analyzing.

Particular implementations of the subject matter described in this specification may be implemented to include some, all, or none of the following features. Demographic and psychographic data can be presented regarding user posting about one or more topics of interest. Sentiments can be reflected for users and segments of users for one or more topics of interest. Trend data can be shown about one or more topics of interest. Data about the topics of interest may be presented using one or more different graphical representations. Also, these graphical representations may present the data at multiple levels of granularity. These features alone or in combination may provide an intuitive mechanism to present large amounts of data pertaining to activities performed on a social networking platform and/or to glean insights from such activities.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 2A-2D illustrate examples of graphical user interfaces for presenting anonymous demographic data pertaining to users who are posting about one or more topics.

DETAILED DESCRIPTION

Figure 1A:
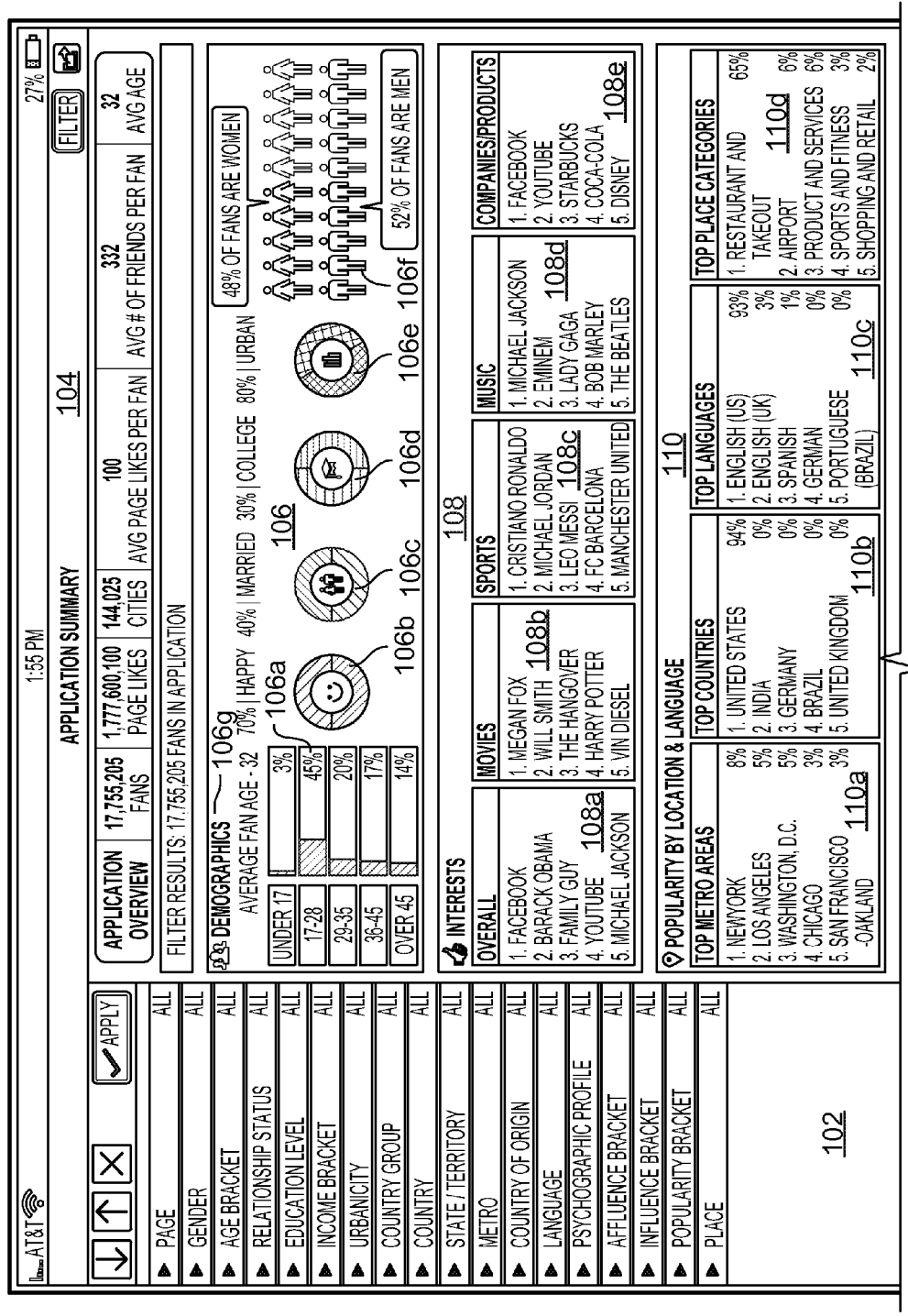
FIG. 1A illustrates an example of a graphical user interface of an application that presents data indicative of types of users who are posting about one or more topics.
Figure 1A:
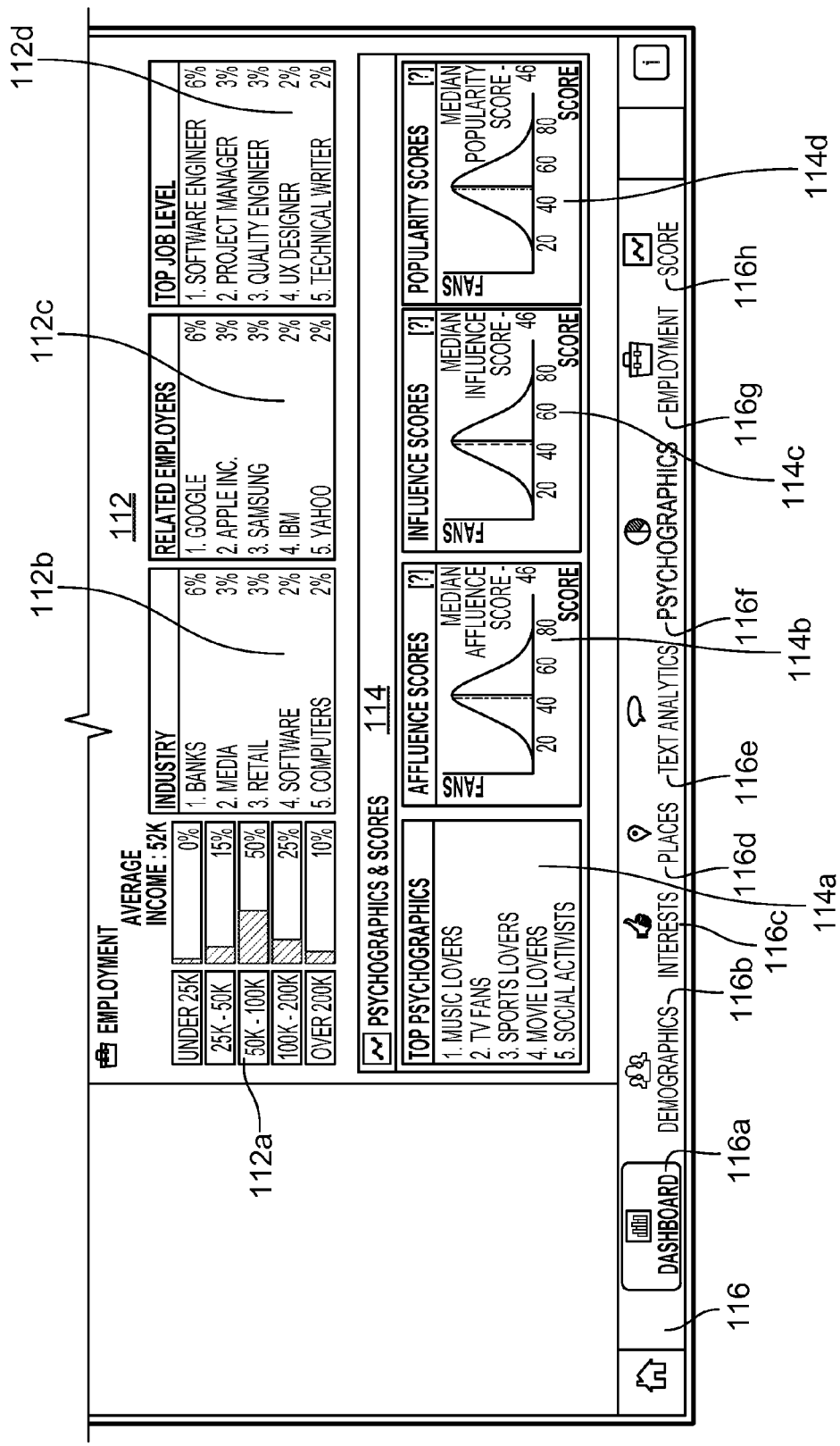

A system consistent with this disclosure presents data to one or more users of an application about various aspects of users who are posting on a social networking platform and the contents of those posts. Generally, an application includes software that is executing on a device (e.g., a computer, a laptop, a mobile device, and so forth) and that renders one or more graphical user interfaces. In an example, an application may be limited to execution on a mobile device. The presented data can include, but is not limited to, data indicative of types of users posting on the social network, data indicative of one or more topics of interest posted on the social networking platform by a particular type of users (or user segment), and a sentiment score. In general, a sentiment score reflects that a particular post (or one or more particular items discussed in the post) is positive, negative or neutral. For example, a sentiment bearing phrase "I love ice-cream" may be identified to reflect that both the sentiment with respect to the post is generally positive and that the term (or token) "ice-cream" in the post is generally treated in a positive light.

In some implementations, the sentiment scores for one or more posts can be used to determine a happiness score for the user that generated the one or more posts. In general, a happiness score reflects whether users are happy or unhappy. For example, if a majority of posts generated by the user are determined to have a positive sentiment, the user may be identified as being happy. In addition, in some implementations, a happiness index can be determined for a particular user segment based on the happiness scores of the user included in the user segment. In general, a happiness index reflects the overall level of happiness or unhappiness for a particular user segment. For example, if seventy percent of posts generated by a particular user segment are of a positive nature, the user segment may have a happiness index of "seventy percent happy."

Generally, a user segment includes a plurality of users who are each associated with similar user characteristics and/or the same user characteristics. Generally, a sentiment score includes a value indicative of a measure of happiness. In an example, the measure of happiness may be expressed with respect to a particular post. In another example, the measure of happiness may be expressed with respect to one or more tokens (e.g., words or phrases) that are included in the particular post. In yet another example, the measure of happiness may be expressed with respect to both the particular post and the one or more tokens that are included in the particular post.

In a particular example, a system may be configured to identify one or more tokens present in content, such as posts on the social networking platform by one or more users included in a user segment. In general, a token may include an element found in a post on a social networking platform. Examples of these elements include, but are not limited to, a sentiment bearing phrase (e.g., combinations of words, such as "horrible pitching," "love ice cream," and so forth that indicate an emotion), entities (e.g., a predefined noun or noun phrase that refers to a person, place, location, and so forth), a term, a theme or other elements. In some examples, these elements can be used to identify buzz terms that may not have existed previously and did not have previous widespread usage. In some examples, the number of elements that are identified is limited to a pre-defined number (e.g., two hundred) that appear most frequently in posts by users included in a user segment. In some examples, a time period (e.g., seven days) may be selected to further constrain the identified elements. That is, in some examples, the top two hundred elements occurring with a highest frequency (or relative frequency) of occurrence over a seven day period can be identified. Techniques for identifying these elements are described in more detail below.

In a particular example, the data indicative of a type of user posting on the social networking platform may include anonymous demographic data or psychographic data that describes a particular user or a user segment to which the particular user belongs. In another particular example, data indicative of a topic of interest may include trend data that describes whether the topic of interest is trending up (e.g., becoming more popular on the social networking platform), or trending down (e.g., becoming less popular on the social networking platform). In such examples, the trending data may be determined from certain activities performed by the users of the social networking platform. Such activities may include, but are not limited to, generating a post about a particular topic, endorsing content that is associated or otherwise affiliated with a particular topic, or performing a "check-in" at a location that is associated or otherwise affiliated with a particular topic. These and other activities are described in more detail below. In still another particular example, data indicative of a topic of interest may include a comparison of an average sentiment score associated with the topic of interest (e.g., such as an airline) and an average sentiment score associated with a broader topic of interest (e.g., the travel industry in general).

In general, the presented data can be provided in such a way that the particular user of the application can identify certain interesting characteristics about topics of interest, users of a social networking platform, user segments of a social networking platform, or some combination of these. In an example, the presented data can provide the user of the application some insight into the habits of one or more user segments with respect to one or more topics of interest. In this example, if the user is an owner, agent, or other employee of a business, the user can use the data to make more informed business decisions, e.g., to address an issue trending on a social networking platform with respect to their business or to better target a particular user segment that has certain demographic characteristics with respect to a new product or service offering.

In an example, the presented data may be generated by analyzing user data saved or otherwise maintained by a social networking platform. In this example, because there may be a large amount of available user data, it may be helpful to limit or otherwise filter the amount of data presented.

In one such example, the system can generate any or all of this data based on a time period selected by a user. In a particular example, the user may be interested in data about various aspects of the users who are posting on a social networking platform and the contents of those posts for just a few days. As an example, the user may want to track the reception of a particular advertising campaign or a new product or service offering. Other examples of limiting or otherwise filtering the amount of data presented are described in more detail below.

As described above, in an example, some or all of the data may be generated or otherwise identified by analyzing content included in the accessed user data. In this example, posts generated by particular users of the social networking platform may be analyzed to determine topics of interest for the posts, sentiments associated with the posts or topics of interest, and other data that may be of interest to a user of an application. In an example, a posting frequency or another frequency of occurrence may be compared to a threshold frequency to generate more accurate data. For example, users that post more frequently may generally have sentiment scores associated with those posts that are on average lower than sentiment scores associated with posts generated by users who post less frequently. In this example, if a user does not post with a sufficiently high frequency, posts that have a sentiment score indicative of the user being happy may be modified by a bias correction factor. Other frequency comparisons are also possible and are described in more detail below.

There are many different examples of social networking platforms. Facebook, Twitter, LinkedIn, Google+, MySpace, Yelp, and Orkut are just a few examples. But, there are many others, and it is reasonable to expect many more may emerge in the future. The techniques described herein for handling data available within a social networking platform are widely applicable and may be applied to data available within any relevant social networking platform.

A social networking platform frequently enables individual user identities to establish social connections with other user identities. The social connections formed between individual users within a social networking platform may be represented in the form of a graph, where users are represented by nodes and social connections between users are represented by edges connecting the nodes. These social connections between user identities may reflect relationships between the underlying human users who correspond to the user identities. For example, a social connection between two user identities within the social networking platform may reflect a social friendship (e.g., developed through physical interaction in the real-world and/or through on-line interaction in the cyber-world) or a professional relationship between the underlying human users who correspond to the user identities.

In an example, a user identity may be able to unilaterally form a social connection with another user identity. In this example, a social networking platform, such as social networking platform, may enable a first user identity to form a connection to a second user identity simply by specifying a desire to form a social connection to the second user identity and without requiring approval of the connection by the second user identity. In another example, the formation of social connections between two user identities may be a bilateral process. In this example, when a first user identity specifies a desire to form a connection to a second user identity, the social networking platform may establish the connection only after the second user identity approves the formation of the connection between the first user identity and the second user identity.

A user identity of the social networking platform may form a social network within the social networking platform by forming social connections to other user identities of the social networking platform. In some cases, the social network of a particular user identity of a social networking platform may be defined as the group of other user identities to whom the particular user identity is directly connected. Alternatively, in other cases, the social network of a particular user identity of a social networking platform may be defined to include a group of other user identities that are within a threshold number of degrees of separation of the particular user identity. In an example, a graph or other data structure may be maintained by the social networking platform to describe the degrees of separation between a particular user identity and other user identities.

A social networking platform, commonly facilitates sharing of data and the exchange of electronic communications between user identities and other user identities who are part of their social networks. For example, a social networking platform may allow a particular user identity to access more detailed data about the other user identities who are part of the particular user identity's social network than the social networking platform allows the particular user identity to access about user identities who are not part of the particular user identity's social network. Additionally or alternatively, a social networking platform may provide communications conduits between a particular user identity and the other user identities who are part of the particular user identity's social network that the social networking platform does not otherwise provide between the particular user identity and other user identities who are not part of the particular user identity's social network.

In addition to enabling user identities to establish connections to other user identities, some social networking platforms enable user identities to establish connections with other types of objects. For example, some social networking platforms may enable user identities to record data about their hometowns, current places of residence, or places they have visited (including, e.g., geographic locations such as cities, states, or countries as well as local businesses or places such as restaurants, retail stores, parks, train or bus stations, airports, etc.) by establishing connections to location objects within the social networking platforms. Additionally or alternatively, some social networking platforms may enable user identities to record data about events to which they have been invited, are planning to attend, and/or have attended by establishing connections to event objects within the social networking platforms.

Similarly, some social networking platforms may enable user identities to record endorsements of interests, such as, for example, local businesses or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities by establishing connections to interest objects within the social networking platforms.

In some such social networking platforms, interest objects may be manifested as so-called pages that are maintained by one or more representatives of the interest objects and that, among other features, provide data about the interest objects and that provide conduits for enabling interaction between the interest objects and the user identities that have formed connections to the interest objects. Furthermore, some social networking platforms may enable user identities to establish connections with independent applications that leverage the social networking platforms, for example, by granting the independent applications authorization to access or extract data from the social networking platform on their behalf.

In some social networking platforms that enable user identities to form connections with object types like location objects, event objects, and interest objects, such location objects, event objects, and/or interest objects each may be associated with one or more representatives. Furthermore, the social networking platforms may enable these representatives to interact with the user identities to whom the objects are connected using the manifestation of the object within the social networking platform.

For example, an interest object within a social networking platform may be manifested as a "page" that provides data about the interest that the object represents, and the social networking platform may enable one or more designated representatives associated with the "page" to share data and exchange electronic communications with the user identities connected to the interest object in a manner in which such shared data or exchanged communications appear to involve the "page" as opposed to an individual user identity. In one particular example, the social networking platform may provide a mechanism that enables one or more representatives associated with the interest to broadcast an electronic message that is shared publicly with all (or some defined subset of all) of the user identities to which the interest object is connected.

For example, a social networking platform may maintain a user profile for a user identity that reflects the user identity's name, gender, age, relationship status, education history (e.g., schools attended and/or degrees awarded), employment history (e.g., employers and/or positions held), contact data (e.g., e-mail address(es), telephone number(s), other electronic addresses, physical addresses, etc.), current residence data (e.g., city, state/territory, and/or country), hometown data (e.g., city, state/territory, and/or country), primary language, and/or sexual orientation.

Additionally or alternatively, the user identity's profile also may reflect various different interests of the user identity and/or indications of various different locations that the user identity (or another user identity, such as, for example, a member of the user identity's social network) has registered with the social networking platform as locations that the user identity has visited. Such locations may include a wide variety of different types of locations, including, for example, geographic locations, such as cities, states, or countries, as well as commercial venues, businesses, or other places, such as restaurants, retail stores, parks, train or bus stations, airports, etc. For ease of reference, indications of locations registered with a social networking platform as locations that a user identity has visited may be referred to herein as "check-ins," and data stored in a user identity's profile that reflects such indications of locations registered with the social networking platform as locations that the user identity has visited may be referred to herein as "check-in data."

In an example, a social networking platform may provide a particular user identity with certain increased functionality in connection with other user identities who are members of the particular user identity's social network within the social networking platform that the social networking platform may not provide to the particular user identity in connection with user identities who are not members of the particular user identity's social network within the social networking platform. For example, a social networking platform may provide a particular user identity with one or more different mechanisms for electronically communicating or otherwise sharing content with other user identities who are members of the particular user identity's social network within the social networking platform. Furthermore, an social networking platform may allow a particular user identity to access more detailed profile data about other user identities who are members of the particular user identity's social network within the social networking platform than the social networking platform allows the particular user identity to access about user identities who are not members of the particular user identity's social network. Additionally or alternatively, a social networking platform may enable a particular user identity to access "check-ins" registered with the social networking platform by members of the particular user identity's social network within the social networking platform, while not enabling the particular user identity to access "check-ins" registered with the social networking platform by user identities who are not members of the particular user identity's social network within the social networking platform.

The connections between individual user identities within a social networking platform may be represented in the form of a graph, where user identities are represented by nodes and connections between user identities are represented by edges connecting the nodes. As new user identities join and other user identities stop using the social networking platform and/or as new connections between user identities are formed and old connections between user identities are dissolved, this graph of interconnected user identities may change dynamically in time to represent the current state of connections between user identities within the social networking platform.

In general, FIGS. 1A-1F illustrate one or more graphical user interfaces 100, 110, 120, 130, 140, 150, and 160 that can be used by a user of an application to review information pertaining to posts of one or more users of a social networking platform and/or to perform detailed analysis (e.g., either by topic/token or entity, each of which is described in more detail below) of what users within a particular segment (e.g., users sharing one or more specified demographic or psychographic characteristics) are talking about during some defined time period. As a result, users may modify business practices or perform other business activities based on insights gleaned from information presented in the user interfaces 100, 110, 120, 130, 140, 150, and 160.

Referring now to FIG. 1A, an example of a graphical user interface 100 is shown. In general, the graphical user interface 100 can present data about users of a social networking platform. In a particular example, the graphical user interface 100 can present data indicate of a user segment (e.g., types of users) of a social networking platform. In this particular example, one or more segments can be defined by a user of an application that presents the graphical user interface 100. The user may define the one or more segments by specifying one or more characteristics (e.g., gender, nationality, age, topics being posted by the one or more segments, and so forth).

The graphical user interface 100 provides a large amount of data indicative of the user segment in a manner that enables a viewer of the data to intuitively understand the data and to use that understanding to perhaps make better business decisions (or other decisions related to the user's specific intent). For example, the graphical user interface 100 may include a number of different graphical regions 102, 104, 106, 108, 110, 112, 114, and 116 that present a number of graphical representations. As shown in this example, these representations include text, charts, bar graphs, lists, and other graphics, although other representations are possible. In general, these representations are designed to convey certain data at a glance yet convey that data in a way that allows a user to quickly gauge, for example, various characteristics about a particular user segment that is being considered (e.g., after the user provides a definition of the particular user segment).

Furthermore, the graphical user interface 100 enables a user to modify a level of detail with respect to the information being presenting. For example, the user the user may be presented with more specific data representations as the user wishes. For example, a user can select a representation of data presented in the user interface 100 and be presented with a more detailed breakdown of the selected aspect. Certain example breakdowns are shown with respect to FIGS. 1B-1F, although other breakdowns of other data indicative of the users in the user segment who are posting about a particular topic are also possible.

As described above, the graphical user interface 100 includes a graphical region 102. The graphical region 102 can be used by a user of an application to select one or more characteristics of a type of user for which the user of the application would like to see data. In the illustrated example, graphical region 102 may be subdivided into one or more categories of the various characteristics. For example, the graphical region 102 may include a "gender" category that allows the user of the application to specify the gender characteristic of the user segment.

As another example, the graphical region 102 may include a "country" category that allows the user of the application to specify the home country characteristic of the user segment. In some examples, when a category is selected, the graphical region 102 is expanded to allow selection of one or more relevant choices. For example, when the "gender" category is selected, the graphical region 102 may be expanded to show "male" and "female" options. In addition, or alternatively, a separate pop-up or other graphical user interface component may be presented to the user of the application, enabling the user of the application to select the options that specify a particular user segment. Once a selection is made, the application may communicate this selection to a server system that may provide data related to the selection (e.g., the data shown in the various graphical regions 104, 106, 108, 110, 112, and 114).

In some examples, updates to the graphical user interface 100 may occur in near real-time. For example, a user can make a first selection of one or more categories using the graphical region 102. In response, a server system may transmit, to a client device that is executing the application, updated data in accordance with the selection. Then, when the user of the application selects additional characteristics or removes characteristics from those selected, the application may communicate a change in the selection(s) to the server system. In response, the server system may transmit new or different data in accordance with the selection. As a result, the user of the application can make a selection of user characteristics and can subsequently make one or more immediate modifications to the characteristics to refine the specific user segment that the user of the application is interested in analyzing.

Graphical region 104 presents data indicative of a general overview of the selected user segment. In one example, the data indicative of the general overview may include the number of users included in the user segment, an average number of social connections (or friends) for users included in the user segment, the number of cities from which the users included in the user segment live, and other data. As described elsewhere in the specification, the data presented in the graphical region 104 may be determined from user data of the one or more social networking platforms which the server system may access. The server system and its interactions with the social networking platform are described in more detail below.

Graphical region 106 may present data indicative of demographic data about the selected user segment. In a particular example, the graphical region 106 includes a representation 106a of a breakdown of the ages of users included in the user segment. In an example, the breakdown shown by representation 106a can be determined from demographic data included in the user data of the social networking platform that is associated with the users included in the user segment. As an example, user data for a particular user may include a birthday or other indication of age (such as a number that reflects how hold the user is). When a particular user is identified as belonging to the user segment, the age of the particular user can be added by the server system to a collection of anonymous demographic data (including the age) that describes the users included in the user segment. Then, the server system can provide this anonymous demographic data to a computing device executing the application. For example, the server system can provide an average of the user segment using the collected ages and performing an averaging operation over those collected ages.

In another particular example, the graphical region 106 includes a representation 106b of a happiness index for posts generated by the user segment. In an example, the happiness index is indicative of a level of happiness or unhappiness with respect to the user segment. In a particular example, the representation 106b indicates that the user segment is seventy percent happy. In an example, the representation 106b may also include a graphical indicator of the happiness index. In a particular example, because the happiness index is seventy percent happy, the representation 106b may include a smiley face to indicate a generally happy user segment. In general, the happiness index can be based on a one or more determined sentiment scores for posts generated by users in the user segment and/or words and phrases included in those posts. Techniques for determining the happiness index is described elsewhere in this specification.

In another particular example, the graphical region 106 may include a representation 106c of a breakdown of the relationship statuses for the users included in the user segment. In an example, the breakdown shown by representation 106c can be determined from demographic data included in the user data of the social networking platform that is associated with the users included in the user segment. As an example, user data for a particular user may include a relationship status. When a particular user is identified as belonging to the user segment, the relationship status of the particular user can be added by the server system to a collection of anonymous demographic data (including the relationship status) that describes the users included in the user segment. Then, the server system can provide this anonymous demographic data to a computing device executing the application. For example, the server system can provide a most common relationship status of the user segment (and a corresponding percentage of users in the user segment that have the most common relationship status) using the collected relationship statuses and determining which relationship status occurs with the highest frequency relative to the other relationship statuses. In the particular example illustrated in FIG. 1A, the most common relationship status for the particular user segment is "married."

In another particular example, the graphical region 106 may include a representation 106d of a breakdown of the education levels for the users included in the user segment. In an example, the breakdown shown by representation 106d can be determined from demographic data included in the user data of the social networking platform that is associated with the users included in the user segment. As an example, user data for a particular user may include an indication of education levels (e.g., the one or more names of schools attended or an explicit description of the level of education attained, or both). When a particular user is identified as belonging to the user segment, the education level of the particular user can be added by the server system to a collection of anonymous demographic data (including the education level) that describes the users included in the user segment. Then, the server system can provide this anonymous demographic data to a computing device executing the application. For example, the server system can provide a most common education level of the user segment (and a corresponding percentage of users in the user segment that have the most common education level) using the collected education levels and determining which education level occurs with the highest frequency relative to the other education levels. In the particular example illustrated in FIG. 1A, the most common relationship status for the particular user segment is "College."

In another particular example, the graphical region 106 may include a representation 106e of a breakdown of the type of area (e.g., rural, urban, and so forth) in which the users included in the user segment live. In an example, the breakdown shown by representation 106e can be determined from demographic data included in the user data of the social networking platform that is associated with the users included in the user segment. As an example, user data for a particular user may include an indication of a type of area in which the user lives (e.g., an address that specifies an area in which the user lives, an explicit description of the surrounding area in which the user lives, or both). When a particular user is identified as belonging to the user segment, the type of area of the particular user can be added by the server system to a collection of anonymous demographic data (including the type of area in which the user lives) that describes the users included in the user segment. Then, the server system can provide this anonymous demographic data to a computing device executing the application. For example, the server system can provide a most common type of area of the user segment (and a corresponding percentage of users in the user segment that live in the most common type of area) using the collected types of area and determining which type of area occurs with the highest frequency relative to the other types of area. In the particular example illustrated in FIG. 1A, the most common type of area for the particular user segment is "Urban."

In another particular example, the graphical region 106 may include a representation 106f of a breakdown of the gender for the users included in the user segment. In an example, the breakdown shown by representation 106*f* can be determined from demographic data included in the user data of the social networking platform that is associated with the users included in the user segment. As an example, user data for a particular user may include an indication of gender (e.g., the user data may specify whether a particular user is male or female). When a particular user is identified as belonging to the user segment, the gender of the particular user can be added by the server system to a collection of anonymous demographic data (including the gender) that describes the users included in the user segment. Then, the server system can provide this anonymous demographic data to a computing device executing the application. For example, the server system can provide a gender breakdown showing a percentage of men in the user segment and a percentage of women in the user segment. In the particular example illustrated in FIG. 1A, the particular user segment includes forty-eight percent women and fifty-two percent men.

In another example, the graphical region 106 may include a representation 106*g* of a name or identifier associated with the graphical region 106. In a particular example, representation 106*g* is a user-selectable text field "demographics." In response to user selection, the application may cause additional data to be presented about the selection. In this example, when a user selects a user-selectable text field, the graphical user interface may present data as shown in graphical user interface 200 described below in reference to FIG. 2A. Although other graphical user interfaces and data presentations are also possible.

In another example, a graphical region (e.g., the graphical region 108 mentioned above) may include one or more interests for the users included in the user segment. These interests may be categorized according to one or more predefined categories of interests. In one example, the categories may include an overall category 108*a*, a movies category 108*b*, a sports category 108*c*, a music category 108*d*, and a companies/products category 108*e*. Each of the categories 108*a*, 108*b*, 108*c*, 108*d*, and 108*e* may be presented as a list of one or more top topics or entities associated with a particular category. For example, with respect to category 108*b*, the top overall topic in the "Movies" category is shown to be "Megan Fox" for the particular user segment. In an example, one or more of the items shown in the one or more categories 108*a*, 108*b*, 108*c*, 108*d*, and 108*e* can be selected by the user of the application. In this example, if a user selects one of the items in the category 108*a*, the application may cause additional data to be presented about the selection. In an example, the data presented in the graphical region 108 may be identified in the user data as endorsements (e.g., "likes") for the users included in the user segment. In this example, a frequency of endorsements by members of the particular user segment for various topics and entities can be determined and the top topics or entities having an increased frequency of endorsements in the user data relative to other frequencies of endorsements for topics and/or entities can be shown in respective categories of the graphical region 108.

In an example, the graphical region 110 may also include other demographic data about the user segment. This other demographic data may be categorized according to one or more categories. In one example, the other demographic data may be categorized into a metro areas category 110*a*, a countries category 110*b*, a language category 110*c*, and a places category 110*d*. In an example, the data presented in the graphical region 110 may be identified in the user data as either demographic data (e.g., one or more languages identified in the user data for the users included in the user segment) or as one or more affirmative actions performed by the users included in the user segment. As a particular example, with respect to the places category 110*d*, "check-ins" can be identified in the user data for one or more types of venues (e.g., libraries, airports, shopping centers, and other venues such as particular business locations). In this example, a frequency of "check-ins" performed by members of the particular user segment for the various types of venues can be determined and the venues with the highest frequency of "check-ins" in the user data can be shown in the places category 110*d*. In general, a "check-in" is an operation performed by a user of the social networking platform indicating that the user has visited a location or other venue that is registered with the social networking platform.

In another example, the graphical region 112 may include employment data about the user segment. This employment data may be categorized according to one or more categories. In one example, the employment data may be categorized according to an average income category 112*a*, an industry category 112*b*, a related employers category 112*c* and a job level category 112*d*. The data presented in the graphical region 112 may be determined or otherwise identified according to various techniques that use the user data of the social networking platform. Some of these techniques are described in more detail below.

In an example, the graphical region 114 may include psychographic data and score data (e.g., affluence scores, influence scores, and popularity scores) about the user segment. This psychographic data and score data may be categorized according to one or more categories. In one example, the psychographic data may be categorized according to a psychographic profile category 118*a*, an affluence score category 118*b*, an influence score category 114*c*, and a popularity score category 114*d*. In a particular example, the psychographic profile category 118*a* presents one or more top psychographic profiles for the user segment. In another particular example, the score categories 114*b*, 114*c*, and 114*d* present a representation of the affluence, influence, and popularity, respectively, of the user segment on the social networking platform. The data presented in the graphical region 114 may be determined or otherwise identified according to various techniques that use the user data of the social networking platform, for example, as described in more detail below.

In an example, the graphical region 116 provides one or more icons that allow a user to navigate to additional data about a particular aspect of the user segment. In an example, the graphical region 116 includes a dashboard icon 116*a*, a demographic icon 116*b*, an interests icon 116*c*, a places icon 116*d*, a text analytics icon 116*e*, a psychographic data icon 116*f* an employment icon 116*g*, and a scores icon 116*h*. When any of these icons 116*a*, 116*b*, 116*c*, 116*d*, 116*e*, 116*f*, 116*g*, or 116*h* are selected by a user, it may cause the application to show additional data about the selected aspect in another graphical user interface. A user may cause the application to present various other graphical user interfaces to the user of the application by selecting either an aspect of the graphical regions 106, 108, 110, 112, or 114 or one of the icons 116*a*, 116*b*, 116*c*, 116*d*, 116*e*, 116*f*, 116*g*, or 116*h*.

In an example, the demographics icon 116*b* may be selected to cause the application to display the graphical user interface shown in FIG. 2A. Similarly, if a portion of the graphic region 106 is selected (e.g., by selecting the "Demographics" region 106*g* of the graphic region 106), the application may also show the graphical user interface shown in FIG. 2A. As another example, the icon 116*e* may be selected to cause the application to show one or more of the graphical user interfaces shown in FIG. 1B, 1C, 1D, 1E, or 1F.

FIGS. 1B, 1C, 1D, 1E, and 1F illustrate examples of graphical user interfaces 120, 130, 140, 150 and 160, respectively, for an example of an application that presents data indicative of elements pertaining to one or more analyses of one or more posts generated by one or more users include in an identified user segment. In an example, one or more of the graphical user interfaces 120, 130, 140, 150, and 160 may be presented in response to receiving user input. For example, graphical user interface 120 may be shown in response to receiving user input indicative of a selection of icon 116e. In general, the data represented in the graphical user interfaces 120, 130, 140, 150, and 160 may be initially presented as pertaining to a default period of time. In a particular example, the data represented is from seven days prior to a current date. In some implementations, the period of time in which the data is presented can be further controlled by a selection of a time period in the time period region 124. In a particular example, the time period region 124 includes a slider or other user interface component that is responsive to user input and enabling a user to provide a selection of a particular time period. In some implementations, a text field, such as text field 125 may be presented to show data indicative of the selected time period.

Figure 1B:
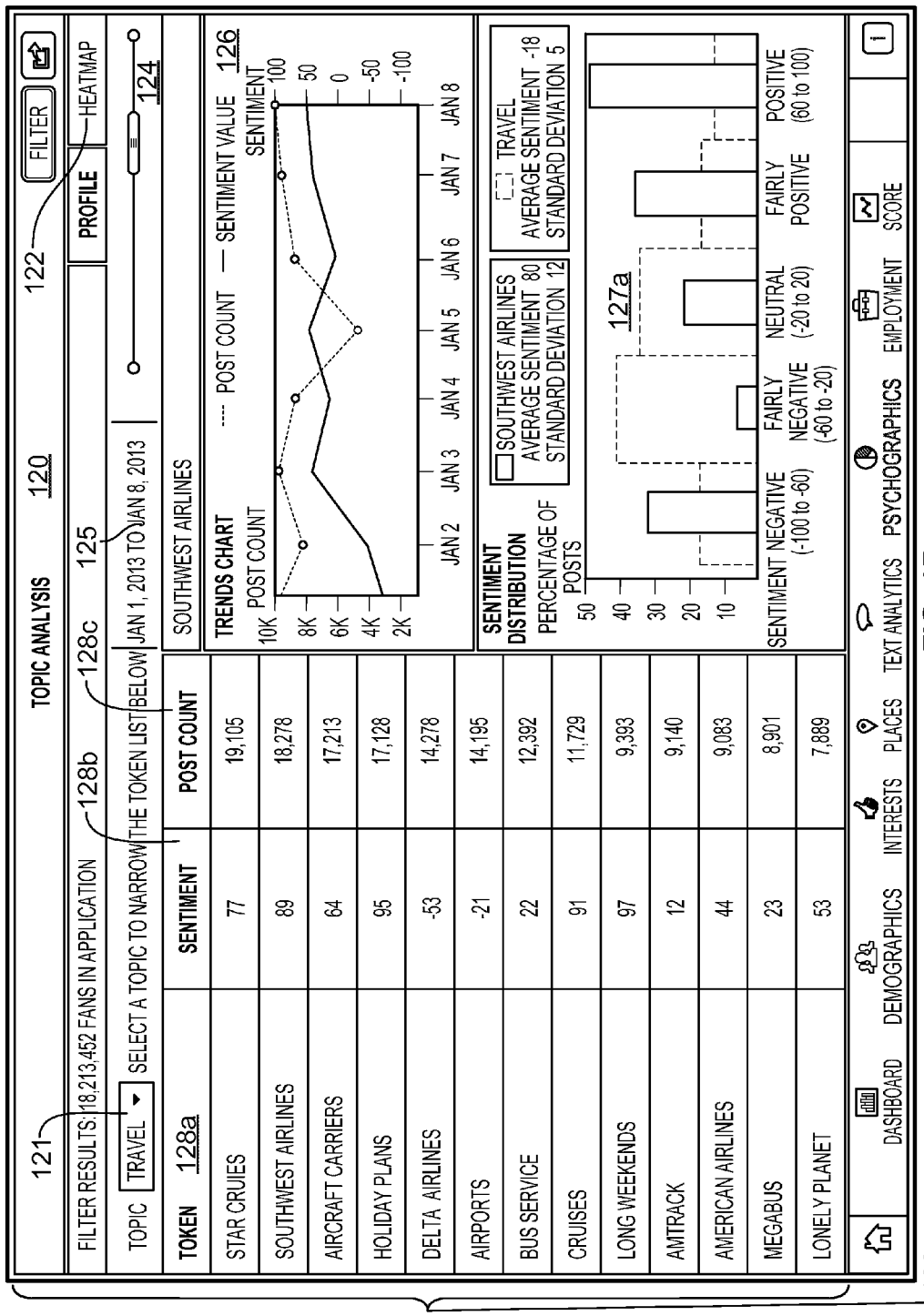
FIGS. 1B-1F illustrate examples of graphical user interfaces for an example of an application that presents data indicative of elements pertaining to topics of interest.

Referring now to FIG. 1B, in general, graphical user interface 120 shows data pertaining to one or more identified topics in the one or more posts generated by the one or more users in the identified user segment. In an example, posts generated by the user segment can be analyzed to identify one or more topics of the one or more posts. These posts can be further analyzed based on the one or more tokens that appear with a greatest relative frequency for each of the identified topics. As a result of the analysis, the one or more identified tokens are then presented in the graphical user interface 120. In the depicted example, data pertaining to a travel topic is presented in the graphical user interface 120, although other topics may also be presented in the graphical user interface 120. In an example, the graphical user interface 120 includes a filter control 121, a heatmap graphical component 122, a time period region 124, a token trend data region 126, a token sentiment distribution region 127 and a token list region 128.

The heatmap graphical component 122 may be a user selectable component that allows a user to change data views. In an example, when a user presses or otherwise selects the heatmap graphical component 122, the application may present a heatmap. In a particular example, the heatmap to be displayed illustrates a number of posts pertaining to different topics and corresponding sentiments, e.g., as shown in a graphical user interface 140 as shown in FIG. 1D.

In an example, the filter control 121 allows a user to select an identified topic of interest to filter or otherwise modify the tokens displayed in the token list region 128. In a particular example, a travel topic has been selected. As a result, one or more tokens are presented in the list region 128, where the tokens were identified as appearing with a greatest relative frequency in posts there were identified to pertain to the travel topic. In a particular example, posts that contain terms indicative of travel may be identified in the posts to categorize the particular ports as pertaining to travel.

In an example, the list region 128 provides a listing of one or more tokens that correspond to the selected filtering criteria selected in the filter control 121. In an example, the list region 128 is a tabular representation that includes a column 128a for the token names, a column 128b for sentiment scores of the tokens, and a column 128c for a post counts for the tokens. If, for example, a user selects one of the tokens in the list region 128, trend data region 126 and sentiment distribution region 127 may be populated with relevant trend data and sentiment distribution data, respectively. Trend data and sentiment distribution data are described in more detail below. In a particular example, a user may select the "Southwest Airlines" token to populate the trend data region 126 and sentiment distribution region 127.

For example, responsive to selection of the token "Southwest Airlines," the trend data region 126 is updated to present data about trends in the number of posts including the token "Southwest Airlines" (solid line) and the average sentiment value for posts including the token "Southwest Airlines" (dashed line) over time. As described above, a slider control in the time period region 124 may be provided that enables the user to configure the time period for which the sentiment and post count trends are displayed. Such an approach may enable the user to identify specific dates/time periods during which significant peaks (or valleys) in the post count and/or sentiment trends for the selected token occurred, providing the user with the ability to investigate what events may have occurred to cause such peaks (or valleys).

In addition, in this example, the application also displays data about the sentiment scores of posts that included the token "Southwest Airlines" relative to the sentiment scores of posts determined to pertain to the topic "Travel" in the sentiment distribution region 127. In general, the information in the sentiment distribution region 127 is presented for some defined period of time. In an example, the distribution region 127 region can present data in a period of time according to a time period selected using the slider control in the time period region 124. As another example, the distribution region 127 can present data for the past seven days from a current time period. In a particular example, to present data about the sentiment scores, the application plots a histogram 127a according to data received from the server system that shows the distribution of sentiment scores for posts determined to pertain to the topic "Travel" that include the token "Southwest Airlines" and the distribution of sentiment scores for posts determined to pertain to the topic "Travel" more generally. Presenting such a histogram 127a may enable a user to gauge users' sentiments for "Southwest Airlines" relative to users' sentiments related to other travel-related subjects, or travel more generally.

Figure 1C:
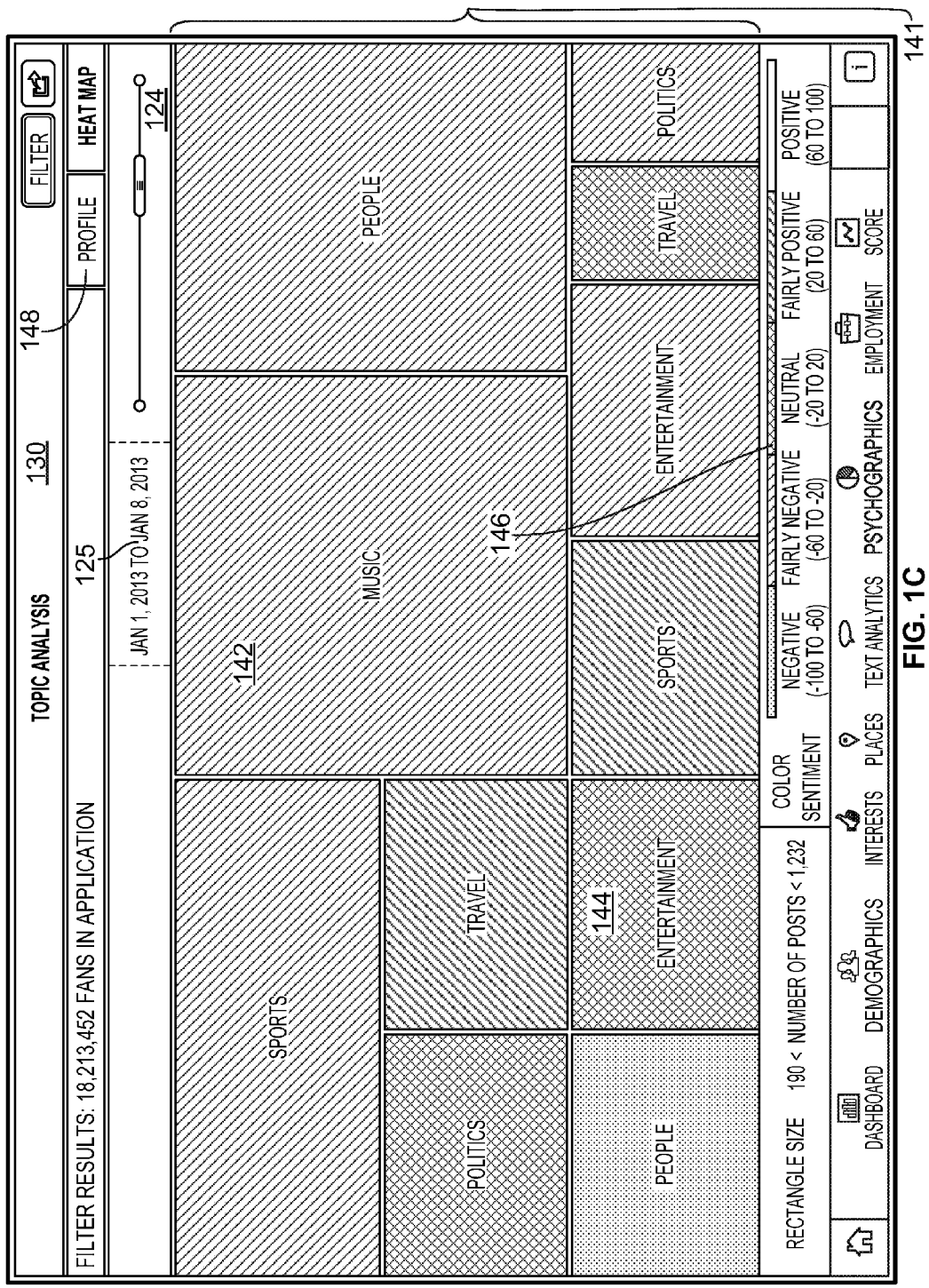
Figure 1D:
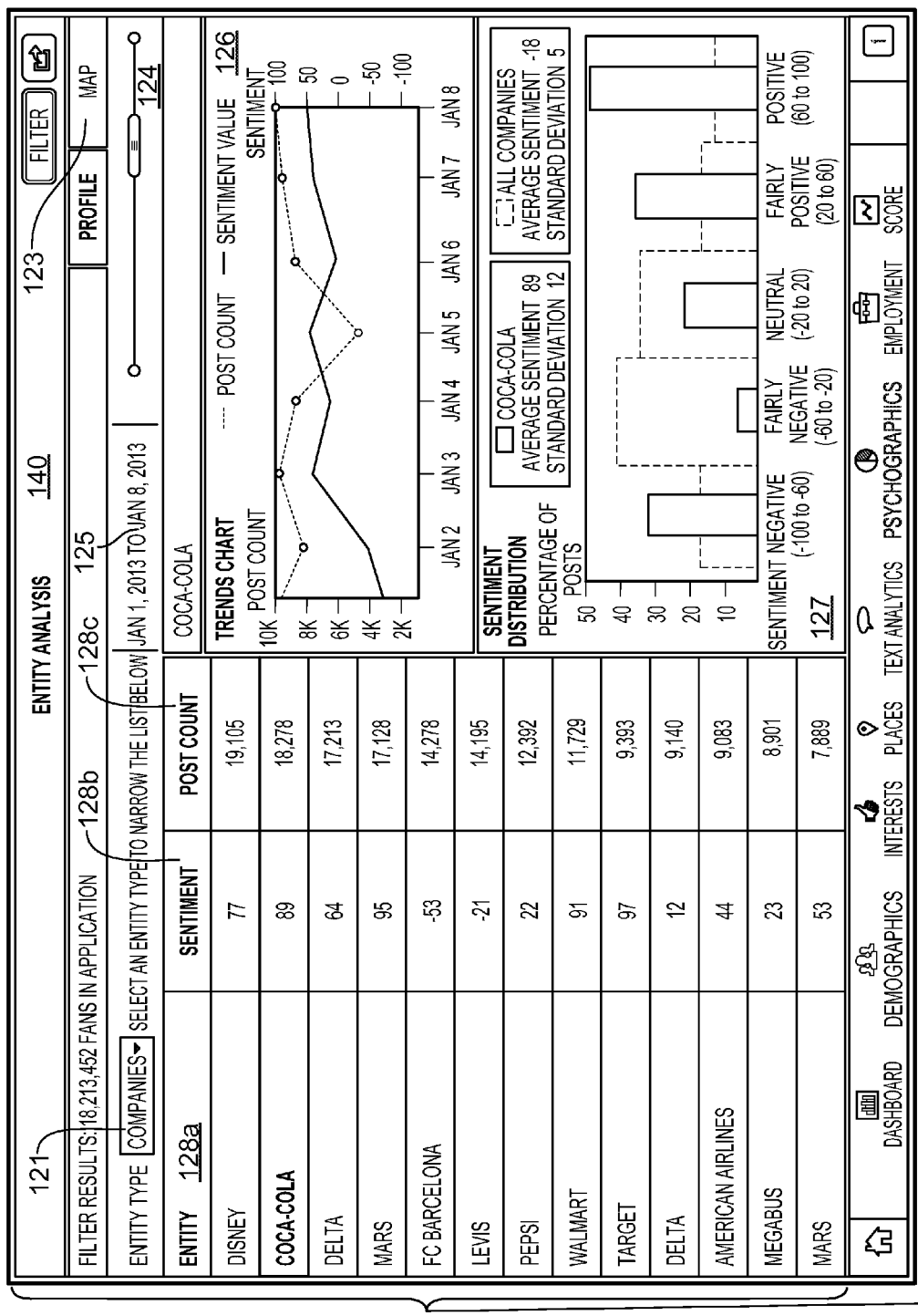
Figure 1E:
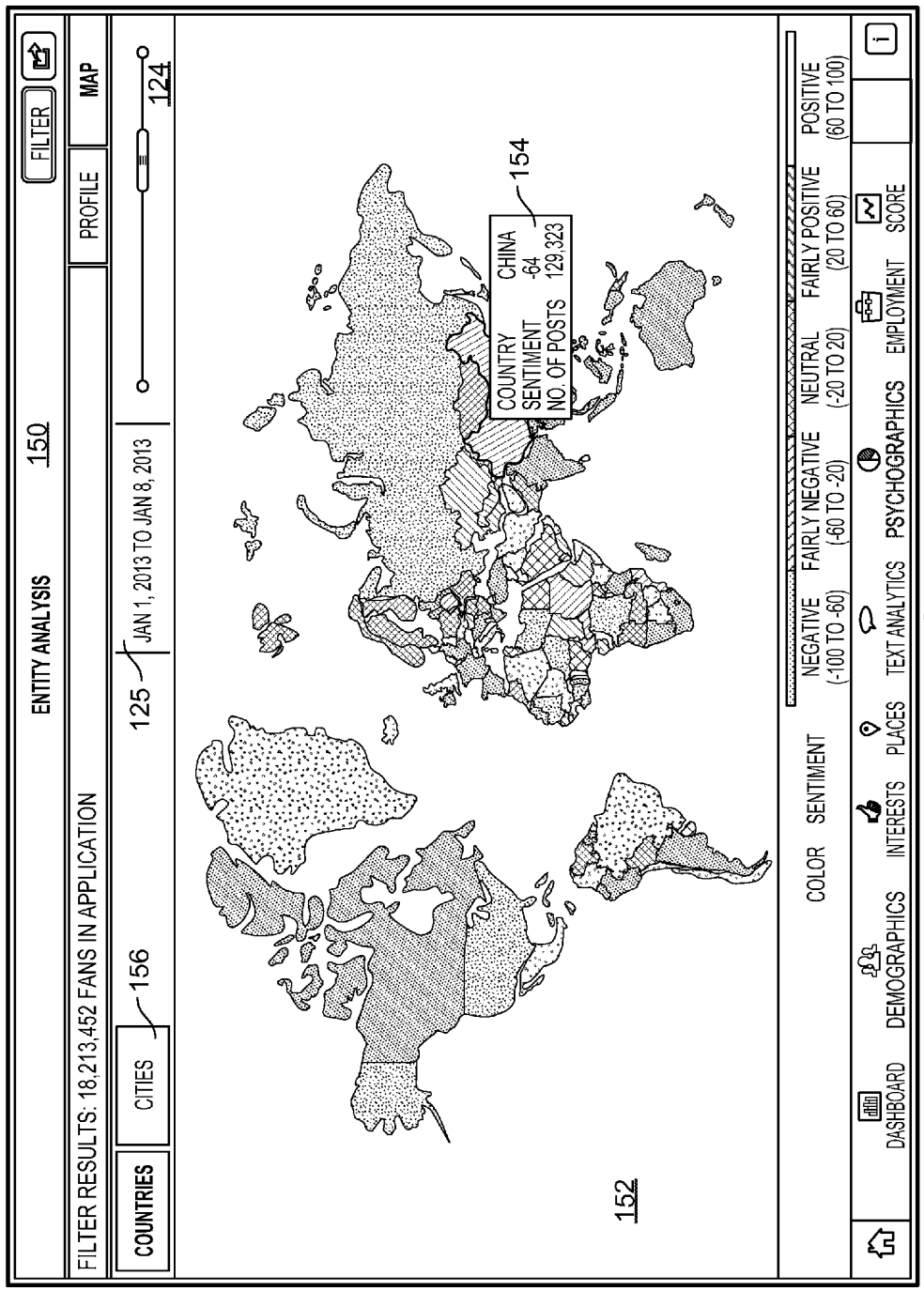

Referring now to FIG. 1C, a graphical user interface 130 is shown that presents data indicative of one or more topics of interest represented by a heatmap presented in a heatmap region 141. In general, a heatmap presents data graphically based on shape and color of one or more regions within the heatmap. In a particular example, the heatmap can be used to present data graphically for a defined time period, such as seven days, or any other defined time period that can be defined using a control in the time period region 124. In such a representation, a number of posts for a particular topic may be represented by a size of a geometric shape (such as a rectangle), and the shading of the shape may reflect a sentiment score for the topic of interest and for a particular user segment. In one example, the larger the geometric shape, the more posts for a particular topic. In another example, the darker the color (or shading), the higher the sentiment score for the particular topic.

In a particular example, portion 142 of heatmap region 141 is larger than portion 144. Thus, portion 142 reflects more posts in the user data for the particular user segment during a selected period of time. In addition, the portion represented by portion 142 is shaded in such a way as to indicate a higher sentiment score than the sentiment score indicated by the shading of portion 144 (e.g., as shown by the sentiment score key). As described above, a slider control in the time period region 124 may be provided that enables the user to configure the time period for which the sentiment and post count trends are displayed.

Referring now to FIG. 1D, a graphical user interface 140 is shown. The graphical user interface 130 includes a number of the same regions and components as described in relation to the graphical user interface 120 shown in FIG. 1B. In an example, the graphical user interface 130 includes a filter control 121, a map graphical component 123, a time period region 124, a trend data region 126, a sentiment distribution region 127 and a list region 128. These regions and components operate using similar principles to those described above. In one example, the graphical user interface 130 presents data related to particular entities that are identified to have a highest relative frequency in one or more posts generated by one or more users in the identified user segment. In general, an entity is an abstraction of one or more tokens. For example, the stock symbol "KO," the term "Coca-Cola" and the term "Coke" may all be considered to be associated with the same entity (e.g., the entity COCA-COLA). In contrast, the stock symbol "KO," the term "Coca-Cola," and the term "Coke" would be considered separate or different tokens. In an example, if a user selects map graphical component 123, a graphical interface, such as graphical interface 150 shown in FIG. 1E may be presented to a user (and in some implementations, a graphical user interface 150 may also be presented to a user if a user selects a similar map graphical component (not shown) when a user selects one of the tokens presented in the list region 128 (FIG. 1B)). Such a graphical user interface may present post counts and sentiment scores for a particular entity organized by country, as is described in more detail below.

Because the graphical user interface 130 presents data indicative of entities instead of tokens, the filter control 121 enables a user to filter the entities by entity type. In some implementations, one or more entities may be predefined and can be mapped to predefined categories. In the depicted example of FIG. 1D, the entity type selected in the filter control 121 is the predefined entity type "Companies." Responsive to this selection, the application presents a listing of top companies in the list region 128. In some implementations, the top companies can be determined based on a greatest relatively frequency of one or more terms (e.g., tokens) in the one or more posts generated by one or more users of the user segment. In a particular example, the tokens correspond to one or more entities that belong to the predefined entity type "Companies" and the entities with the highest relative frequency that belong to the entity type "Companies" can be presented in the list region 128. In an example, if a user selects the Coca-Cola Company in the list region 128, trend data region 126 and sentiment distribution region 127 may be populated.

For example, responsive to selection of the entity COCA-COLA the trend data region 126 can present data about trends in the number of posts including the entity COCA-COLA (solid line) and the average sentiment value for posts including the entity COCA-COLA (dashed line) over time. As described above, a slider control in the time period region 124 is provided that enables the user to configure the time period for which the sentiment and post count trends are displayed.

Such an approach may enable the user to identify specific dates/time periods during which significant peaks (or valleys) in the post count including the selected entity and/or sentiment trends related to the selected entity occurred, providing the user with the ability to investigate what events may have occurred to cause such peaks (or valleys). In addition, in this example, the application also displays data about the sentiment scores of particular entities that appear in posts relative to the sentiment scores of other entities in those posts that are determined to pertain to the entity type "Companies." In particular, the application plots a histogram according to data received from the server system that shows the distribution of sentiment scores for the entity COCA-COLA that are included in posts generated by the selected user segment and the distribution of sentiment scores for other entities included in those same posts that are determined to pertain to the entity type "Companies." Presenting such a histogram may enable a user to gauge users' sentiments for the entity COCA-COLA relative to users' sentiments related to other types of companies. Referring now to 1E, a graphical user interface 150 is shown that presents data indicative of one or more entities based on one or more posts generated by users in the selected user segment and according to the one or more countries in which the users in the user segment reside. In an example, the graphical user interface 150 includes a map region 152 and a cities graphical component 156. In general, the map presented in the map region 152 shows sentiment scores that pertain to a particular entity (e.g., the entity COCA-COLA shown in FIG. 1D) for one or more countries (e.g., as shown by the shading of the countries in the map region 152). In an example, responsive to selection of a particular country, the application may present the country's name, the average sentiment score for the entity during a defined time period for posts from users who reside in the country, and the number of posts that pertain to the entity from users who reside in the country in a pop-up box 154.

As described above, a slider control in the time period region 124 may be provided that enables the user to configure the time period for which the sentiment and post count data are displayed. In an example, the cities graphical component 156 is selectable and enables a user to switch views. In a particular example, if the user selects the cities graphical component 156, the application presents the graphical user interface 160 shown in FIG. 1F.

Figure 1F:
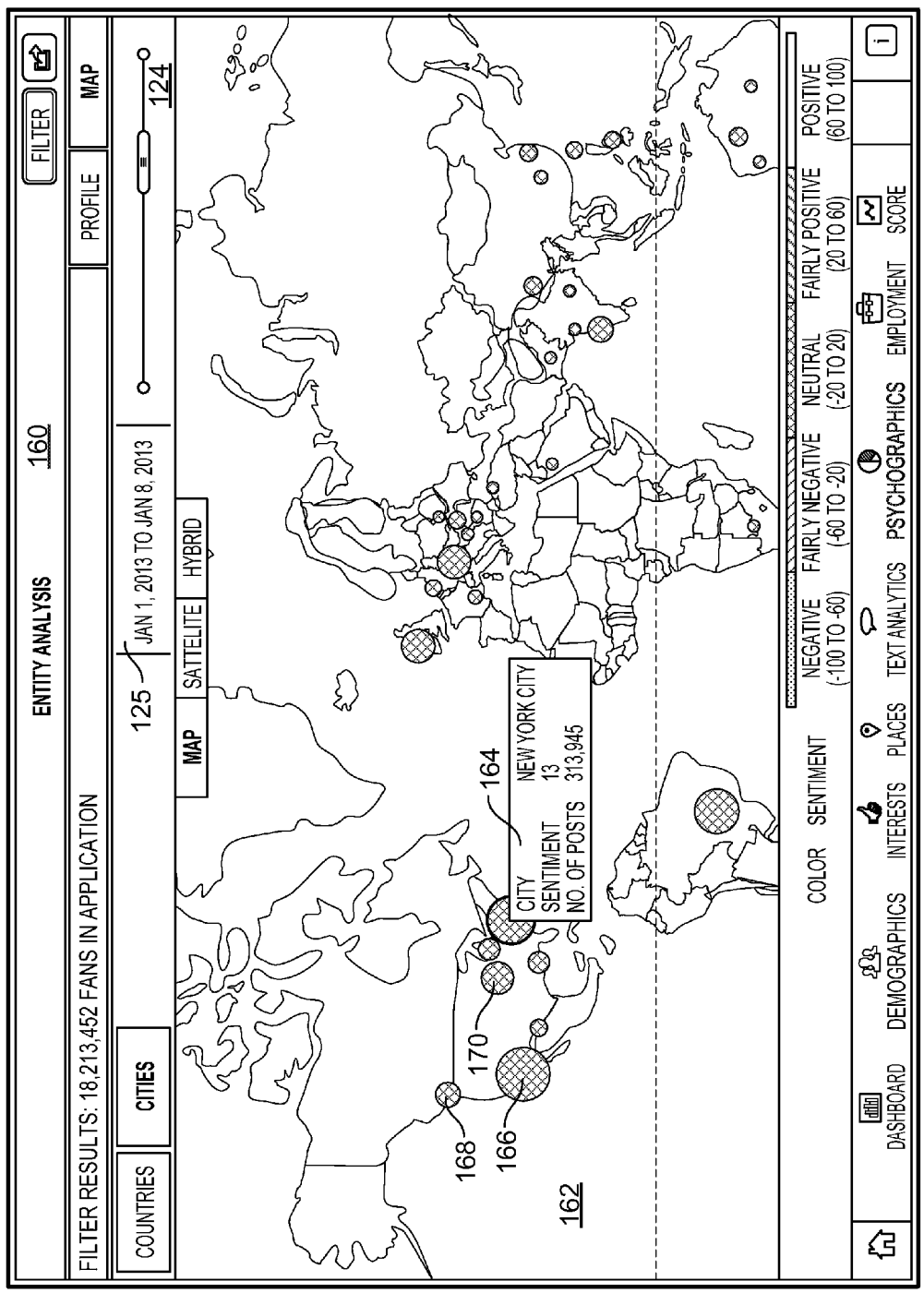

Referring now to FIG. 1F, a graphical user interface 160 is shown that presents data indicative of one or more entities based on one or more posts generated by users in the selected user segment and according to the one or more cities in which the users in the user segment reside. In this example, the graphical user interface includes the map region 162. The application may present post counts and sentiment scores for a particular entity (e.g., the entity COCA-COLA shown in FIG. 1D) according to a post count and determined sentiment scores for the particular entity by users that belong in the selected user segment and who reside in a particular city. Similar to the heatmap described above in FIG. 1C, the size of circles 166, 168, 170 in map region 162 may represent a number of posts pertaining to a particular entity that are generated during a defined time period and by users that belong to the selected user segment and a shading may represent an average sentiment score for the particular entity during a defined time period for posts from users in the selected user segment that reside in the particular city. In some examples, responsive to user selection of a particular city, the application may present a pop-up box 164 or some other user interface component that presents the city's name, a number of posts, and a sentiment score for those posts from users who belong to the user segment who reside in the selected city that pertain to the particular entity.

FIGS. 2A, 2B, 2C, and 2D illustrate examples of graphical user interfaces 200, 210, 220, and 230 for an example of an application that presents anonymous demographic data and psychographic data pertaining to users who are posting about one or more tokens or entities. In general, FIGS. 2A-2D, show different instances of a user performing an analysis of a user segment based on an identified token or entity. In some implementations, this may be in response to a user providing a search string. For example, a user may provide a string "Coca-Cola" into a search region of graphical region 102 (FIG. 1A) to obtain information about users in a user segment that are positing about the entity COCA-COLA (or the token "Coca-Cola," according to particular implementations and/or user selections). This may be in contrast to what is shown in FIGS. 1A-1E, e.g., the analysis of one or more tokens or entities based on a selected user segment.

For example, the graphical user interface 200 presents one or more top countries based on a percentage of users in the user segment that live in the particular country (and who are posting about a particular token or entity). In addition, in a particular example, both a percentage of users and a value corresponding to a number of users that belong to the user segment and living in a particular country (and who are posting about a particular token or entity) can be shown.

This more detailed analysis using graphical user interface 200 may help provide a different perspective regarding particular insights gleaned from looking at information shown in reference to FIGS. 1A-1F. For example, a user of the application may first view information presented in FIGS. 1A-1F to ascertain particular information about a particular user segment. A user of the application may also be interested reviewing information regarding particular tokens or entities with regard to a selected user segment, e.g., as presented in reference to FIGS. 2A-2D.

Figure 2B:
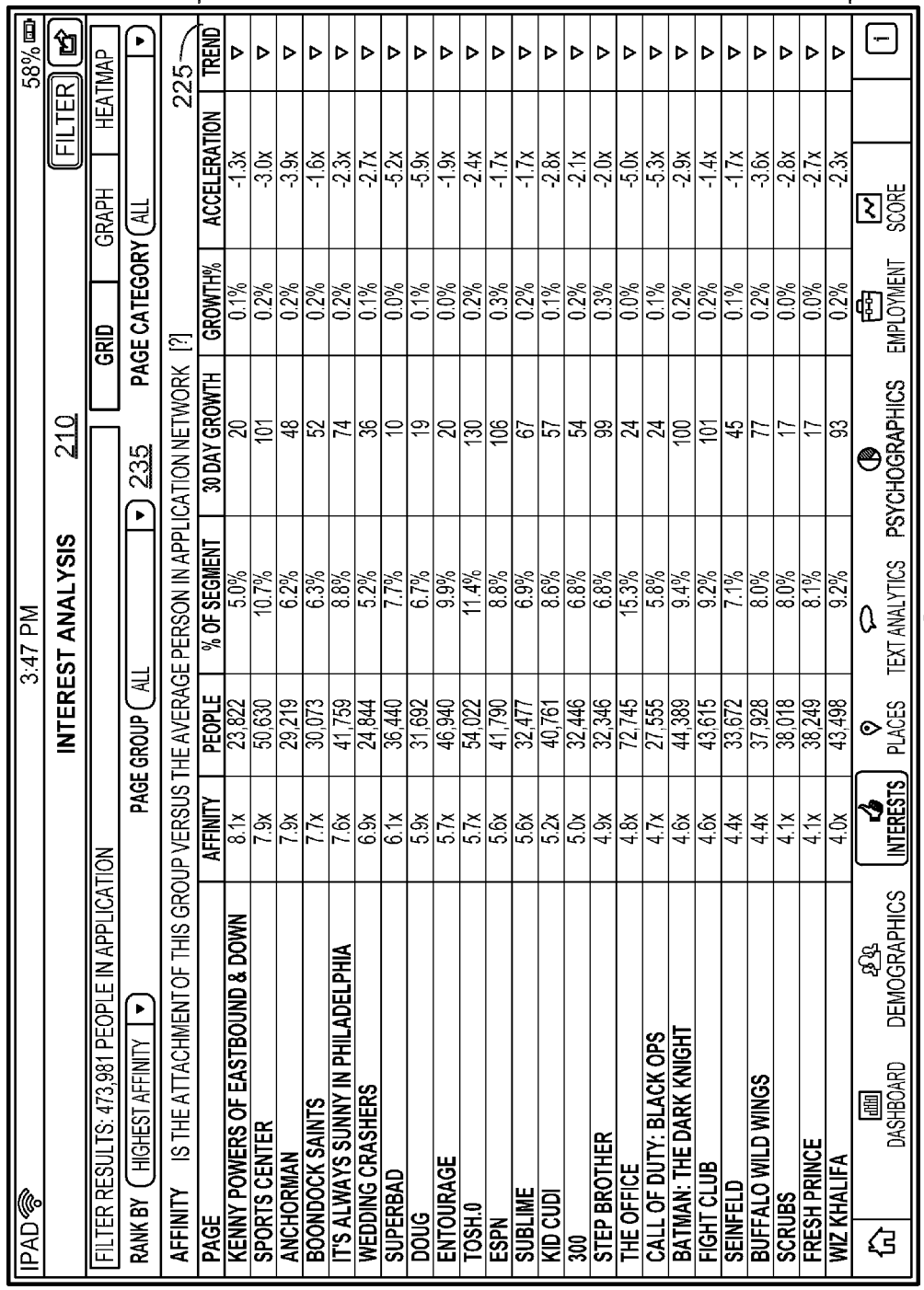
Figure 2D:
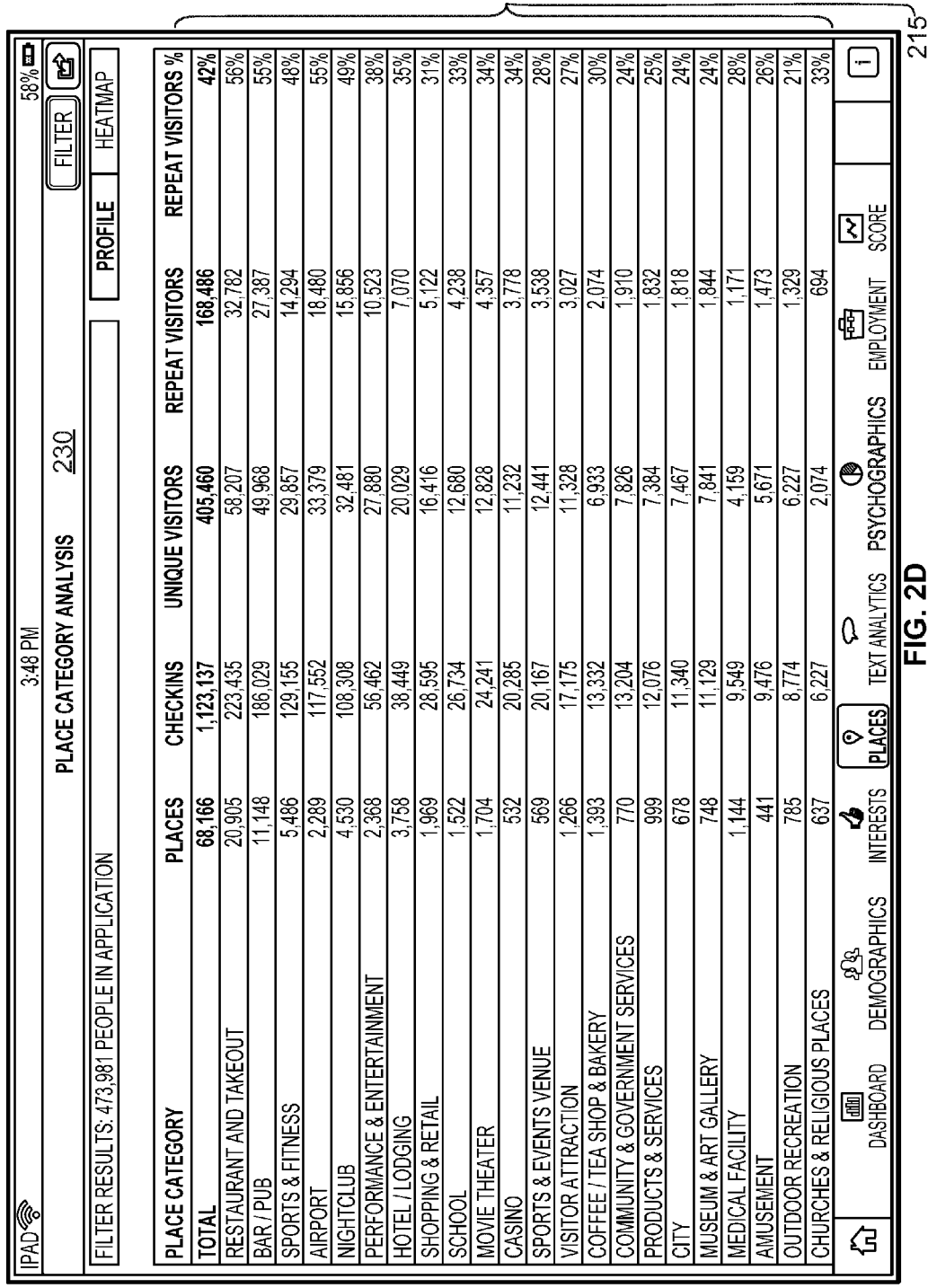

In a similar fashion, the graphical user interfaces 210, 220, and 230 as shown in FIGS. 2B, 2C, and 2D, respectively, show additional data associated with one or more interests, places, and categories of places, respectively. In general, these additional views present data in a similar way. That is, the graphical user interfaces 210, 220, and 230 present data in a tabular region 215. In some implementations, the tabular region may include representations of trend data. For example, in reference to FIG. 2B and FIG. 2C, graphical user interfaces 210 and 220 include a region (such as column 225) that presents up arrows to represent items that are trending up (e.g., becoming more popular) and down arrows to represent items are trending down (e.g., becoming less popular).

In an example, the graphical user interfaces 210 and 220 may also include a filter area 235. In one example, the filter area enables a user to select one or more filtering criteria that is subsequently reflected in the data presented in the tabular region 215. Referring to FIG. 2C, if a user selects "Growth" in the pull-down 235a, the application may cause the user interface 220 to change. In this example, the user interface 220 may change into user interface 230 to present data about one or more places based on the type of location or a growth characteristic for specific elements presented in the graphical user interface 220.

Referring in particular to FIG. 2B, one or more interests of users who are positing about the specific token or entity can be presented in the tabular region 215. In some implementations, the interests can be identified according to one or more page likes performed by one or more users of the social networking platform. Page likes are described in more detail elsewhere in this specification.

Referring in particular to FIG. 2C, one or more venues or places where users are posting about the specific token or entity can be presented in the tabular region 215. In some implementations, the venue or places where users are posting can be determined based on where users of the social networking platform are performing check-in operations. Check-ins operations are described in more detail elsewhere in this specification.

Referring in particular to FIG. 2D, one or more categories of venues or places where users are posting about the specific token or entity can be presented in the tabular region 215. In some implementations, the venues or places where users are posting can be determined based on where users of the social networking platform are performing check-in operations. Then these particular venues or places can be compared to predetermined categories to determine which of the categories is appropriate. As a result of the determination, relevant posting information can be associated with the appropriate category of venue or place.

Figure 3A:
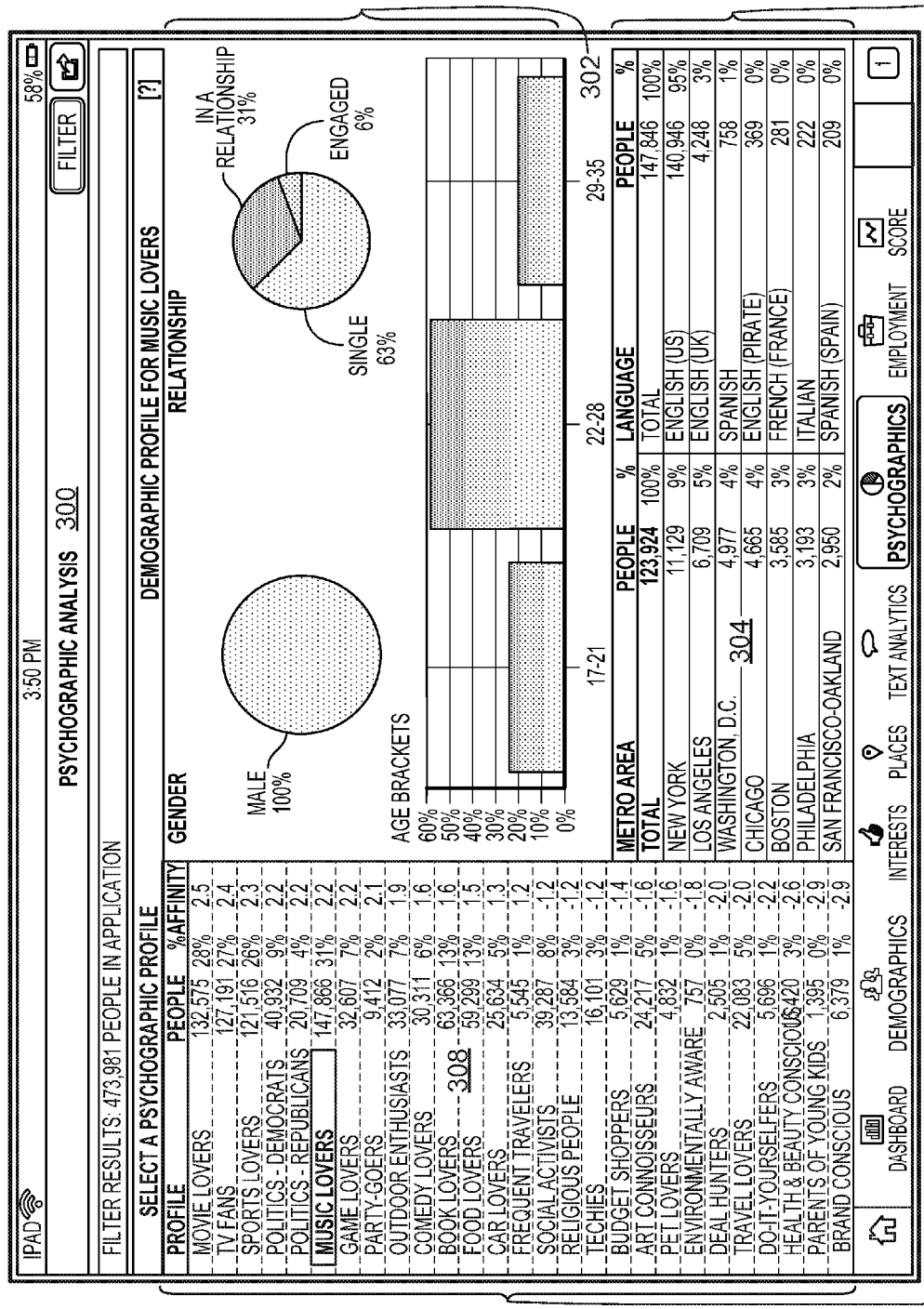
FIG. 3A-3B illustrate examples of graphical user interfaces for presenting anonymous psychographic data pertaining to users of a social networking platform who are posting about one or more topics.
Figure 3B:
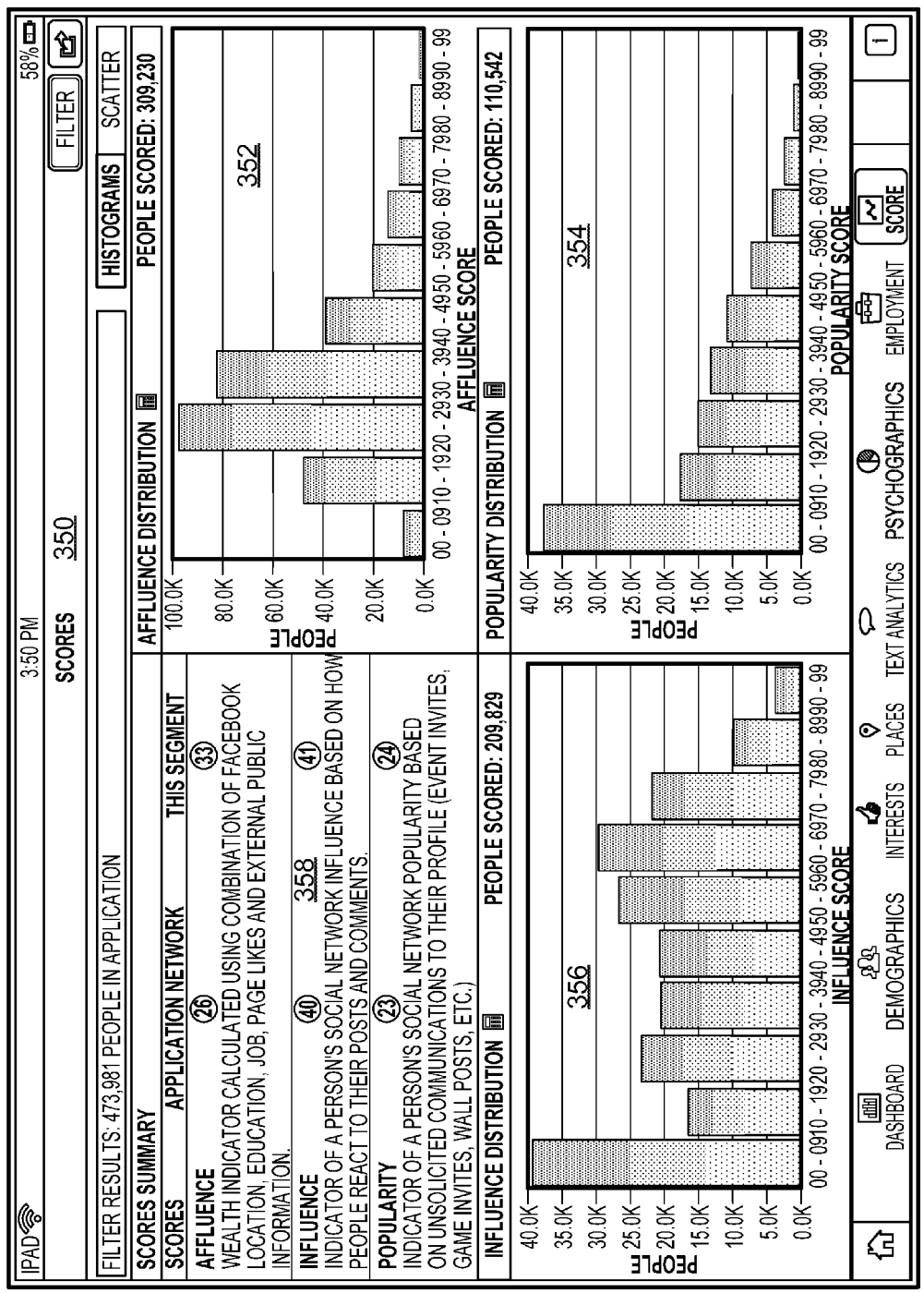

FIGS. 3A and 3B illustrate examples of graphical user interfaces 300 and 350, respectively for an example of an application that presents additional anonymous demographic data and anonymous psychographic data pertaining to users of a social networking platform who are posting about one or more topics.

In reference to FIG. 3A, the graphical user interface 300 includes a relationship status region 302, a metro area region 304, a language region 306, and a psychographic profile region 308. In a particular example, the graphical user interface 300 may be presented to a user as part of an analysis of one or more users of a social networking platform that are posting about a specific topic or token. In an example, the data presented in the graphical user interface 300 may indicate various different psychographic profiles to which people who are posting about the specific topic or token have been determined to belong (e.g., which might be helpful in showing that many of the people posting about the topic happen to be music lovers). In addition, when a particular psychographic profile is selected, data presented in the graphical user interface 300 may show more detailed information about users who are posting about the topic and who belong to that psychographic profile (e.g., it shows their gender, relationship status, age brackets, metro areas of residence and their primary language). As described elsewhere in this specification, each of these regions may include data that is determined by a server system 404 (FIG. 4) based on user activity of users included in one or more user segments on the social networking platform. Techniques for determining the data presented in FIG. 3A is described in more detail below.

In reference to FIG. 3B, the graphical user interface 350 includes an affluence distribution region 352, an influence distribution region 356, and a popularity distribution region 354 and a summary region 358. Like the data presented in reference to FIG. 3A, the graphical user interface 350 may be presented to a user as part of an analysis of one or more users of a social networking platform that are posting about a specific topic or token. In general regions 352, 354, 356, and 358 represent an influence, affluence, and popularity of users included in the user segment on the social networking platform. The graphical user interface 350 also may include a summary region 358 that describes one or more factors that can be used in determining the data that is indicative of an affluence score, an influence score, or a popularity score. One or more techniques that can be used to determine the affluence score, the influence score, or the popularity score are described in more detail below.

Figure 4:
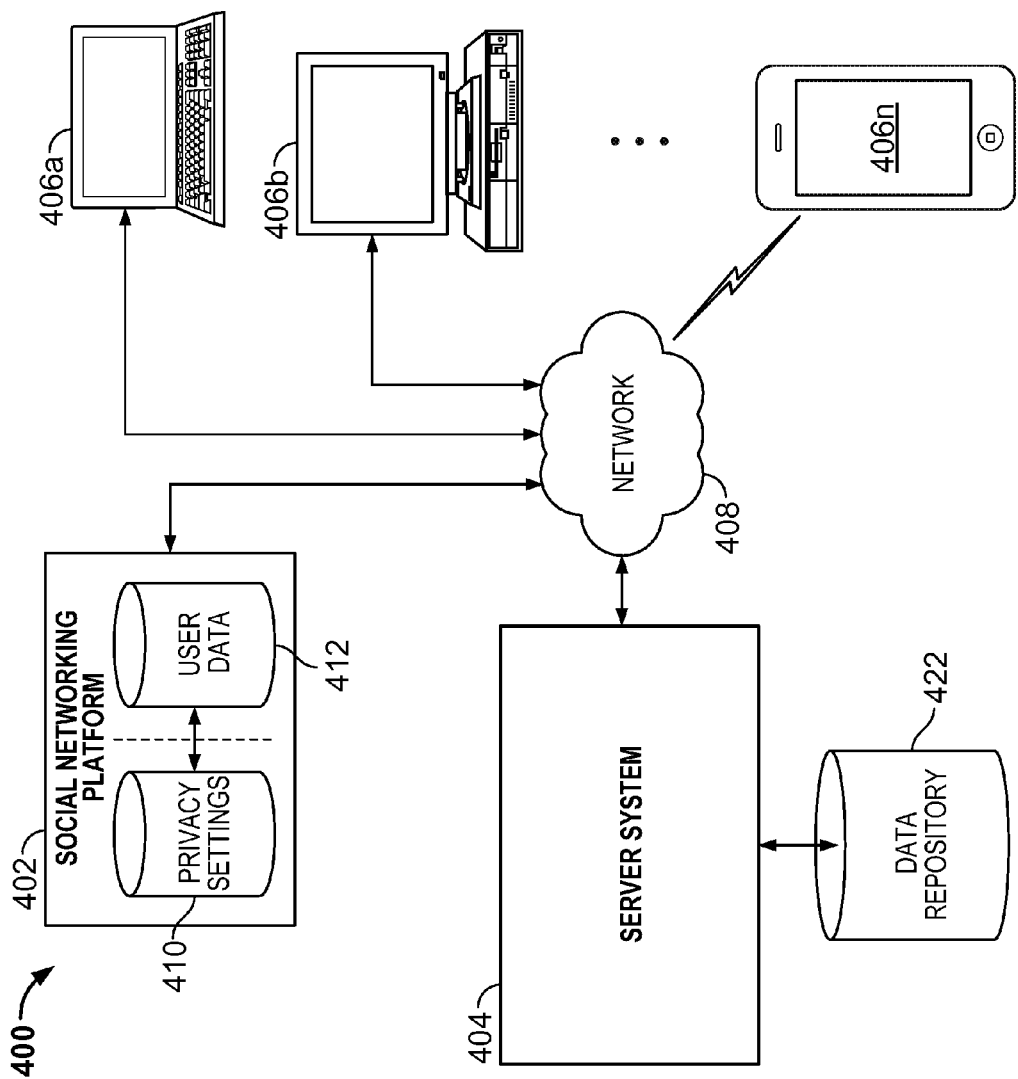
FIG. 4 illustrates examples of a system that can be used to provide data to a user about one or users or more user segments of a social networking platform.

Referring now to FIG. 4, an example of a system 400 that can be used to provide data to a user about various aspects of other users that are posting on a social networking platform and the contents of those posts is shown. In general, the system 400 allows a user of an application executing on a computing device (e.g., laptop computer, desktop computer, mobile device, and so forth) to search for and to display data indicative of types of users posting on the social networking platform about a particular topic, a particular token, a particular entity, a topic of interest posted on the social networking platform by a particular type of users (or user segment), and a sentiment score that reflects whether users are happy or unhappy as it pertains to a particular topic of interest.

The system 400 includes a social networking platform 402, a server system 404, and one or more computing devices 406a-406n. The server system 402, the social networking platform 402 and the one or more computing devices 406a-406n may electronically communicate with each other using a network 408. As will be described in more detail below, one or more of electronic communications from the one or more computing devices 406a-406n can be sent to the social networking platform 402. For example, data sent from the computing devices 406a-406n may be stored in user data of the social networking platform that can be accessed by the server system 204. In an example, the data sent from the computing devices 406a-406n can be used by the server system 404 in determining topics of interest, data indicative of users posting on the social networking platform, and other data.

The social networking platform 402 may also include a data store 410 that includes privacy settings data and a data store 412 that includes user data. The data store 410 may include one or more privacy settings that are specified by a particular user of the social networking platform 402. These privacy settings may control or otherwise suggest how the social networking platform 402 handles a request for user data about the particular user. In one example, the privacy settings may specify that user data stored in the data store 412 is not to be shared with third-parties. Additionally, or alternatively, the privacy settings may specify that posts or other content posted by the particular user is viewable only by a subset of the other users with whom the particular user is connected. Other privacy settings are also possible and can be stored in the data store 410.

At least some of the data that can be shared with third parties such as information indicative of relationships between user identities, demographic indicators about particular users corresponding to respective user identities, psychographic indicators about particular users corresponding to respective user identities, and other data can be stored in the user data included in the data store 412. For example, a particular user may like one or more movies and affirmatively reflect that particular interest by adding content to his or her user profile. The content added to the particular user's user profile may be included in the data store 412. As another example, when a user first registers to become a member of the social networking platform 402, the social networking platform 402 may ask a series of questions about the user. In an example, some questions may include questions pertaining to date of birth, hometown, current residence, contact data, and other data that may be required to complete the registration. This data may also be associated with the particular user's user profile and stored in the data store 412. In some implementations, this and other profile information may also be provided at a point in time after registration (e.g., by allowing a user of the social networking platform to update their respective profile information).

Also, as described above, the user data stored in the data store 412 may include content that is posted by particular users on the social networking platform. In an example, a user can post a message on a "Wall" of another user, check-in to a particular geographic location, or tag content posted by another social contact on the social networking platform 402.

The server system 404 includes various components that enable the server system 404 to access the user data stored in the data store 412. The sever system 404 can use the data stored in the data store 412 to provide one or more different services to a user executing an application on a computing device, such as computing devices 406a-406n. The various components that can be used by the server system 404 are described in more detail below.

In an example, the user data that is included in the data store can be used to determine data indicative of types of users posting on the social network about a particular topic, token, or entity, data indicative of a topic of interest posted on the social networking platform by a particular type of users (or user segment), and a sentiment score that reflects whether users are happy or unhappy as it pertains to a particular topic, token, or entity. In an example, a user may show that he or she likes a particular topic by posting something positive about the topic. Conversely, a user may show that he or she dislikes a particular topic by posting something negative about the topic. In a particular example, the server system 404 can analyze the posts to determine positive and negative sentiment included in the posts included in the user data using a variety of techniques, some of which are described in more detail below.

In some implementations, the server system 404 may gather data about whether a particular topic, token, or entity is viewed favorably or unfavorably within a particular segment of users, topics of interest within a particular segment of users, and other data including certain demographic indicators and psychographic indicators about a user segment posting about a particular topic, token, or entity by leveraging the interconnectedness of social connections within the social networking platform 402. For example, when registering with the application that may provide data indicative of whether a particular topic, token, or entity is viewed favorably or unfavorably within a particular segment of users, topics of interest within a particular segment of users, the particular user may be prompted to provide login credentials to the social networking platform or may be otherwise required to provide the server system 404 with permission to access the user's user data store in the user data store 412 in order to complete an installation of the application on the computing device.

With the permission received from the particular user, the sever system 404 can access the user data stored in the data store 412 to determine each other user that is socially connected to the particular user. The server system 404 may also access user data stored in the data store 412 for these other users that are socially connected to the particular user, although one or more of the socially connected users may prevent the server system 404 from accessing their respective user data. For example, some of the other users that are socially connected to the particular user may have set one or more privacy settings stored in the data store 410 to prevent third-parties from accessing the respective user data for some of the other users. In this example, the privacy settings would indicate that the social networking platform 402 should block any requests for user data about those specific other users that is submitted by the server system 404, as the server system 404 would be considered a third-party. As a result, these privacy settings essentially prevent the server system 404 from obtaining any data about those other users who have configured their privacy settings to block user data access by third-parties.

In some examples, many users do allow third-parties to access their user data, and in the manner described above, the social connections of the various users can be used to retrieve a robust amount of data about many users and their respective activities on the social networking platform 402 from the social networking platform 402. Many of the techniques described herein utilize this data to provide data services to users of an application executing on the one or more computing devices 406a-406n. In an example, the elements identified in the accessed user data may be used to determine one or more topics of interest pertaining to posts generated by users included in a user segment. The one or more subjects can be presented with other data, e.g., particular tokens or particular entities within posts generated by users included in the segment. In an example, such addition information may allow a user of the application to determine trends with respect to the particular topics, tokens, and entities (e.g., including changes over time in a sentiment score associated with a topic, token, or entity). As another example, data indicative of a type of user posting on the social networking platform about a specific topic, token, or entity can also be presented to the user.

In an example, the system 400 also includes a data repository 422. The data repository may store information pertaining to various subjects, types of users positing on the social networking platform about a particular topic, token, or entity, and other data (e.g., happiness indices that describe whether a particular user segment views a particular topic, token, or entity favorably on unfavorably). In a particular example, the data repository 422 includes anonymous demographic data and anonymous psychographic data. In some implementations, the anonymous demographic data and psychographic data can be presented on a computing device 406a-406n, e.g., in one or more graphical user interfaces described throughout this specification.

Figure 5:
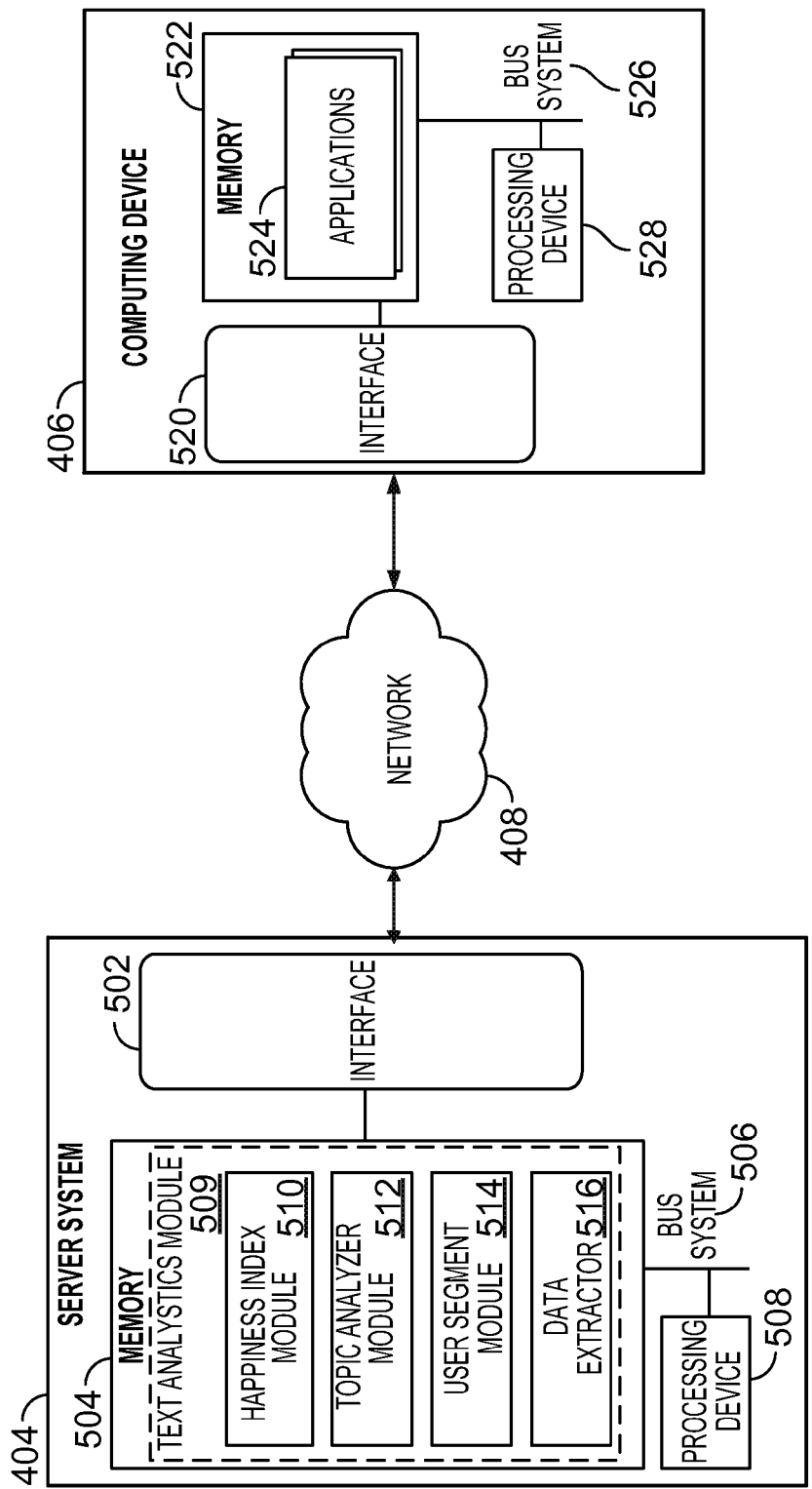
FIG. 5 is a block diagram of an example of components of a network environment capable of implementing subject matter of the present disclosure.

FIG. 5 is a block diagram of an example of components of a network environment 500 capable of implementing subject matter of the present disclosure. In an example, the server system 404 includes an input/output (I/O) interface 502, memory 504, a bus system 506, and one or more processing devices 508. The server system 404 may also be in communication with a data repository 422 (FIG. 4) that includes demographic data and psychographic data. The server system 404 can communicate with any of the social networking platform 402 (FIG. 4), the one or more computing devices 406a-406n, and the network 408 through I/O interface 502. In an example, the I/O interface 502 can be any combination of hardware and software capable of receiving data over a network, including, e.g., an Ethernet interface, a wireless networking interface, a fiber-optic networking interface, a modem, and so forth.

A bus system 506, including, for example, a data bus and a motherboard, can be used to establish and to control data communication between the components of the server system 404. In an example, the server system 404 can be one or more desktop computers, one or more rack-mounted servers, and the like. In some implementations, the server system 404 may be distributed in different geographic locations or may be included in a centralized location, such as a data center.

The one or more processing devices 508 can each include one or more microprocessors. Generally, one of the processing devices 508 can include an appropriate processor and/or logic that is capable of receiving and storing data, and of communicating over a network (e.g., network 408). Memory 504 can include a hard drive and a random access memory storage device, including, e.g., a dynamic random access memory, or other types of non-transitory machine-readable storage devices. As shown in FIG. 5, memory 504 stores computer programs or other program logic that are executable by one or more of processing devices 508. In the illustrated example, the memory 504 includes a happiness index module 510, topic analyzer module 512, a user segment module 514, and a data extractor 516.

In some implementations, the happiness index module 510, topic analyzer module 512, the user segment module 514 and the data extractor 516 may be included in a text analytics module 509 as one or more components of the text analytics module 520. In general, the text analytics module 509 determines or otherwise identifies data about post and users of the social networking platform that generate those posts. In an example, for each post extracted from the social networking platform, the text analysis module and/or components can determine a post topic, calculate or otherwise assign an overall sentiment score for the post, identifies all tokens within the post, identifies any entities referenced in the post, calculates a sentiment score expressed for each sentiment included in the post, and so forth. All of this information can be stored in a manner that is linked to the user who posted the post so that the various different analyses that are the subject of this patent application can be performed.

In an example, the data extractor 516 can be configured to access or otherwise retrieve data from the social networking platform 402 (FIG. 4). For example, the data extractor 516 can use an application programming interface (API) to send data requests to the social networking platform 402 (FIG. 4). In an example, the data extractor 516 may extract data periodically (e.g., hourly, daily, weekly, and so forth) by using the API to poll the social networking platform 402 (FIG. 4). In this example, the data extractor 516 only polls the social networking platform 402 (FIG. 4) for user data for which the server system 404 can access. This may include particular users that have provided permission for the server system 404 to access their respective user data as well as all of the other users that are socially connected to those particular users, depending on the privacy settings set by the other users.

In an example, the user segment module 514 can be configured to identify one or more users as belonging to a user segment that shares one or more common characteristics. In a particular example, the user segment module 514 can identify data indicative of user characteristics associated with a portion of the accessed user data. For example, the user segment module 514 may identify in the portion of user data one or more users that have "liked" one or more sports teams on the social networking platform. As a result the user segment module 514 may identify these users as belonging to a "Sports Lovers" user segment. As another example, the user segment module 514 may identify one or more users that have an annual income of greater than $100,000 as being in an "affluent" or "wealthy" user segment. Other user segments are possible and may be indicative of a combination of other user segments. For example, users that have a relationship status of single, and thus belong to a "Single" user segment and users that are female and thus belong to a "Women" user segment may be identified, based on common characteristics, as belonging to a "Single Women" user segment. That is, the user segment module 514 allows a user of the application to define a user segment however the user chooses using a multitude of different filtering options (e.g., shown in graphical region 102 (FIG. 1A)).

The happiness index module 510 can be configured to generate a happiness index for a particular user segment based at least in part on analyzing contents (e.g., posts) in at least a portion of the accessed user data that have been generated by one or more users of the social networking platform 402 (FIG. 4). In an example, a post can be analyzed using a part-of-speech analyzer to determine whether the post is directed to a generally positive sentiment, a generally neutral sentiment, or a generally negative sentiment. Then a happiness index may be determined by comparing a number of posts that are determined to be directed a generally positive sentiment to the number of all posts generated by a user segment (or particular users within the user segment). Techniques for determining a score are described in more detail below.

In some implementations, user posting behavior may be used to weight or otherwise scale the happiness scores to account certain observed behaviors (e.g., users that post less often have a tendency to post more favorability about various topics, tokens, and entities). In an example, the happiness index module 510 can be configured to apply one or more weights to the determined happiness score based on a determined frequency of posting activity for respective ones of the one or more users. In this example, if the determined frequency of posting activity is below a threshold (e.g., two posts per day or another threshold posting frequency), sentiments that are determined to be generally positive and reflecting a happiness of a user may be reduced to reflect that users that post less often generally have a higher sentiment score associated with those posts than users who post more frequently. As a result, a better picture of the sentiment of any of the one or more users can be determined. That is, such an approach can avoid having a sentiment score for a user segment that is artificially inflated by infrequent posting of one or more users that are included in the particular user segment.

In an example, the topic analyzer module 512 can be configured to identify one or more tokens or entities in a portion of accessed user data that pertain to a topic of interest for a particular user segment. In an example, one or more posts in the portion of accessed user data can be analyzed to identify various tokens in the post as well as entities that pertain to the identified tokens. In an example, the topic analyzer module 512 can perform keyword-based searching to identify particular keywords in the one or more posts that are associated with one or more different tokens of the one or more posts. As another example, the topic analyzer module 512 may perform part-of-speech analysis to determine one or more words, or phrases that may be used to identify entities that are associated with one or more different tokens included in the of the one or more posts.

In an example, the topic analyzer module 512 may include a blacklist to prevent one or more terms included in the blacklist from being identified as a possible token or entity that pertains to a topic of interest. Additionally, or alternatively the blacklist may also be used by other modules in the server system 404 to remove data from the portion of the user data that matches terms in the blacklist before one or more terms are provided to the topic analyzer module 512. In such an example, the blacklist may include terms such as stop words (e.g., a, and, the, and so forth) and other insignificant terms or other terms that may lead to an improper identification of a token or entity that pertains to a topic of interest.

In an example, the computing device 406a includes an I/O interface 520, memory 522, a bus system 526, and one or more processing devices 528. These elements operate using similar principals and perform similar functions to the I/O interface 502, memory 504, bus system 506, and one or more processing devices 508 described in connection with the server system 404. The computing device 406a can be any of a laptop computer, desktop computer, a handheld computer, mobile phone, or any other computing device capable of executing one or more applications.

In an example, the memory 522 includes one or more applications 524 that can present a graphical user interface, such as a graphical user interface 100 shown in reference to FIG. 1A, any or of the other graphical user interfaces described in this disclosure, or other graphical user interfaces, in a display device of the computing device 406. The display device may be a touch-sensitive device, enabling a user to provide user input by touching, gesturing, or otherwise making physical contact with the display device. In a particular example, one of the one or more applications 524 is an application that presents data to a user of the application about various aspects of one or more users that are posting on a social network about a particular topic, token, or entity. In some examples, the application may present data indicative of sentiments related to the posts, topics of interest pertaining to the posts, tokens included in the posts, entities referenced in the posts, and so forth. In some implementations, the application may present demographic data and psychographic data that has been determined by the server system 404 and has been associated with one or more user segments. For example, relationship status of a user segment or average age of a user segment can be presented by the application. In some implementations, the application may also present trend data regarding tokens, entities, topics and sentiment scores determined for particular posts to show a change in favorability of the various tokens, entities, and topics over time.

The application can be configured to communicate with the server system 404 using the I/O interface 520. In response, the server system 404 may provide data that is indicative of the type of users posting on the social networking platform 402 (FIG. 4) about a particular topic, token, or entity. The application can present the provided data on a display device using one or more graphical user interfaces, such as the graphical user interfaces described above. In addition, these user interfaces may include demographic data and psychographic data received from the server system 404. In an example, this demographic data and psychographic data is determined from user data stored in the data store 412 (FIG. 4) of the social networking platform 402 (FIG. 4). In this example, the demographic data and the psychographic data may be presented to the user in a number of different graphical user interfaces to provide different graphical representations of the demographic data and the psychographic data. In addition, in this example, the graphical user interfaces may facilitate one or more user interactions to allow a user of the application to configure or otherwise filter the type of data that is displayed. A number of these graphical user interfaces have been described above, although they represent an illustrative sample and not an exhaustive collection of graphical user interfaces.

Figure 6:
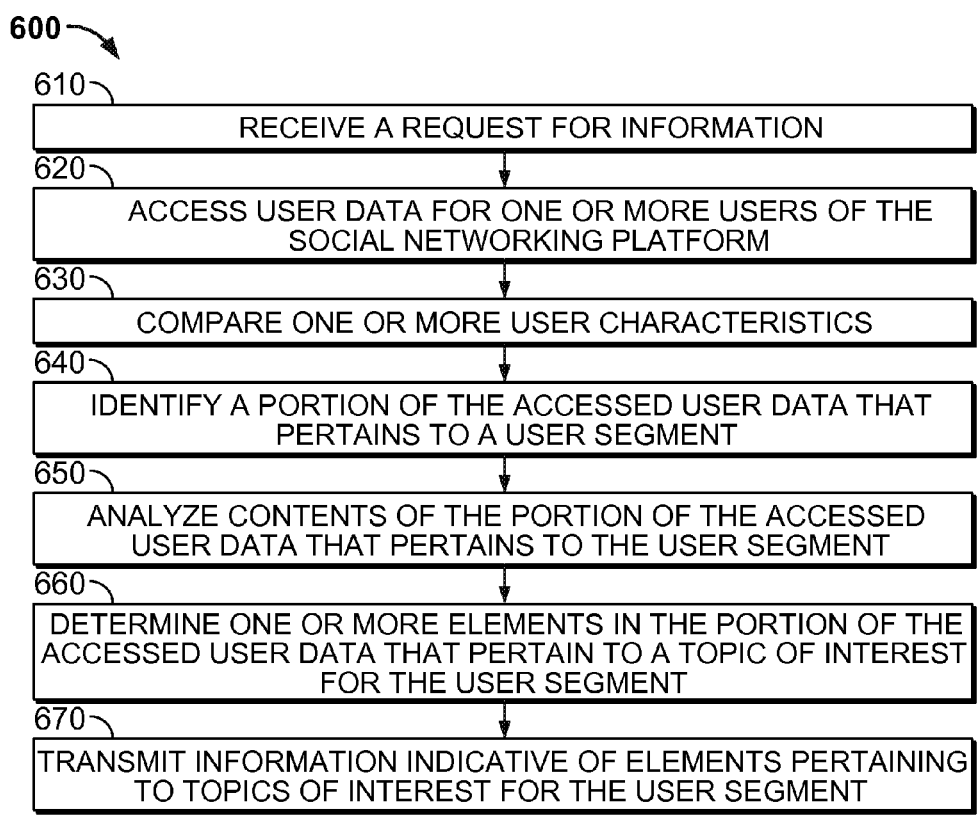
FIG. 6 is a flow chart showing an example of a process for identifying data that pertains to one or more topics of interest for a user segment of a social networking platform.

FIG. 6 is a flow chart showing an example of a process 600 for identifying data that pertains to one or more topics of interest for a user segment of a social networking platform. Some aspects of the process 600 may be described in reference to the systems shown in FIGS. 4 and 5, but other systems may also be used to perform the process 600.

A request for data can be received (610). In an example, the request can be indicative of topics of interest for a user segment of a social networking platform, with the user segment being associated with one or more user characteristics. For example, a server system 404 may receive a request for data from a computing device 406a (FIG. 5) executing an application. Such a request may correspond to an interaction between a user of the application and the application. In a particular example, the user may provide one or more selections of characteristics from a graphical region, such as the graphical region 102 (FIG. 1A). These selections of characteristics may be used to specify a user segment. That is, in an example, the selection can specify a user segment that includes one or more users having at least some of the selected characteristics. In a particular example, the user segment includes one more users having all of the selected characteristics.

In response to the request, user data for one or more users of the social networking platform can be accessed (620). In one example, data may have been previously extracted from the social networking platform 402 (FIG. 4) using a data extractor 516 (FIG. 5) and stored in a data repository 422 (FIG. 4). The server system 404 (FIG. 4) may access the previously stored information to access the extracted user data. In another example, a data extractor 516 (FIG. 5) executing on the server system 404 may access user data stored in a data store 412 (FIG. 4) of the social networking platform 402 (FIG. 4). In this example, the accessed user data may include one or more items that are associated with one or more user characteristics indicative of a type of user associated with the item of accessed user data. In some examples, the one or more items may be posts generated by the one or more users or other content generated on the social networking platform 402. In some examples the one or more items may be other affirmative actions performed by the one or more users of the social networking platform 402, such as a check-in or some other action.

In addition, in some examples, the one or more user characteristics that are associated with the selected user segment and the user characteristics associated with the accessed user data may be compared (630). For example, if the user selected "Democrat" as a characteristic associated with a particular user segment, the "Democrat" characteristic can be compared to characteristics associated with the accessed user data. In a particular example, if a user of the social networking platform has indicated that they are associated with the "Democrat" characteristic, then the comparison may return true or otherwise indicate that the particular user should be included in the selected user segment.

A portion of the accessed user data that pertains to the user segment can be identified based on the comparing (640). For example, the server system 404 may identify the posts included in the user data that have been generated by the users who are determined to belong to the user segment.

Contents of the portion of the accessed user data that pertains to the user segment may be analyzed (650). For example, sentiment scores for particular posts, tokens, entities, and topics of various posts can be identified for the posts generated by the users determined to belong to the user segment. For example, keyword searches, identifying semantically related terms, parts-of-speech tagging, and other techniques can be used to analyze post generated by the users in a user segment in various ways.

One or more elements in the portion of the accessed user data that pertain to a topic of interest for the user segment can be determined based on the analyzing (660). For example, tokens, entities, or both can be determined for a particular topic of interest. That is, the tokens used in posts generated by the user segment that pertain to a particular topic can be identified. Similarly, entities associated with the tokens can also be identified. In some implementations, a sentiment score for each post generated by the user segment may also be determined.

Data indicative of one or more elements pertaining to topics of interest can be transmitted to a device that sent the request (670). In a particular example, the elements may include any of the identified tokens, entities, and sentiment scores that are identified for particular ones of the one or more posts generated by users included in the selected user segment. In some implementations, the server system 404 may transmit the determined data that when presented by an application presents one or more graphical user interfaces described above. For example, the server system 404 may transmit data that can be used to populate any of the graphical user interfaces 100, 110, 120, 130, 140, 150 and 160 shown in reference to FIGS. 1A-1F.

In some implementations, only the tokens that have a determined frequency of occurrence that satisfies a threshold frequency are considered. That is, in some implementations, a frequency of occurrence of a particular type of user data included in the accessed user data can be determined to filter or otherwise remove certain tokens from consideration. For example, the server system 404 can determine a number of times in which particular tokens in the portion of the user data that pertain to the topic of interest for the user segment occur. In a particular example, as terms in the posts are matched to tokens indicative of a topic of interest, a running total may be stored for particular terms by the server system 404. In such implementations, the determined frequency of occurrence can be compared to a threshold value. Then, in an example, one or more tokens with a highest frequency of occurrence relative to other tokens may be selected to be displayed to a user of the application. As a result, tokens that have a frequency of occurrence lower relative to other tokens may not be presented to the user of the application.

In some implementations, however, the tokens for which data is displayed may not simply be those tokens that appeared most frequently in posts by users within the defined segment during the defined time period. This is because the most frequently occurring tokens in posts may not change much over time and, therefore, the analysis enabled may not be terribly interesting if it focuses exclusively on the most frequently occurring tokens. For example, the token "Happy Birthday," may almost always be one of the most frequently occurring tokens in posts.

Alternatively, in one example approach, the server system 404 (FIG. 4) may determine the overall number of posts (by users within the user segment that pertain to the topic of interest) that have included each token as well as the number of posts (by users within the user segment that pertain to the topic of interest) that have included each token within a selected time period. The server system 404 (FIG. 4) then may calculate the relative frequency of each element according to Equation 1:

$$\text{relative element frequency} = \frac{\frac{\text{\# of posts including token during defined time peiod}}{\text{length of defined time period}}}{\frac{\text{total \# of posts including token}}{\text{length of overall time period}}} \quad \text{(Eq. 1)}$$

Essentially, Equation 1 attempts to capture situations in which particular tokens see an increased amount of usage. For example, the token "Happy Birthday" may have a high absolute frequency (e.g., hundreds, thousands, or hundreds of thousands of uses each day), but because that frequency is relatively constant, the relatively frequency will be lower than tokens that have an increased usage over a short period of time because, e.g., the token is used in connection with a particular current event (e.g., "Boston Marathon," "Solar Eclipse," "Halley's Comet," and so forth).

In some implementations, the relative frequency for each token may be multiplied by the square root of the lesser of (i) the total number of posts that have included the element, or (ii) some constant (e.g., 2,400). Alternatively, prior to calculating the relative frequency of each element, the server system 404 (FIG. 4) may exclude all elements that haven't appeared within (i) some threshold number of posts within the selected time period and/or (ii) some threshold number of posts within an overall time period. As an alternative to using the relative frequency approach described above, the server system 404 (FIG. 4) may employ a term frequency-inverse document frequency (tf-idf) algorithm to tokens to identify elements that are of particular interest to users within the user segment during the selected time period.

Figure 7:
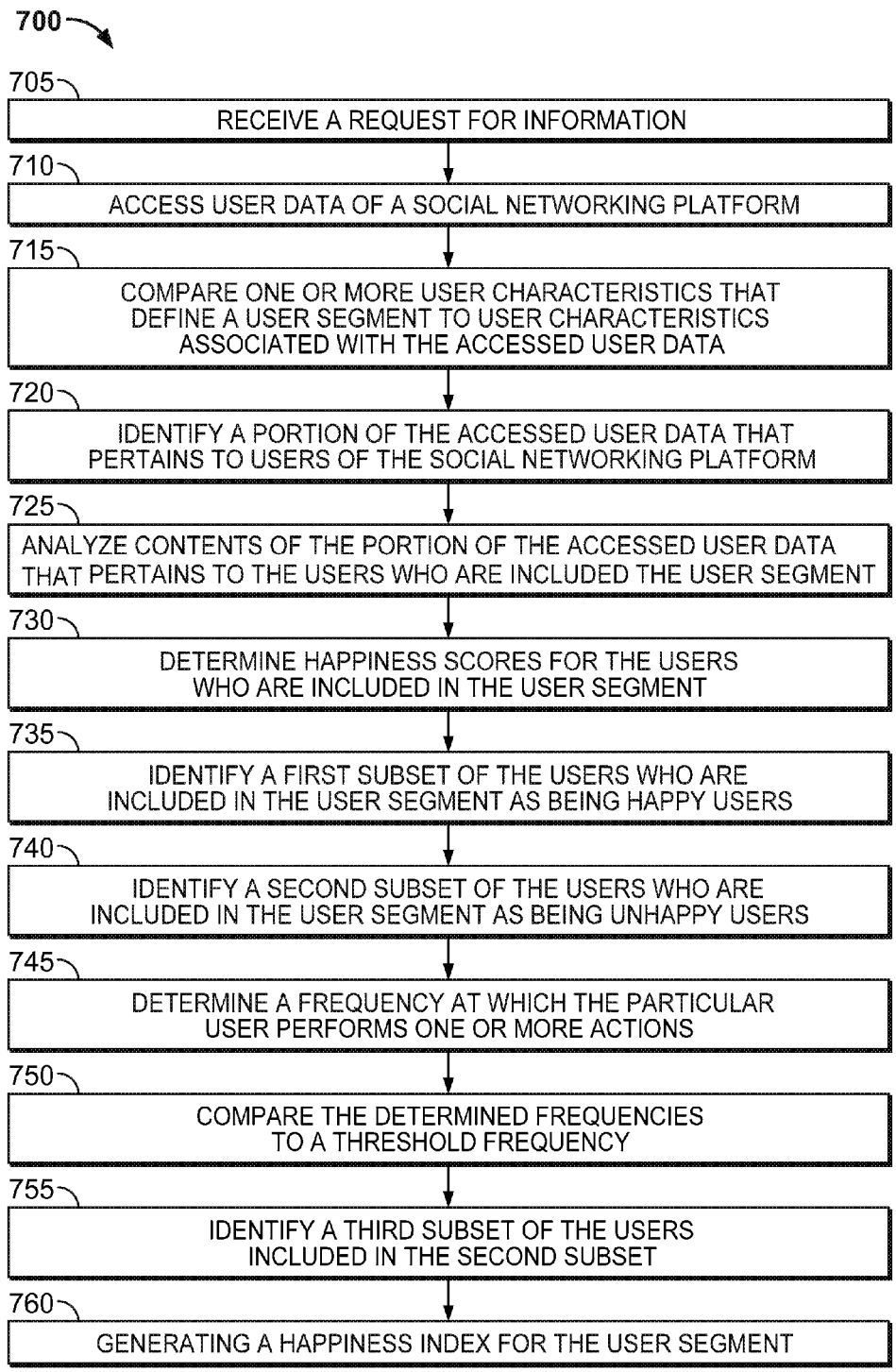
FIG. 7 is a flow chart showing an example of a process for generating a happiness index pertaining to one or more posts for a user segment of a social networking platform.

FIG. 7 is a flow chart showing an example of a process 700 for generating a happiness index that pertains to a user segment of a social networking platform. In general, the process 700 can subdivide users in a user segment into one or more subsets of users according to specified criteria. For example, some users may be assigned to a first group if their respective daily posting frequency is above a threshold frequency while others are assigned to a second group if their respective daily posting frequency is less than the threshold frequency. These identified subsets can be used when generating a happiness index for the user segment. Some aspects of the process 700 may be described in reference to the system 400 shown in FIGS. 4 and 5, but other systems may also be used to perform the process 700.

A request for data indicative of a user segment of a social networking platform can be received (705), with the user segment being associated with one or more user characteristics. For example, a server system 404 may receive a request for data from a computing device 406 executing an application. Such a request may correspond to an interaction between a user of the application and the application. In a particular example, the user may provide one or more selections of characteristics using a graphical region, such as the graphical region 102 (FIG. 1A). These selections of characteristics may be used to specify a user segment. That is, in an example, the selection can specify a user segment that includes one or more users having at least some of the selected characteristics. In a particular example, the user segment includes one or more users having all of the selected characteristics.

In response to the request, user data of the social networking platform can be accessed (710), with an item of the accessed user data being associated with one or more user characteristics indicative of a type of user associated with the item of accessed user data. In one example, data about users of a social networking platform can be accessed to identify a user segment (e.g., as defined using the filters illustrated in FIG. 1A).

In an example, the one or more user characteristics that define the user segment can be compared to user characteristics associated with the accessed user data (715). For example, if the user selected "Democrat" as a characteristic associated with a particular user segment, the "Democrat" characteristic can be compared to characteristics associated with the accessed user data. In a particular example, if a user of the social networking platform as indicated that they are associated with the "Democrat" characteristic, then the comparison may return true or otherwise indicate that the particular user should be included in the selected user segment.

A portion of the accessed user data that pertains to users of the social networking platform who are included in the user segment can be identified (720). For example, based on a comparison performed above, the server system 404 can identify one or more posts included in the user data that have been generated by the users who are determined to belong to the user segment.

Contents of the portion of the accessed user data that pertains to the users who are included in the user segment can be compared (725). For example, the post that discusses drone strikes may be analyzed using similar techniques described above in connection with step 715. For example, the server system 404 may compare the contents of the portion of the accessed user data with one or more keywords, one or more semantically related terms, or parts of speech.

Happiness scores for the users who are included in the user segment can be determined (730). In an example, a measure of the happiness of an individual user is determined by analyzing posts made by the user within a defined period of time (e.g., the previous 7 days). For example, as posts are extracted from the social networking platform 404 (FIG. 4), sentiment scores for each post likely will be calculated. Then during execution of process 700, an average of the sentiment scores can be used to determine one or more happiness scores for the users who are included in the user segment (e.g., using happiness index module 510 (FIG. 5)). In some implementations, the happiness score for a particular user can be categorized for more than one period of time. For example, a user can be identified as happy on particular days of a week (e.g., five days happy and two days unhappy) as well as for that particular week (e.g., happy for that week based on the five happy posts out of a total of seven posts).

In a particular example, consider a scenario where there are one-hundred users of the social networking platform 402 (FIG. 4). In this example, each user posts three times per day for ten days. For each of the one-hundred users, the server system 404 (FIG. 4) can measure the respective happiness or unhappiness for each day using an average sentiment score of the three daily posts. If, for example, the server system 404 determines that each user is happy on eight days and unhappy on two days, than on each day there are eighty happy users and 20 unhappy users. The server system 404 can use this determination to get a more accurate representation of the happiness and unhappy of the users. For example, using the above example, the server system 404 can determine that for the ten-day period eighty percent of the users are happy. If, on the other hand, the server system 404 used a determination whereby each user's happiness was determined for the time period as a whole, the server system 404 may erroneously determine that one-hundred percent of the users are happy for the time period (e.g., because each user is determined to be happy on a majority of the days during the period).

These happiness scores for the user's posts can be used to classify the user as being happy, unhappy, or neutral. In one example a general happiness score for a user can be determined by determining whether an average raw sentiment score for the particular posts is positive or negative. In another example, a scaled sentiment score can be determined for each raw sentiment score based on the following Table 1:

TABLE 1

| raw score | scaled score |
| --- | --- |
| <−0.55 | −2 |
| >=−0.55 & <−0.0001 | −1 |
| >=−0.0001 & <0.0001 | 0 |
| <=0.55 & >0.0001 | 1 |
| >0.55 | 2 |

In general, the raw scores can be provided by the text analytics module 509 (FIG. 5) and then converted into a scaled score. For example, if a user's happiness score is less than 0.55, the user's scaled score can be assigned a scaled score of −2. As a result, each user in the user segment may be associated with a raw score and a scaled score for a particular day, which can be used to determine both an average raw score and an average scaled score for the particular user during a particular period of time. In this example, the average raw score of greater than 0.0001 indicates a happy user and a scaled score greater than zero also indicates a happy user. Average raw score and an average scaled scores between −0.0001 and 0.0001 indicate a user whom is neither happy nor unhappy (e.g., a neutral user), and an average raw score and an average scaled score less than −0.0001 indicates an unhappy user.

A first subset of the users who are included in the user segment as being happy users are identified (735), with a happy user being a user of the social networking platform who is associated with a sentiment score that exceeds a happiness threshold. In a particular example, users that have posts with either an average raw score greater than a determined value of 0.0001 qualify as being happy.

A second subset of the users who are included in the user segment as being unhappy users can be identified (740), with an unhappy user being a user of the social networking platform who is associated with a sentiment score that is less than or equal to the happiness threshold. For example, users that have posts with either an average raw score less than a determined value of −0.00001 qualify as being unhappy.

For a particular user included in the second subset, a frequency at which the particular user performs one or more actions to cause generation of user data for the particular user can be determined (745). That is, in a particular example, the frequency in which the user in the second subset generates posts on the social networking platform can be determined. For example, the server system 404 (FIG. 4) can access user data for the particular user to access a metric or other value that indicates how often the particular user generates posts on the social networking platform 402 (FIG. 4). In a particular example, the value may be a number equal to or greater than zero to indicate the number of posts generated by the particular user per day.

The determined frequencies at which the users in the second subset perform the one or more actions can be compared to a threshold frequency (750). For example, a determined posting frequency can be compared to a threshold frequency. In one example, the determined frequencies can be compared to a threshold frequency of one. That is, a user that posts more than once per day would satisfy the frequency, whereas users that post one time or less per day would not satisfy the frequency.

A third subset of the users included in the second subset can be identified, based on comparing the determined frequencies (755), with a user in the third subset performing the one or more actions less frequently that the threshold frequency. For example, the determined posting frequency can be used to determine which of the users in the second subset should be included in the third subset of users. In an example, users that do not satisfy the threshold frequency of more than one post per day may be identified as belonging to the third subset of user.

A happiness index for the user segment can be determined (760). In an example the sentiment score for the user segment can be based on one or more determined happiness scores for i) an identified number of users in the first subset, and for ii) a weighted number of users in the second subset, wherein the weighted number of users in the second subset is based at least in part on a number of users in the third subset.

In an example, the happiness index for the user segment can be calculated according to Equation 2, below:

$$\text{Happiness Index} = \frac{\text{Happy Users}}{(\text{Happy Users} + (\text{Unhappy Users}_{Whopost>1time/day} + 1.373 \cdot (\text{Unhappy Users}_{Whopost\leq 1time/day})))} \quad \text{(Eq. 2)}$$

In Equation 2, the segment happiness accounts for one or more unhappy users who post more than once per day, as users that typically post more than once per day generally may exhibit more negative scores than those users who post only once per day (or less). As a result, a bias factor can be applied to the segment happiness, essentially giving greater weight to users who post once a day or less and who are determined to be unhappy. In some implementations, the bias factor can be based on other posting frequencies such as weekly posting frequency, monthly posting frequency, and so forth. In other words, the bias factor can be derived from data that is received from the social networking platform 402 (FIG. 4) to provide a suitable adjustment to a determined happiness score. In an example, particular patterns may emerge with respect to user happiness and activities performed by the users on the social networking platform 402. When such patterns are identified, they can be used to generate various bias factors when users satisfy (or do not satisfy) various criteria associated with the identified activity (e.g., posting frequency).

In some implementations, the happiness index can be presented to a user graphically. For example, in reference to FIG. 1A, representation 106b presents the measure of happiness graphically. In some implementations, a different posting frequency other than one can be used when applying the bias factor. That is, the above equation can be altered such that a different posting frequency other than one post per day may be used to divide the group of unhappy users.

Also, in some implementations (e.g., where sample sizes are relatively low), both daily sentiment scores, happiness scores, and happiness indices, and weekly sentiment scores, happiness scores, and happiness indices can be determined for a particular user segment in order to effectively increase the sample size. For example, first a sentiment score for each day can be calculated by determining a sentiment score for each of the posts generated by users in the user segment for that particular day (e.g., determining a sentiment score using techniques described herein). These sentiment scores may be added to determine a daily happiness score for the particular user. Then each of the daily happiness scores can be aggregated to form an aggregated daily happiness index. That is, each happiness score for each user can be added together to form an aggregated daily happiness index for the user segment. Once the aggregated sentiment score has been determined, a sentiment score for the week can be determined using the techniques described above. In other words, for each day within any given week, the system may calculate the number of happy users and the number of unhappy users who posted more than once that day and the number of unhappy users who posted only once that day. The system may then add up these numbers from each day of the week to calculate the happiness index for the week for the user segment.

As a result, the effective sample size may be increased because each day is treated as an event for the purposes of determining whether a user has posted or not. For example, typically if a user posts during any day of the week, that user would be included in the sample, and the user's posting frequency may only be used as a bias factor (e.g., as described above). So, even if a user posts once per day, the user is only considered once for the purposes of the sentiment score for a given weekly score. Conversely, measuring sentiment scores on a daily basis allows that same user that posted once per day to be counted seven times, once for each day that the user posts. Other techniques may also be used to determine sentiment scores and so forth.

Figure 8:
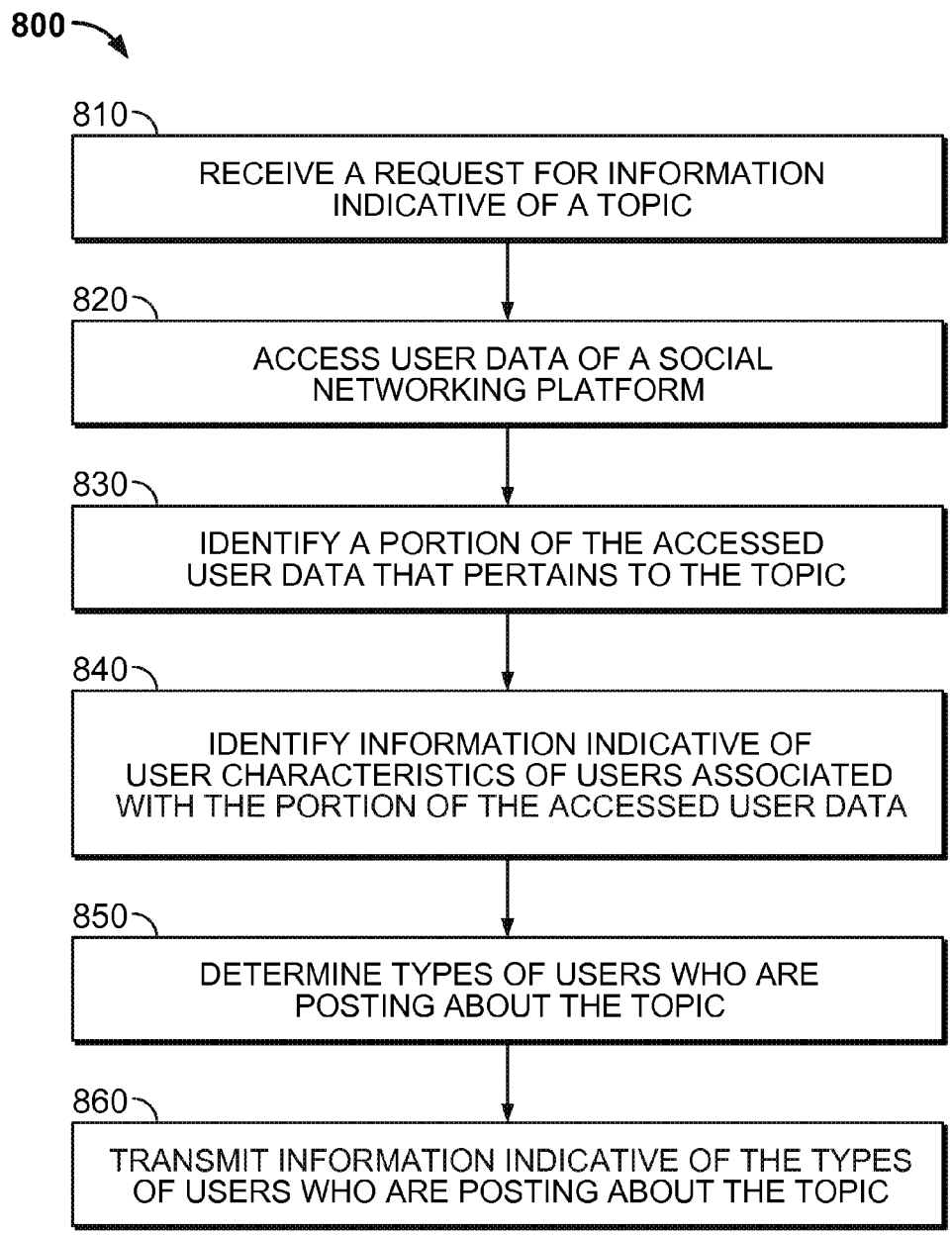
FIG. 8 is a flowchart showing an example of a process for identifying data indicative of the types of users of a social networking platform who are posting about a topic.

FIG. 8 is a flowchart showing an example of a process 800 for identifying data indicative of the types of users of a social networking platform who are posting about a topic. Some aspects of the process 800 may be described in reference to the system 400 shown in FIGS. 4 and 5, but other systems may also be used to perform the process 800.

A request for data indicative of a token or entity can be received (810). For example, a server system 404 (FIG. 4) may receive a request for data from a computing device 406a (FIG. 5) executing an application. Such a request may correspond to an interaction between a user of the application and the application. In a particular example, the user may provide one or more selections of topic of interest using a control, such as the filter control 121 (FIG. 1B).

User data of a social networking platform can be accessed (820). In one example, data may have been previously extracted from the social networking platform 402 (FIG. 4) using a data extractor 516 (FIG. 5) and stored in a data repository 422 (FIG. 4). The server system 404 (FIG. 4) may access the previously stored information to access the extracted user data. In another example, a data extractor 516 (FIG. 5) executing on the server system 404 may access user data stored in a data store 412 (FIG. 4) of the social networking platform 402 (FIG. 4). In this example, the accessed user data may include one or more items that are associated with one or more user characteristics indicative of a type of user associated with the item of accessed user data. In some examples, the one or more items may be posts generated by the one or more users or other content generated on the social networking platform 402. In some examples the one or more items may be other affirmative actions performed by the one or more users of the social networking platform 402, such as a check-in or some other action.

A portion of the accessed user data that pertains to the topic can be identified (830). For example, posts that reference the particular topic in a defined time period can be identified.

Data indicative of user characteristics of users associated with the portion of the accessed user data can be identified (840). For example, the server system 404 (FIG. 4) can access data about users have generated posts that reference the particular topic within the defined time period. In a particular example, the server system 404 identifies the users who posted those posts and returns data about the characteristics of those users a user of the application (e.g., by transmitting data to be displayed in graphical user interfaces 200, 210, 220, 230, 300, and 350 in FIGS. 2A-2D and 3A-3B).

Types of users who are posting about the topic can be determined from the identified data indicative of the user characteristics (850). For example, the server system 404 (FIG. 4) may identify anonymous demographic data about one or more users of the social networking platform who are posting about the topic, anonymous psychographic data about the one or more users of the social networking platform who are posting about the topic, or both. In a particular example, the server system 404 may identify an average age of the users included in the particular user segment. Other examples are also illustrated in reference to FIGS. 2A-2D and 3A-3B.

In some implementations, the anonymous demographic data may include one or more of i) data indicative of a gender of the one or more users of the social networking platform who are posting about the topic, ii) data indicative of an age of the one or more users of the social networking platform who are posting about the topic, iii) data indicative of an ethnicity of the one or more users of the social networking platform who are posting about the topic, iv) data indicative of knowledge of languages of the one or more users of the social networking platform who are posting about the topic, v) data indicative of home ownership of the one or more users of the social networking platform who are posting about the topic, vi) data indicative of an employment status of the one or more users of the social networking platform who are posting about the topic, and vii) data indicative of a relationship status of the one or more users of the social networking platform who are posting about the topic.

In some implementations, the anonymous psychographic data may include one or more of i) data indicative of one or more interests of the one or more users of the social networking platform who are posting about the topic, ii) data indicative of a lifestyle of the one or more users of the social networking platform who are posting about the topic, iii) data indicative of popularity on the social networking platform for the one or more users of the social networking platform who are posting about the topic, iv) data indicative of affluence of the one or more users of the social networking platform who are posting about the topic, and v) data indicative of influence on the social networking platform for the one or more users of the social networking platform who are posting about the topic.

Data indicative of the types of users who are posting about the topic can be transmitted to a device that sent the request (860). For example, the server system 404 may transmit the determined data that when presented by an application presents one or more graphical user interfaces described above. For example, data can be transmitted that when presented by the application is similar to the data presented in reference to FIGS. 2A-2D and 3A-3B.

As discussed above in connection with the graphical user interface 100 illustrated in FIG. 1A, various different characteristics or estimates of various different characteristics of the user identities for whom the application accessed user data from the electronic social networking platform may be derived from the data accessed from the electronic social networking platform for the user identities even if the electronic social networking platform itself does not record or make available data about such characteristics. For example, the hometown and/or current residence data for a user identity returned by the electronic social networking platform may be incomplete, providing only an indication of a city but not the state/territory and/or country in which the city is located, and the application may identify the state/territory and/or country in which the city is located. Additionally or alternatively, the application may determine if a user identity's current residence is urban or rural. The application also may determine if a user identity's current residence belongs to a particular metro area. In addition, the application may estimate a user identity's income, affluence, influence, and/or popularity based on data accessed from the electronic social networking platform for the user identity. Furthermore, the application may determine if the user identity belongs to any one of a number of different psychographic profiles based on data accessed from the electronic social networking platform for the user identity.

Various different techniques may be employed to determine the state/territory and/or country in which a user identity's hometown or current residence is located when the hometown or current residence data for the user identity returned by the electronic social networking platform provides an indication of a city but not the state/territory and/or country in which the city is located. In some implementations, the hometown or current residence data for the user identity returned by the electronic social networking platform may include geographic coordinates corresponding to the user identity's hometown or current residence city. In such implementations, the geographic coordinates may be used to identify the location of the city, from which the state/territory and/or country in which the city is located then can be determined. In other implementations, the city returned by the electronic social networking platform may be compared to hometown or current residence cities already accessed from the electronic social networking platform for other user identities, and, if the city matches one of the cities already accessed from the electronic social networking platform for one or more other user identities, the state/territory and/or country data associated with the matched city may be assumed to be the same. In the event that the city returned by the electronic social networking platform matches multiple cities already accessed from the electronic social networking platform located in different states/territories and/or countries, the state/territory and/or country data associated with the matching city corresponding to the greatest number of other user identities may be assumed to be the state/territory and/or country to associate with the city.

Various different techniques may be employed to determine if a user identity's current residence is urban or rural. For example, a database of geographic locations (e.g., identified by one or more of city, state/territory, and/or country name; latitude/longitude or other geographic coordinates; etc.) known to be urban locations may be maintained. When a user identity's current residence location is accessed from the electronic social networking platform, the user identity's current residence location may be compared to the geographic locations known to be urban locations. If the user identity's current residence location matches one of the geographic locations known to be an urban location, then the user identity's current residence may be determined to be urban. If the user identity's current residence location does not match any of the geographic locations known to be urban locations, one or more databases that store population data for different locations may be accessed. If the population for the user identity's current residence location can be determined by accessing the database(s) storing population data, and the population for the user identity's current residence location is greater than or equal to a defined threshold value (e.g., 15,000), then the user identity's current residence may be determined to be urban. If the population for the user identity's current residence location can be determined by accessing the database(s) storing population data, and the population for the user identity's current residence location is less than a defined threshold value (e.g., 15,000), then the user identity's current residence may be determined to be rural. If the population for the user identity's current residence location cannot be determined by accessing the database(s) storing population data, the application may be unable to determine if the user identity's current residence location is urban or rural.

Various different techniques may be employed to determine if a user identity's current residence belongs to a particular metro area. For example, a database of known metro areas may be maintained. This database may store geographic coordinates for each of the known metro areas. In some implementations, these coordinates may correspond to the primary city around which the metro area is centered (e.g., the coordinates may be the coordinates for the center of the city around which the metro area is centered). In other implementations, these coordinates may correspond to the geographic center of the metro area. In still other implementations, these coordinates may correspond to boundaries of the metro area. When a user identity's current residence location is accessed from the electronic social networking platform, geographic coordinates for the user identity's current residence may be determined. In some implementations, geographic coordinates for the user identity's current residence may be provided by the electronic social networking platform. In other implementations, the electronic social networking platform may return the city, state/territory, and/or country name of the user identity's current residence. In such implementations, a query may be run against the city, state/territory, and/or country name of the user identity's current residence to determine geographic coordinates for the user identity's current residence. Once geographic coordinates for the user identity's current residence have been determined, distances between the geographic coordinates for the user identity's current residence and any one or more of the geographic coordinates for the known metro areas may be calculated. If the distance between the geographic coordinates for the user identity's current residence and the geographic coordinates for any known metro area is determined to be less than or equal to a defined threshold distance (e.g., 60 miles), the user identity's current residence may be determined to be a part of that metro area. In the event that the distances between the geographic coordinates for the user identity's current residence and the geographic coordinates for multiple metro areas are less than or equal to the defined threshold distance, the user identity's current residence may be determined to be a part of the metro area to which it is closest. If the distance between the geographic coordinates for the user identity's current residence and the geographic coordinates for all of the known metro areas is determined to exceed a defined threshold distance (e.g., 60 miles), the user identity's current residence may be determined to not be a part of any metro area.

Various different techniques may be employed to estimate a user identity's income based on data accessed from the electronic social networking platform. One particular example is described below.

First, a determination may be made as to whether the user identity likely has an income. This determination may be made based upon one or more of the user identity's age, employment history, and education history. If the user identity has a current employer specified in his/her employment history, the user identity may be determined to have an income irrespective of the user identity's age and/or education history. If the user identity is less than 18 years old and does not have a current employer specified in his/her employment history, the user identity may be determined not to have an income. If the user identity is between 18 years old and 21 years old, does not have a current employer specified in his/her employment history, and does not have a college/university or a graduate school specified in his/her employment history, the user identity may be determined to have an income. In contrast, if the user identity is between 18 years old and 21 years old, does not have a current employer specified in his/her employment history, and does have a college/university or a graduate school specified in his/her employment history, the user identity may be determined not to have an income. If the user identity is between 22 years old and 25 years old, does not have a current employer specified in his/her employment history, and does not have a graduate school specified in his/her employment history, the user identity may be determined to have an income. In contrast, if the user identity is between 22 years old and 25 years old, does not have a current employer specified in his/her employment history, and does have a graduate school specified in his/her employment history, the user identity may be determined to not have an income. If the user identity is between 25 years old and 65 years old and does not have a current employer specified in his/her employment history, the user identity still may be determined to have an income. If the user identity is more than 65 years old and does not have a current employer specified in his/her employment history, the user identity may be determined not to have an income. Finally, if no age data is returned from the electronic social networking platform for the user identity, the application may not be able to estimate the user identity's income.

If the user identity is determined to have an income, a base income then is determined for the user identity. Different techniques may be employed to determine a base income for the user identity. For example, one or more databases may be maintained that store base incomes to be used for user identities based on the current residence locations of the user identities. In some implementations, the same base income may be used for all user identities within a single country. In such implementations, the base income to be used for user identities from each country may be the mean or median income for the country. In other implementations, different base incomes may be used for user identities from a single country. In such implementations, the base incomes to be used may vary at the regional, state, or even city level and may be based on the mean or median incomes for the corresponding regions, states, or cities. For example, the base incomes to be used for user identities residing in one country may be determined based on the cities in the country where the user identities currently reside. More particularly, the base income to be used for a user identity may be the mean income for individuals in the user identity's current residence city. Alternatively, the base income to be used for a user identity may be the median income for individuals in the user identity's current residence city.

After determining the base income for the user identity, age and education level multipliers then are determined for the user identity. The age multiplier for the user identity may be calculated according to Equation 3 below:

$$\left(\frac{0.72}{1+e^{-0.345(age-24.3)}}+0.344\right)\cdot(1+0.00481(age-24.3)) \quad \text{(Eq. 3)}$$

where "age" represents the user identity's age in years.

Meanwhile, the education level multiplier for the user identity depends on the user identity's education history. If the user identity's age is less than 22 years old, the user identity's education level multiplier may be calculated according to Equation 4 below. Similarly, if the user identity's education history specifies a high school but no college/university or graduate school, the user identity's education level multiplier may be calculated according to Equation 4 below:

$$\frac{0.250}{1+e^{(7.0\times10^{-5})(baseincome-75,000)}}+0.350 \quad \text{(Eq. 4)}$$

where "base income" represents the base income determined for the user identity as discussed above.

If the user identity's education history specifies a college/university but no graduate school, and the user identity is at least 22 years old or no age is specified for the user identity, the user identity's education multiplier may be calculated according to Equation 5 below. Similarly, if the user identity's education history specifies a graduate school and the user identity is less than 25 years old, the user identity's education level multiplier may be calculated according to Equation 5 below:

$$\frac{0.400}{1+e^{(7.0\times10^{-5})(baseincome-75,000)}}+0.950 \quad \text{(Eq. 5)}$$

where "base income" represents the base income determined for the user identity as discussed above.

If the user identity's education history specifies a graduate school and the user identity is at least 25 years old, the user identity's education level multiplier may be calculated according to Equation 6 below:

$$\frac{0.600}{1+e^{(7.0\times10^{-5})(baseincome-90,000)}}+1.8 \quad \text{(Eq. 6)}$$

where "base income" represents the base income determined for the user identity as discussed above.

The education level multiplier for a user identity who does not satisfy any of the above conditions is "1."

After the age and education level multipliers for the user identity have been determined, the user's estimated income is determined according to Equation 7 below:

est.income=(base income)×(age multiplier)×(education level multiplier)     (Eq. 7)

Various different techniques may be employed to estimate a user identity's affluence based on data accessed from the electronic social networking platform. In one example, an affluence score for a user identity may be determined for the user identity based on the income estimated for the user identity, for example, as described above. More particularly, the affluence score for the user identity may be calculated by dividing the estimated income for the user identity by the highest estimated income for all user identities for which the application is able to calculate an estimated income and then multiplying the result by one hundred.

Various different techniques may be employed to estimate a user identity's influence based on data accessed from the electronic social networking platform. One particular example is described below.

In this example, an influence score may be calculated for a user identity based on the user identity's activity within the electronic social networking platform over a defined period of time (e.g., the previous 30 days, the previous 60 days, the previous 90 days, the previous year, etc.). First, the number of "status posts," M, that the user identity has published within the electronic social networking platform during the defined period of time is determined. In addition, the number of distinct users who endorsed each of the M posts is determined, and the number of distinct users who commented on each of the M posts is determined. A raw influence score for the user identity then may be calculated according to Equation 8 below:

raw influence=$\sqrt{M}\cdot(\Sigma_{i=1}^{M}$ # distinct users endorsing post$_i$)$\cdot 3(\Sigma_{i=1}^{M}$ # distinct users commenting on post$_i$)     (Eq. 8)

A final influence score for the user identity then is calculated for the user identity by converting the user identity's raw influence score to a logarithmic scale and dividing by a maximum "cut-off" value so that the user identity's final influence score is within the range 0-99 according to Equation 9 below:

$$\text{influence} = 99 \times \frac{\log_{10}(1 + \text{raw influence})}{\log_{10}(1 + \text{Max(raw influence)})} \qquad \text{(Eq. 9)}$$

Various different techniques may be employed to estimate a user identity's popularity based on data accessed from the electronic social networking platform. One particular example is described below.

In this example, a popularity score may be calculated for a user identity based on targeted "wall" or "timeline" posts from other user identities, "wall" or "timeline" posts from gaming applications, and/or event invitations that the user identity received within the electronic social networking platform over a defined period of time (e.g., the previous 30 days, the previous 60 days, the previous 90 days, the previous year, etc.).

First, the "wall" or "timelines posts from other user identities, the "wall" or "timelines" posts from gaming applications, and the event invitations that the user received within the electronic social networking platform during the defined time period are identified. In addition, the sources of each of the identified "wall" or "timeline" posts from other user identities, the "wall" or "timeline" posts from gaming applications, and the event invitations are identified. Then, for each identified source, i, of "wall" or "timelines posts from other user identities, "wall" or "timeline" posts from gaming applications, and event invitations, a weighted score is calculated according to Equation 10 below:

$$n_{source_i} = (\text{\# posts posted}) + 0.1(\text{\# of gaming posts}) + 2 \\ (\text{\#quality event invites sent}) \qquad \text{(Eq. 10)}$$

where "# of posts posted" represents the number of "wall" or "timeline" posts from a user identity that originated from the source, i, "# of gaming posts" represents the number of "wall" or "timeline" posts from gaming applications that originated from the source, i, and "# quality event invites sent" represents the number of event invitations for which more than a defined threshold of invitees have accepted an invitation that originated from the source, i.

After the score $n_{source_i}$ has been calculated for each source, i, a sum of the scores $n_{source_i}$ for all M sources may be calculated according to Equation 11 below:

$$n_{total} = \Sigma_{i=1}^{M} n_{source_i} \qquad \text{(Eq. 11)}$$

Then, a raw popularity score for the user identity may be calculated according to Equation 12 below:

$$\text{raw popularity} = \sum_{i=1}^{M} n_{source_i} \cdot \left( \log_{10} \left( \frac{n_{total}}{n_{source_i}} \right) \right) \qquad \text{(Eq. 12)}$$

A final popularity score for the user identity then is calculated for the user identity by converting the user identity's raw popularity score to a logarithmic scale and dividing by a maximum "cut-off" value so that the user identity's final popularity score is within the range 0-99 according to Equation 13 below:

$$\text{popularity} = 99 \times \frac{\log_{10}(1 + \text{raw popularity})}{\log_{10}(1 + \text{Max(raw popularity)})} \qquad \text{(Eq. 13)}$$

As discussed above, the application may determine if user identities for whom the application accessed data from the electronic social networking platform belong to one or more different psychographic profiles based on the data for the user identities that the application accessed for the user identities from the electronic social networking platform. A variety of different techniques may be used to determine if a user identity belongs to a particular psychographic profile, and the application may consider a variety of different types of data accessed for the user identity from the electronic social networking platform in determining if the user identity belongs to the particular psychographic profile. For example, the application may consider the user identity's "page" endorsements, "check-ins," and/or demographic characteristics when determining if the user identity belongs to a particular psychographic profile.

Each psychographic profile may be defined as corresponding to a collection of certain "pages" within the electronic social networking platform. The collection of "pages" corresponding to any particular psychographic profile may be identified based on "pages" that have been specifically designated within the application (e.g., "pages" that have been hardcoded within the application) as belonging to the psychographic profile, "pages" that have been assigned one or more category designations within the electronic social networking platform, and/or "pages" that include one or more specified keywords within the text of their "page" descriptions within the electronic social networking platform.

The application may determine if a user identity belongs to a particular psychographic profile based on the extent to which the user identity has endorsed "pages" that the application identities as corresponding to the particular psychographic profile. The application may consider any user identity who has endorsed at least one "page" that corresponds to the particular psychographic profile as a candidate for the psychographic profile. For a user identity that the application has identified as a candidate for a particular psychographic profile, the application then may calculate a psychographic profile page score for the user identity according to Equation 14 below:

$$\text{psychographic profile page score} = A^2 \cdot B \qquad \text{(Eq.14)}$$

where A represents the number of "pages" that the user identity has endorsed that correspond to the particular psychographic profile and B represents the total number of "pages" that the user identity has endorsed within the electronic social networking platform. As described in greater detail below, the application then may use the psychographic profile page score calculated for the user identity in determining if the user identity belongs to the particular psychographic profile.

Another factor the application may consider in determining whether a user identity belongs to a particular psychographic profile is the user identity's "check-ins" that the application accessed from the electronic social networking platform. Each psychographic profile may be defined as corresponding to a collection of certain "check-in" locations. The collection of "check-in" locations corresponding to any particular psychographic profile may be identified based on "check-in" locations that have been assigned one or more category designations within the electronic social networking platform and/or "check-in" locations that have been assigned one or more category designations by the application (e.g., specific "check-in" locations that have been hardcoded as belonging to one or more different categories by the application itself). The application may determine if a user identity belongs to a particular psychographic profile based on the extent to which the user identity has "checked-in" at locations that the application identifies as corresponding to the particular psychographic profile.

Examples of techniques for determining if a user identity belongs to the different psychographic profiles introduced above are now described.

Various different techniques may be employed to determine if a user identity belongs to the music lovers psychographic profile. One particular example is described below. The music lovers psychographic profile may be defined as corresponding to "pages" categorized within the electronic social networking platform as musician/band, musical genre, song, music video, and music. If a user identity has endorsed any "page" within the electronic social networking platform categorized as belonging to any one of these categories, the application may consider the user identity to be a candidate for the music lovers psychographic profile and calculate a psychographic profile page score for the user identity. If the psychographic profile page score for the user identity is within a predefined top percentile (e.g., the top 20%) of psychographic profile page scores for all user identities identified as candidates for the music lovers psychographic profile, then the application may determine that the user identity belongs to the music lovers psychographic profile. Even if the application determines that the user identity's "page" endorsements do not qualify the user identity for membership in the music lovers psychographic profile, the application still may determine that the user identity belongs to the music lovers psychographic profile based on the user identity's "check-in" activity. For example, the application may determine that the user identity belongs to the music lovers psychographic profile if the user identity has "checked-in" to locations classified by the electronic social networking platform and/or the application as concert/music venues or music stores more than six times within the previous six months.

Various different techniques may be employed to determine if a user identity belongs to the movie lovers psychographic profile. One particular example is described below. The movie lovers psychographic profile may be defined as corresponding to "pages" categorized within the electronic social networking platform as movie, actor/director, movie genre, movie theater, and movie general. If a user identity has endorsed any "page" within the electronic social networking platform categorized as belonging to any one of these categories, the application may consider the user identity to be a candidate for the movie lovers psychographic profile and calculate a psychographic profile page score for the user identity. If the psychographic profile page score for the user identity is within a predefined top percentile (e.g., the top 20%) of psychographic profile page scores for all user identities identified as candidates for the movie lovers psychographic profile, then the application may determine that the user identity belongs to the movie lovers psychographic profile. Even if the application determines that the user identity's "page" endorsements do not qualify the user identity for membership in the movie lovers psychographic profile, the application still may determine that the user identity belongs to the movie lovers psychographic profile based on the user identity's "check-in" activity. For example, the application may determine that the user identity belongs to the movie lovers psychographic profile if the user identity has "checked-in" to locations classified by the electronic social networking platform and/or the application as movie theaters at least once a week every week for the previous six months.

Various different techniques may be employed to determine if a user identity belongs to the TV fans psychographic profile. One particular example is described below. The TV fans psychographic profile may be defined as corresponding to "pages" categorized within the electronic social networking platform as TV show, TV network, TV channel, TV, and TV genre. If a user identity has endorsed any "page" within the electronic social networking platform categorized as belonging to any one of these categories, the application may consider the user identity to be a candidate for the TV fans psychographic profile and calculate a psychographic profile page score for the user identity. If the psychographic profile page score for the user identity is within a predefined top percentile (e.g., the top 20%) of psychographic profile page scores for all user identities identified as candidates for the TV fans psychographic profile, then the application may determine that the user identity belongs to the TV fans psychographic profile.

Various different techniques may be employed to determine if a user identity belongs to the social activists psychographic profile. One particular example is described below. The social activists psychographic profile may be defined as corresponding to "pages" categorized within the electronic social networking platform as non-profit organization and cause. If a user identity has endorsed any "page" within the electronic social networking platform categorized as belonging to any one of these categories, the application may consider the user identity to be a candidate for the social activist psychographic profile and calculate a psychographic profile page score for the user identity. If the psychographic profile page score for the user identity is within a predefined top percentile (e.g., the top 20%) of psychographic profile page scores for all user identities identified as candidates for the social activist psychographic profile, then the application may determine that the user identity belongs to the social activist psychographic profile.

Various different techniques may be employed to determine if a user identity belongs to the sports lovers psychographic profile. One particular example is described below. The sports lovers psychographic profile may be defined as corresponding to "pages" categorized within the electronic social networking platform as athlete, professional sports team, sports league, sports/recreation/activities, recreation/sports, amateur sports team, school sports team, sport, and sports. If a user identity has endorsed any "page" within the electronic social networking platform categorized as belonging to any one of these categories, the application may consider the user identity to be a candidate for the sports lovers psychographic profile and calculate a psychographic profile page score for the user identity. If the psychographic profile page score for the user identity is within a predefined top percentile (e.g., the top 20%) of psychographic profile page scores for all user identities identified as candidates for the sports lovers psychographic profile, then the application may determine that the user identity belongs to the sports lovers psychographic profile. Even if the application determines that the user identity's "page" endorsements do not qualify the user identity for membership in the sport lovers psychographic profile, the application still may determine that the user identity belongs to the sport lovers psychographic profile based on the user identity's "check-in" activity. For example, the application may determine that the user identity belongs to the sport lovers psychographic profile if the user identity has "checked-in" to locations classified by the electronic social networking platform and/or the application as sporting venues more than six times within the previous six months.

Various different techniques may be employed to determine if a user identity belongs to the food lovers psychographic profile. One particular example is described below. The food lovers psychographic profile may be defined as corresponding to "pages" categorized within the electronic social networking platform as restaurant/café and food. If a user identity has endorsed any "page" within the electronic social networking platform categorized as belonging to any one of these categories, the application may consider the user identity to be a candidate for the food lovers psychographic profile and calculate a psychographic profile page score for the user identity. If the psychographic profile page score for the user identity is within a predefined top percentile (e.g., the top 20%) of psychographic profile page scores for all user identities identified as candidates for the food lovers psychographic profile, then the application may determine that the user identity belongs to the food lovers psychographic profile. Even if the application determines that the user identity's "page" endorsements do not qualify the user identity for membership in the food lovers psychographic profile, the application still may determine that the user identity belongs to the food lovers psychographic profile based on the user identity's "check-in" activity. For example, the application may determine that the user identity belongs to the food lovers psychographic profile if the user identity has "checked-in" to locations classified by the electronic social networking platform and/or the application as restaurants at least once a week for the previous six months.

Various different techniques may be employed to determine if a user identity belongs to the book lovers psychographic profile. One particular example is described below. The book lovers psychographic profile may be defined as corresponding to "pages" categorized within the electronic social networking platform as book genre, book, author, and library. If a user identity has endorsed any "page" within the electronic social networking platform categorized as belonging to any one of these categories, the application may consider the user identity to be a candidate for the book lovers psychographic profile and calculate a psychographic profile page score for the user identity. If the psychographic profile page score for the user identity is within a predefined top percentile (e.g., the top 20%) of psychographic profile page scores for all user identities identified as candidates for the book lovers psychographic profile, then the application may determine that the user identity belongs to the book lovers psychographic profile.

Various different techniques may be employed to determine if a user identity belongs to the travel lovers psychographic profile. One particular example is described below. The travel lovers psychographic profile may be defined as corresponding to "pages" categorized within the electronic social networking platform as hotel, travel/leisure, bags/luggage, transportation, and transport/freight. If a user identity has endorsed any "page" within the electronic social networking platform categorized as belonging to any one of these categories, the application may consider the user identity to be a candidate for the travel lovers psychographic profile and calculate a psychographic profile page score for the user identity. If the psychographic profile page score for the user identity is within a predefined top percentile (e.g., the top 20%) of psychographic profile page scores for all user identities identified as candidates for the travel lovers psychographic profile, then the application may determine that the user identity belongs to the travel lovers psychographic profile.

Various different techniques may be employed to determine if a user identity belongs to the art connoisseurs psychographic profile. One particular example is described below. The art connoisseurs psychographic profile may be defined as corresponding to "pages" categorized within the electronic social networking platform as museum/art gallery, arts/humanities, and artist. If a user identity has endorsed any "page" within the electronic social networking platform categorized as belonging to any one of these categories, the application may consider the user identity to be a candidate for the art connoisseurs psychographic profile and calculate a psychographic profile page score for the user identity. If the psychographic profile page score for the user identity is within a predefined top percentile (e.g., the top 20%) of psychographic profile page scores for all user identities identified as candidates for the art connoisseurs psychographic profile, then the application may determine that the user identity belongs to the art connoisseurs psychographic profile. Even if the application determines that the user identity's "page" endorsements do not qualify the user identity for membership in the art connoisseurs psychographic profile, the application still may determine that the user identity belongs to the art connoisseurs psychographic profile based on the user identity's "check-in" activity. For example, the application may determine that the user identity belongs to the art connoisseurs psychographic profile if the user identity has "checked-in" to locations classified by the electronic social networking platform and/or the application as museums or art galleries on average once a month for the previous six months.

Various different techniques may be employed to determine if a user identity belongs to the health and beauty conscious psychographic profile. One particular example is described below. The health and beauty conscious psychographic profile may be defined as corresponding to "pages" categorized within the electronic social networking platform as health/wellness, vitamins/supplements, health/beauty, lifestyle, and spas/beauty/personal care or "pages" that include the keyword "fashion" in their descriptions. If a user identity has endorsed any "page" within the electronic social networking platform categorized belonging to one of these categories or that includes the keyword "fashion" in its description, the application may consider the user identity to be a candidate for the health and beauty conscious psychographic profile and calculate a psychographic profile page score for the user identity. If the psychographic profile page score for the user identity is within a predefined top percentile (e.g., the top 20%) of psychographic profile page scores for all user identities identified as candidates for the health and beauty conscious psychographic profile, then the application may determine that the user identity belongs to the health and beauty conscious psychographic profile. Even if the application determines that the user identity's "page" endorsements do not qualify the user identity for membership in the health and beauty conscious psychographic profile, the application still may determine that the user identity belongs to the health and beauty conscious psychographic profile based on the user identity's "check-in" activity. For example, the application may determine that the user identity belongs to the health and beauty conscious psychographic profile if the user identity has "checked-in" to locations classified by the electronic social networking platform and/or the application as fitness centers, or exercise, cosmetics, fashion, health and beauty, beauty products, fashion show, health and fitness, health and hygiene, or hair care locations at least once a week for the previous six months.

Various different techniques may be employed to determine if a user identity belongs to the game lovers psychographic profile. One particular example is described below. The game lovers psychographic profile may be defined as corresponding to "pages" categorized within the electronic social networking platform as games and games/toys. If a user identity has endorsed any "page" within the electronic social networking platform categorized as belonging to any one of these categories, the application may consider the user identity to be a candidate for the game lovers psychographic profile and calculate a psychographic profile page score for the user identity. If the psychographic profile page score for the user identity is within a predefined top percentile (e.g., the top 20%) of psychographic profile page scores for all user identities identified as candidates for the game lovers psychographic profile, then the application may determine that the user identity belongs to the game lovers psychographic profile.

Various different techniques may be employed to determine if a user identity belongs to the techies psychographic profile. One particular example is described below. The techies psychographic profile may be defined as corresponding to "pages" categorized within the electronic social networking platform as appliance, computers/Internet, computers/technology, Internet/software, software, and computers. If a user identity has endorsed any "page" within the electronic social networking platform categorized as belonging to any one of these categories, the application may consider the user identity to be a candidate for the techies psychographic profile and calculate a psychographic profile page score for the user identity. If the psychographic profile page score for the user identity is within a predefined top percentile (e.g., the top 20%) of psychographic profile page scores for all user identities identified as candidates for the techies psychographic profile, then the application may determine that the user identity belongs to the techies psychographic profile.

Various different techniques may be employed to determine if a user identity belongs to the comedy lovers psychographic profile. One particular example is described below. The comedy lovers psychographic profile may be defined as corresponding to "pages" categorized within the electronic social networking platform as comedians, comedy, or humor. If a user identity has endorsed any "page" within the electronic social networking platform categorized as belonging to any one of these categories, the application may consider the user identity to be a candidate for the comedy lovers psychographic profile and calculate a psychographic profile page score for the user identity. If the psychographic profile page score for the user identity is within a predefined top percentile (e.g., the top 20%) of psychographic profile page scores for all user identities identified as candidates for the comedy lovers psychographic profile, then the application may determine that the user identity belongs to the comedy lovers psychographic profile. Even if the application determines that the user identity's "page" endorsements do not qualify the user identity for membership in the comedy lovers psychographic profile, the application still may determine that the user identity belongs to the comedy lovers psychographic profile based on the user identity's "check-in" activity. For example, the application may determine that the user identity belongs to the comedy lovers psychographic profile if the user identity has "checked-in" to locations classified by the electronic social networking platform and/or the application as comedy clubs more than three times within the previous six months.

Various different techniques may be employed to determine if a user identity belongs to the car lovers psychographic profile. One particular example is described below. The car lovers psychographic profile may be defined as corresponding to "pages" categorized within the electronic social networking platform as automotive, cars, and automobiles and parts. If a user identity has endorsed any "page" within the electronic social networking platform categorized as belonging to any one of these categories, the application may consider the user identity to be a candidate for the car lovers psychographic profile and calculate a psychographic profile page score for the user identity. If the psychographic profile page score for the user identity is within a predefined top percentile (e.g., the top 20%) of psychographic profile page scores for all user identities identified as candidates for the car lovers psychographic profile, then the application may determine that the user identity belongs to the car lovers psychographic profile.

Various different techniques may be employed to determine if a user identity belongs to the brand conscious psychographic profile. One particular example is described below. The brand conscious psychographic profile may be defined as corresponding to "pages" categorized within the electronic social networking platform as jewelry/watches and clothing as well as the following specific "pages": Givenchy, Lord & Taylor, Calvin Klein Underwear, Donna Karan New York, GUESS by Marciano, UNITED COLORS OF BENETTON, DKNY, Lucky Brand, Nine West, Kenneth Cole, A|X Armani Exchange, Diesel, HUGO BOSS, BCBG—BCBGMAXAZRIA, GUESS? Inc., Juicy Couture, ARMANI, Barneys New York, INTERMIX, ALEXANDER WANG, bebe, Saks Fifth Avenue, Marc Jacobs Intl, Michael Kors—The Official Page, Neiman Marcus, Dolce & Gabbana, Tory Burch, Gucci, Burberry, ZARA, Victoria's Secret Pink, and Victoria's Secret. If a user identity has endorsed any "page" within the electronic social networking platform categorized as belonging the categories jewelry/watches or clothing or any of the other specific "pages," the application may consider the user identity to be a candidate for the brand conscious psychographic profile and calculate a psychographic profile page score for the user identity. If the psychographic profile page score for the user identity is within a predefined top percentile (e.g., the top 20%) of psychographic profile page scores for all user identities identified as candidates for the brand conscious psychographic profile, then the application may determine that the user identity belongs to the brand conscious psychographic profile.

Various different techniques may be employed to determine if a user identity belongs to the religious people psychographic profile. One particular example is described below. The religious people psychographic profile may be defined as corresponding to "pages" categorized within the electronic social networking platform as church/religious organization and religion. If a user identity has endorsed any "page" within the electronic social networking platform categorized as belonging to any one of these categories, the application may consider the user identity to be a candidate for the religious people psychographic profile and calculate a psychographic profile page score for the user identity. If the psychographic profile page score for the user identity is within a predefined top percentile (e.g., the top 20%) of psychographic profile page scores for all user identities identified as candidates for the religious people psychographic profile, then the application may determine that the user identity belongs to the religious people psychographic profile. Even if the application determines that the user identity's "page" endorsements do not qualify the user identity for membership in the religious people psychographic profile, the application still may determine that the user identity belongs to the religious people psychographic profile based on the user identity's "check-in" activity. For example, the application may determine that the user identity belongs to the religious people psychographic profile if the user identity has "checked-in" to locations classified by the electronic social networking platform and/or the application as churches, synagogues or places of worship at least six times within the previous six months.

Various different techniques may be employed to determine if a user identity belongs to the outdoor enthusiasts psychographic profile. One particular example is described below. The outdoor enthusiasts psychographic profile may be defined as corresponding to "pages" categorized within the electronic social networking platform as sports/recreation, outdoor gear, attractions/things to do, tours, and landmark. If a user identity has endorsed any "page" within the electronic social networking platform categorized as belonging to any one of these categories, the application may consider the user identity to be a candidate for the outdoor enthusiasts psychographic profile and calculate a psychographic profile page score for the user identity. If the psychographic profile page score for the user identity is within a predefined top percentile (e.g., the top 20%) of psychographic profile page scores for all user identities identified as candidates for the outdoor enthusiasts psychographic profile, then the application may determine that the user identity belongs to the outdoor enthusiasts psychographic profile.

Various different techniques may be employed to determine if a user identity belongs to the frequent travelers psychographic profile. One particular example is described below. The application may determine that the user identity belongs to the frequent travelers psychographic profile if the user identity has "checked-in" to locations classified by the electronic social networking platform and/or the application as airports or hotels or to locations that are more than one hundred miles away from his/her current residence city at least once a week for the previous six months.

Various different techniques may be employed to determine if a user identity belongs to the do-it-yourselfers psychographic profile. One particular example is described below. The do-it-yourselfers psychographic profile may be defined as corresponding to "pages" categorized within the electronic social networking platform as home/garden, farming/agriculture, household supplies, home improvement, and tools/equipment as well as the following specific "pages": IKEA, Lowe's Home Improvement, and The Home Depot. If a user identity has endorsed any "page" within the electronic social networking platform categorized as belonging to the categories home/garden, farming/agriculture, household supplies, home improvement, and tools/equipment or any of the other specific "pages," the application may consider the user identity to be a candidate for the do-it-yourselfers psychographic profile and calculate a psychographic profile page score for the user identity. If the psychographic profile page score for the user identity is within a predefined top percentile (e.g., the top 20%) of psychographic profile page scores for all user identities identified as candidates for the do-it-yourselfers psychographic profile, then the application may determine that the user identity belongs to the do-it-yourselfers psychographic profile.

Various different techniques may be employed to determine if a user identity belongs to the party-goers psychographic profile. One particular example is described below. To be considered as a potential member of the party-goer psychographic profile, the user identity may need to be within a defined age range (e.g., between 18 years old and 45 years old). Furthermore, the party-goers psychographic profile may be defined as corresponding to "pages" categorized within the electronic social networking platform as arts/entertainment/nightlife, bar, and club. If a user identity is within the defined age range and has endorsed any "page" within the electronic social networking platform categorized as belonging to any one of these categories, the application may consider the user identity to be a candidate for the party-goers psychographic profile and calculate a psychographic profile page score for the user identity. If the psychographic profile page score for the user identity is within a predefined top percentile (e.g., the top 20%) of psychographic profile page scores for all user identities identified as candidates for the party-goers psychographic profile, then the application may determine that the user identity belongs to the party-goers psychographic profile. Even if the application determines that the user identity's "page" endorsements do not qualify the user identity for membership in the party-goers psychographic profile, the application still may determine that the user identity belongs to the party-goers psychographic profile based on the user identity's "check-in" activity. For example, the application may determine that the user identity belongs to the party-goers psychographic profile if the user identity is within the defined age range and has "checked-in" to locations classified by the electronic social networking platform and/or the application as bars, nightclubs, or adult entertainment at least once a week over the previous six months.

Various different techniques may be employed to determine if a user identity belongs to the politics—Democrats psychographic profile. One particular example is described below. The politics—Democrats psychographic profile may be defined as corresponding to "pages" within the electronic social networking platform that represent politicians who are Democrats. If a user identity has endorsed at least some predefined number (e.g., 3) of "pages" that represent politicians who are Democrats, the application may determine that the user identity belongs to the politics—Democrats psychographic profile. Additionally or alternatively, the application may identify the user identity as belonging to the politics—Democrats psychographic profile if the user identity's profile indicates that the user identity is a Democrat or liberal leaning.

Various different techniques may be employed to determine if a user identity belongs to the pet lovers psychographic profile. One particular example is described below. The pet lovers psychographic profile may be defined as corresponding to "pages" categorized within the electronic social networking platform as pet supplies, animal, and animal breed. If a user identity has endorsed any "page" within the electronic social networking platform categorized as belonging to any one of these categories, the application may consider the user identity to be a candidate for the pet lovers psychographic profile and calculate a psychographic profile page score for the user identity. If the psychographic profile page score for the user identity is within a predefined top percentile (e.g., the top 20%) of psychographic profile page scores for all user identities identified as candidates for the pet lovers psychographic profile, then the application may determine that the user identity belongs to the pet lovers psychographic profile.

Various different techniques may be employed to determine if a user identity belongs to the brides-to-be psychographic profile. One particular example is described below. The application may determine that the user identity belongs to the brides-to-be psychographic profile if the user identity's profile indicates that the user identity's gender is female and that the user identity's relationship status is engaged. To be considered as a potential member of the brides-to-be psychographic profile if the user identity's profile does not indicate that the user identity is female and engaged, the user identity may need to be female, unmarried, and within a defined age range (e.g., between 17 years old and 58 years old). Furthermore, the brides-to-be psychographic profile may be defined as corresponding to "pages" that include one or more of the keywords "wedding," "bride," and "bridal" in their descriptions as well as the following specific pages: Kleinfeld Bridal (Official Page), 'DulhanExpo' Bridal Shows, BRIDES, and Washingtonian Bride & Groom. If a user identity is female, unmarried, and within the defined age range and has endorsed at least some threshold number (e.g., 3) of "pages" from among the specifically-identified pages or that include one or more of the keywords "wedding," "bride," and "bridal," then the application may determine that the user identity belongs to the brides-to-be psychographic profile.

Various different techniques may be employed to determine if a user identity belongs to the budget shoppers psychographic profile. One particular example is described below. The budget shoppers psychographic profile may be defined as corresponding to the following specific "pages": Half Price Books, Nasty Pig, Artbeads.com, Beyond the Rack, Belk, Soap.com, Kmart, Dollar General, QVC, Costco, Sears, Marshalls, Wal-Mart, Kohl's, and Target. If a user identity has endorsed any one of these specific "pages" within the electronic social networking platform, the application may consider the user identity to be a candidate for the budget shoppers psychographic profile and calculate a psychographic profile page score for the user identity. If the psychographic profile page score for the user identity is within a predefined top percentile (e.g., the top 20%) of psychographic profile page scores for all user identities identified as candidates for the budget shoppers psychographic profile, then the application may determine that the user identity belongs to the budget shoppers psychographic profile.

Various different techniques may be employed to determine if a user identity belongs to the deal hunters psychographic profile. One particular example is described below. The deal hunters psychographic profile may be defined as corresponding to any "page" that includes at least one of the keywords "bargains," "coupon," "groupon," "deals," "discount" and "thrifty" in its description. If a user identity has endorsed any "page" including at least one of these keywords in its description, the application may consider the user identity to be a candidate for the deal hunters psychographic profile and calculate a psychographic profile page score for the user identity. If the psychographic profile page score for the user identity is within a predefined top percentile (e.g., the top 20%) of psychographic profile page scores for all user identities identified as candidates for the deal hunters psychographic profile, then the application may determine that the user identity belongs to the deal hunters psychographic profile.

Various different techniques may be employed to determine if a user identity belongs to the politics—Republicans psychographic profile. One particular example is described below. The politics—Republicans psychographic profile may be defined as corresponding to "pages" within the electronic social networking platform that represent politicians who are Republicans. If a user identity has endorsed at least some predefined number (e.g., 3) of "pages" that represent politicians who are Republicans, the application may determine that the user identity belongs to the politics—Republicans psychographic profile. Additionally or alternatively, the application may identify the user identity as belonging to the politics—Republicans psychographic profile if the user identity's profile indicates that the user identity is a Republican or conservative leaning.

Various different techniques may be employed to determine if a user identity belongs to the parents of young kids psychographic profile. One particular example is described below. To be considered as a potential member of the parents of young kids psychographic profile, the user identity may need to be within a defined age range (e.g., between 17 years old and 45 years old) and have a relationship status specified as married or in a relationship. Furthermore, the parents of young kids psychographic profile may be defined as corresponding to "pages" categorized within the electronic social networking platform as baby goods/kids goods and games/toys as well as the following specific "pages": Gymboree, Toys "R" Us, Diapers.com, drugstore.com, Amazon.com, and eBay. If a user identity is within the defined age range, has a relationship status specified as married or in a relationship, and has endorsed any "page" within the electronic social networking platform categorized as baby goods/kids goods and games/toys or any one of the specifically identified pages, the application may consider the user identity to be a candidate for the parents of young kids psychographic profile and calculate a psychographic profile page score for the user identity. If the psychographic profile page score for the user identity is within a predefined top percentile (e.g., the top 20%) of psychographic profile page scores for all user identities identified as candidates for the parents of young kids psychographic profile, then the application may determine that the user identity belongs to the parents of young kids psychographic profile.

Various different techniques may be employed to determine if a user identity belongs to the environmentally aware psychographic profile. One particular example is described below. The environmentally aware psychographic profile may be defined as corresponding to the following specific "pages": Greenpeace Portugal, Greenpeace Mexico, National Wildlife Federation, National Park Foundation, Save The Waves, Greenpeace India, Keep Virginia Beautiful, Piedmont Environmental Council, Water.org, Solar on the White House, Greenpeace Akdeniz—Türkiye, Greenpeace USA, Oceana, Conservation International, Environmental Defense Fund, and Greenpeace International. If a user identity has endorsed any one of these specific "pages" within the electronic social networking platform, the application may consider the user identity to be a candidate for the environmentally aware psychographic profile and calculate a psychographic profile page score for the user identity. If the psychographic profile page score for the user identity is within a predefined top percentile (e.g., the top 25%) of psychographic profile page scores for all user identities identified as candidates for the environmentally aware psychographic profile, then the application may determine that the user identity belongs to the environmentally aware psychographic profile.

Various different techniques may be employed to determine if a user identity belongs to the charity minded psychographic profile. One particular example is described below. The charity minded psychographic profile may be defined as corresponding to "pages" categorized within the electronic social networking platform as cause, non-profit organizations, and non-governmental organization (NGO). If a user identity has endorsed any "page" within the electronic social networking platform categorized as belonging to any one of these categories, the application may consider the user identity to be a candidate for the charity minded psychographic profile and calculate a psychographic profile page score for the user identity. If the psychographic profile page score for the user identity is within a predefined top percentile (e.g., the top 20%) of psychographic profile page scores for all user identities identified as candidates for the charity minded psychographic profile, then the application may determine that the user identity belongs to the charity minded psychographic profile.

Various different techniques may be employed to determine if a user identity belongs to the shopping lovers psychographic profile. One particular example is described below. The shopping lovers psychographic profile may be defined as corresponding to "pages" categorized within the electronic social networking platform as clothing. If a user identity has endorsed any "page" within the electronic social networking platform categorized as belonging to the clothing category, the application may consider the user identity to be a candidate for the shopping lovers psychographic profile and calculate a psychographic profile page score for the user identity. If the psychographic profile page score for the user identity is within a predefined top percentile (e.g., the top 20%) of psychographic profile page scores for all user identities identified as candidates for the shopping lovers psychographic profile, then the application may determine that the user identity belongs to the shopping lovers psychographic profile.

Various different techniques may be employed to determine if a user identity belongs to the beverage lovers psychographic profile. One particular example is described below. The beverage lovers psychographic profile may be defined as corresponding to "pages" categorized within the electronic social networking platform as wine/spirits and drink. If a user identity has endorsed any "page" within the electronic social networking platform categorized as belonging to any one of these categories, the application may consider the user identity to be a candidate for the beverage lovers psychographic profile and calculate a psychographic profile page score for the user identity. If the psychographic profile page score for the user identity is within a predefined top percentile (e.g., the top 20%) of psychographic profile page scores for all user identities identified as candidates for the beverage lovers psychographic profile, then the application may determine that the user identity belongs to the beverage lovers psychographic profile.

Various different techniques may be employed to determine if a user identity belongs to the on-line shoppers psychographic profile. One particular example is described below. The on-line shoppers psychographic profile may be defined as corresponding to the following specific "pages": drugstore.com, Amazon.com, and eBay. If a user identity has endorsed any one of these specific "pages" within the electronic social networking platform, the application may consider the user identity to be a candidate for the on-line shoppers psychographic profile and calculate a psychographic profile page score for the user identity. If the psychographic profile page score for the user identity is within a predefined top percentile (e.g., the top 20%) of psychographic profile page scores for all user identities identified as candidates for the on-line shoppers psychographic profile, then the application may determine that the user identity belongs to the on-line shoppers psychographic profile.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification includes many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request for data indicative of a user segment of a social networking platform, with the user segment being associated with one or more user characteristics;
in response to the request, accessing user data of the social networking platform, with an item of the accessed user data being associated with one or more user characteristics indicative of a type of user associated with the item of accessed user data;
comparing the one or more user characteristics that define the user segment to user characteristics associated with the accessed user data;
identifying, based on comparing, a portion of the accessed user data that pertains to users of the social networking platform who are included in the user segment;
analyzing contents of the portion of the accessed user data that pertains to the users who are included in the user segment;
determining, based on analyzing, happiness scores for the users who are included in the user segment, with a happiness score for a user being indicative a happiness of the user or an unhappiness of the user;
based on the determined happiness scores,
identifying a first subset of the users who are included in the user segment as being happy users, with a happy user being a user of the social networking platform who is associated with a happiness score that exceeds a happiness threshold; and
identifying a second subset of the users who are included in the user segment as being unhappy users, with an unhappy user being a user of the social networking platform who is associated with a happiness score that is less than or equal to the happiness threshold;
for a particular user included in the second subset, determining a frequency at which the particular user performs one or more actions to cause generation of user data for the particular user;
comparing the determined frequencies at which the users in the second subset perform the one or more actions to a threshold frequency;
identifying, based on comparing the determined frequencies, a third subset of the users included in the second subset, with a user in the third subset performing the one or more actions less frequently than the threshold frequency; and
generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

2. The computer-implemented method of claim 1, wherein the happiness scores of the users comprise raw happiness scores of the users who are included in the user segment, and wherein the method further comprises:
accessing a mapping of one or more raw happiness scores to scaled happiness scores;
wherein determining comprises:
determining, based on the mapping and based on the raw happiness scores of the users who are included in the user segment, scaled happiness scores for the users who are included in the user segment.

3. The computer-implemented method of claim 1, wherein the happiness scores for the users comprise first happiness scores for the users, and wherein the method further comprises:

receiving a user input that indicates a time period;

analyzing, for each day specified in the time period, contents of the portion of the accessed user data that pertains to the users who are included in the user segment;

analyzing contents of the portion of the accessed user data that pertains to the users who are included in the user segment and that are associated with the time period;

determining, based on analyzing contents for each day in the time period, second happiness scores for the users who are included in the user segment;

determining, for the time period, third happiness scores for the users who are included in the user segment;

comparing at least one of the second happiness scores for the users with at least one of the third happiness scores for the users; and modifying one or more of the second happiness scores for the users and the third happiness scores for the users, based on the comparison.

4. The computer-implemented method of claim 3, wherein the happiness index for the user segment comprises a first happiness index for the user segment, and wherein the method further comprises:

generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users.

5. The computer-implemented method of claim 1, further comprising:

receiving data indicative of a selection of filtering criteria for user characteristics;

filtering the one or more user characteristics that are associated with the user segment in accordance with the filtering criteria; and generating, based on filtering, a filtered user segment;

wherein generating the happiness index for the user segment comprises:

generating a happiness index for the filtered user segment.

6. The computer-implemented method of claim 1, further comprising:

transmitting, to a client device, data indicative of the happiness index for the user segment, with the transmitted data being indicative of a visual representation that specifies a measure of happiness of the user segment.

7. The computer-implemented method of claim 1, further comprising:

determining a sentiment score for one or posts included in the portion of the accessed user data that pertains to users of the social networking platform who are included in the user segment, wherein the happiness scores are based at least in part on the sentiment scores and the analyzing.

8. A system comprising:
one or more processing devices;
one or more machine-readable media configured to store instructions that are executable by the one or more processing devices to perform operations comprising:

receiving a request for data indicative of a user segment of a social networking platform, with the user segment being associated with one or more user characteristics;

in response to the request, accessing user data of the social networking platform, with an item of the accessed user data being associated with one or more user characteristics indicative of a type of user associated with the item of accessed user data;

comparing the one or more user characteristics that define the user segment to user characteristics associated with the accessed user data;

identifying, based on comparing, a portion of the accessed user data that pertains to users of the social networking platform who are included in the user segment;

analyzing contents of the portion of the accessed user data that pertains to the users who are included in the user segment;

determining, based on analyzing, happiness scores for the users who are included in the user segment, with a happiness score for a user being indicative a happiness of the user or an unhappiness of the user;

based on the determined happiness scores,
identifying a first subset of the users who are included in the user segment as being happy users, with a happy user being a user of the social networking platform who is associated with a happiness score that exceeds a happiness threshold; and identifying a second subset of the users who are included in the user segment as being unhappy users, with an unhappy user being a user of the social networking platform who is associated with a happiness score that is less than or equal to the happiness threshold;

for a particular user included in the second subset, determining a frequency at which the particular user performs one or more actions to cause generation of user data for the particular user;

comparing the determined frequencies at which the users in the second subset perform the one or more actions to a threshold frequency;

identifying, based on comparing the determined frequencies, a third subset of the users included in the second subset, with a user in the third subset performing the one or more actions less frequently that the threshold frequency; and generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

9. The system of claim 8, wherein the happiness scores of the users comprise raw happiness scores of the users who are included in the user segment, and wherein the one or more processing devices further perform the operations comprising:

accessing a mapping of one or more raw happiness scores to scaled happiness scores;

wherein determining comprises:
determining, based on the mapping and based on the raw happiness scores of the users who are included in the user segment, scaled happiness scores for the users who are included in the user segment.

10. The system of claim 8, wherein the happiness scores for the users comprise first happiness scores for the users, and wherein the one or more processing devices further perform the operations comprising:
receiving a user input that indicates a time period;
analyzing, for each day specified in the time period, contents of the portion of the accessed user data that pertains to the users who are included in the user segment;
analyzing contents of the portion of the accessed user data that pertains to the users who are include in the user segment and that are associated with the time period;
determining, based on analyzing contents for each day in the time period, second happiness scores for the users who are included in the user segment;
determining, for the time period, third happiness scores for the users who are included in the user segment;
comparing at least one of the second happiness scores for the users with at least one of the third happiness scores for the users; and
modifying one or more of the second happiness scores for the users and the third happiness scores for the users, based on the comparison.

11. The system of claim 10, wherein the happiness index for the user segment comprises a first happiness index for the user segment and wherein the one or more processing devices further perform the operations comprising further comprising:
generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users.

12. The system of claim 8, wherein the one or more processing devices further perform the operations comprising:
receiving data indicative of a selection of filtering criteria for user characteristics;
filtering the one or more user characteristics that are associated with the user segment in accordance with the filtering criteria; and
generating, based on filtering, a filtered user segment;
wherein generating the happiness index for the user segment comprises:
generating a happiness index for the filtered user segment.

13. The system of claim 8, the one or more processing devices further perform the operations comprising:
transmitting, to a client device, data indicative of the happiness index for the user segment, with the transmitted data being indicative of a visual representation that specifies a measure of happiness of the user segment.

14. A non-transitory computer-readable storage medium having instructions stored thereon that when executed by a computer processor cause the processor to perform operations comprising:
receiving a selection of one or more user characteristics that define a user segment of a social networking platform;
receiving a request for data indicative of the user segment;
in response to the request for data, accessing one or more posts included in user data of the social networking platform, with an item of the accessed user data being associated with one or more user characteristics indicative of a type of user associated with the item of accessed user data;
comparing the received selection of one or more user characteristics to user characteristics associated with the accessed user data;
identifying, based on comparing, a portion of the accessed user data that pertains to users of the social networking platform who are included in the user segment;
analyzing contents of posts included in the accessed user data that pertains to the users who are included in the user segment;
determining one or more sentiment scores for the contents of the posts;
determining, using the determined one or more sentiment scores and based on analyzing, happiness scores for the users who are included in the user segment, with a happiness score for a user being indicative a happiness of the user or an unhappiness of the user;
based on the determined happiness scores,
identifying a first subset of the users who are included in the user segment as being happy users, with a happy user being a user of the social networking platform who is associated with a happiness score that exceeds a happiness threshold; and
identifying a second subset of the users who are included in the user segment as being unhappy users, with an unhappy user being a user of the social networking platform who is associated with a happiness score that is less than or equal to the happiness threshold;
for a particular user included in the second subset, determining a frequency at which the particular user generates posts on the social networking platform;
comparing the determined frequencies at which one or more users in the second subset generate posts on the social networking platform to a threshold frequency;
identifying, based on comparing the determined frequencies, a third subset of the users included in the second subset, with a user in the third subset generating posts on the social networking platform less frequently than the threshold frequency; and
generating a happiness index for the user segment that is based on one or more determined happiness scores for i) an identified number of users in the first subset, and for ii) a weighted number of users in the second subset, wherein the weighted number of users in the second subset is based at least in part on a number of users in the third subset.

15. The non-transitory computer-readable storage medium of claim 14, wherein the happiness scores of the users comprise raw happiness scores of the users who are included in the user segment, and wherein the operations further comprise:
accessing a mapping of one or more raw happiness scores to scaled happiness scores;
wherein determining comprises:
determining, based on the mapping and based on the raw happiness scores of the users who are included in the user segment, scaled happiness scores for the users who are included in the user segment.

16. The non-transitory computer-readable storage medium of claim 14, wherein the happiness scores for the users comprise first happiness scores for the users, and wherein the operations further comprise:

receiving a user input that indicates a time period;

analyzing, for each day specified in the time period, contents of the portion of the accessed user data that pertains to the users who are included in the user segment;

analyzing contents of the portion of the accessed user data that pertains to the users who are included in the user segment and that are associated with the time period;

determining, based on analyzing contents for each day in the time period, second happiness scores for the users who are included in the user segment;

determining, for the time period, third happiness scores for the users who are included in the user segment;

comparing at least one of the second happiness scores for the users with at least one of the third happiness scores for the users; and modifying one or more of the second happiness scores for the users and the third happiness scores for the users, based on the comparison.

17. The non-transitory computer-readable storage medium of claim 16, wherein the happiness index for the user segment comprises a first happiness index for the user segment, and wherein the operations further comprise:

generating a second happiness index for the user segment that is based on one or more determined happiness scores for i) the identified number of users in the first subset, for ii) the weighted number of users in the second subset, wherein the weighted number of users in the second subset is based at least in part on a number of users in the third subset; and iii) one or more of the modified second happiness scores for the users and the modified third happiness scores for the users.

18. The non-transitory computer-readable storage medium of claim 14, further including instructions that cause the computer processor to perform operations comprising:

receiving data indicative of a selection of filtering criteria for user characteristics;

filtering the one or more user characteristics that are associated with the user segment in accordance with the filtering criteria; and generating, based on filtering, a filtered user segment;

wherein generating the happiness index for the user segment comprises:

generating a happiness index for the filtered user segment.

19. The non-transitory computer-readable storage medium of claim 14, further including instructions that cause the computer processors to perform operations comprising:

transmitting, to a client device, data indicative of the happiness index for the user segment, with the transmitted data being indicative of a visual representation that specifies a measure of happiness of the user segment.

20. The computer-readable storage medium of claim 14, further including instructions that cause the computer processors to perform operations comprising:

determining a sentiment score for one or posts included in the portion of the accessed user data that pertains to users of the social networking platform who are included in the user segment, wherein the happiness scores are based at least in part on the sentiment scores and the analyzing.

* * * * *